US011615047B2

(12) United States Patent
Gray et al.

(10) Patent No.: US 11,615,047 B2
(45) Date of Patent: Mar. 28, 2023

(54) PACKET BASED COMMUNICATION USING LOW VOLTAGE DRIVE CIRCUITS

(71) Applicant: SigmaSense, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US); Kevin Joseph Derichs, Buda, TX (US); Timothy W. Markison, Mesa, AZ (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 17/662,370

(22) Filed: May 6, 2022

(65) Prior Publication Data

US 2022/0261372 A1 Aug. 18, 2022

Related U.S. Application Data

(63) Continuation of application No. 16/897,786, filed on Jun. 10, 2020, now Pat. No. 11,327,917, which is a
(Continued)

(51) Int. Cl.
*G06F 13/40* (2006.01)
*G09G 5/00* (2006.01)
(Continued)

(52) U.S. Cl.
CPC .......... *G06F 13/4077* (2013.01); *G06F 3/147* (2013.01); *G06F 3/1431* (2013.01);
(Continued)

(58) Field of Classification Search
CPC .... G06F 13/4077; G06F 3/147; G06F 3/1431; G09G 5/006; G09G 2310/027; G09G 2310/0289; G09G 2310/0297
See application file for complete search history.

(56) References Cited

U.S. PATENT DOCUMENTS 6,218,972 B1 4/2001 Groshong
6,665,013 B1 12/2003 Fossum et al.
(Continued)

FOREIGN PATENT DOCUMENTS

KR 102032325 B1 10/2019

OTHER PUBLICATIONS

Baker; How delta-sigma ADCs work. Part 1; Analog Applications Journal; Oct. 1, 2011; 6 pgs.
(Continued)

*Primary Examiner* — Brian T Misiura
(74) *Attorney, Agent, or Firm* — Garlick & Markison; Kelly H. Hale

(57) ABSTRACT

A method for a low voltage drive circuit (LVDC) begins by receiving data from one or more other low voltage drive circuits (LVDCs) using a bus with varying loading at one or more frequencies and continues by sampling one or more data values of the data to produce a sampled digital data value, converting the sampled digital data value to a binary string and writing the binary string to a buffer. The method continues by writing one or more additional binary strings to the buffer to form a digital word, outputting the digital word to a digital converter circuit and formatting the digital word to create a formatted digital word. The method continues by writing the formatted digital word to a second buffer, writing additional formatted digital words to the second buffer to form a data packet and finally, outputting the data packet to a host device.

20 Claims, 41 Drawing Sheets data communication system 10

Related U.S. Application Data continuation-in-part of application No. 16/247,164, filed on Jan. 14, 2019, now Pat. No. 10,831,690.

(51) Int. Cl.
*G06F 3/147* (2006.01)
*G06F 3/14* (2006.01)

(52) U.S. Cl.
CPC ....... *G09G 5/006* (2013.01); *G09G 2310/027* (2013.01); *G09G 2310/0289* (2013.01); *G09G 2310/0297* (2013.01)

(56) References Cited

U.S. PATENT DOCUMENTS

| | | |
|---|---|---|
| 7,340,662 B1 | 3/2008 | McElwee |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,625,726 B2 | 1/2014 | Kuan |
| 9,201,547 B2 | 12/2015 | Elias |
| 9,686,609 B1 | 6/2017 | O'Connor et al. |
| 10,684,977 B1 | 6/2020 | Seger |
| 11,221,980 B2 * | 1/2022 | Seger, Jr. ............... G06F 13/36 |
| 2008/0036636 A1 | 2/2008 | Khorram |
| 2008/0059682 A1 | 3/2008 | Cooley |
| 2008/0320293 A1 * | 12/2008 | Rofougaran ........ G06F 15/7867 |
| | | 713/1 |
| 2010/0211921 A1 | 8/2010 | Hu et al. |
| 2013/0278447 A1 | 10/2013 | Kremin |
| 2016/0188049 A1 | 6/2016 | Yang et al. |
| 2019/0171331 A1 | 6/2019 | Gray et al. |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report and Written Opinion; International Application No. PCT/US2020/058353; dated Mar. 5, 2021; 7 pgs.

\* cited by examiner data communication system 10 data communication system 10 computing device 12 wireless computing device 14

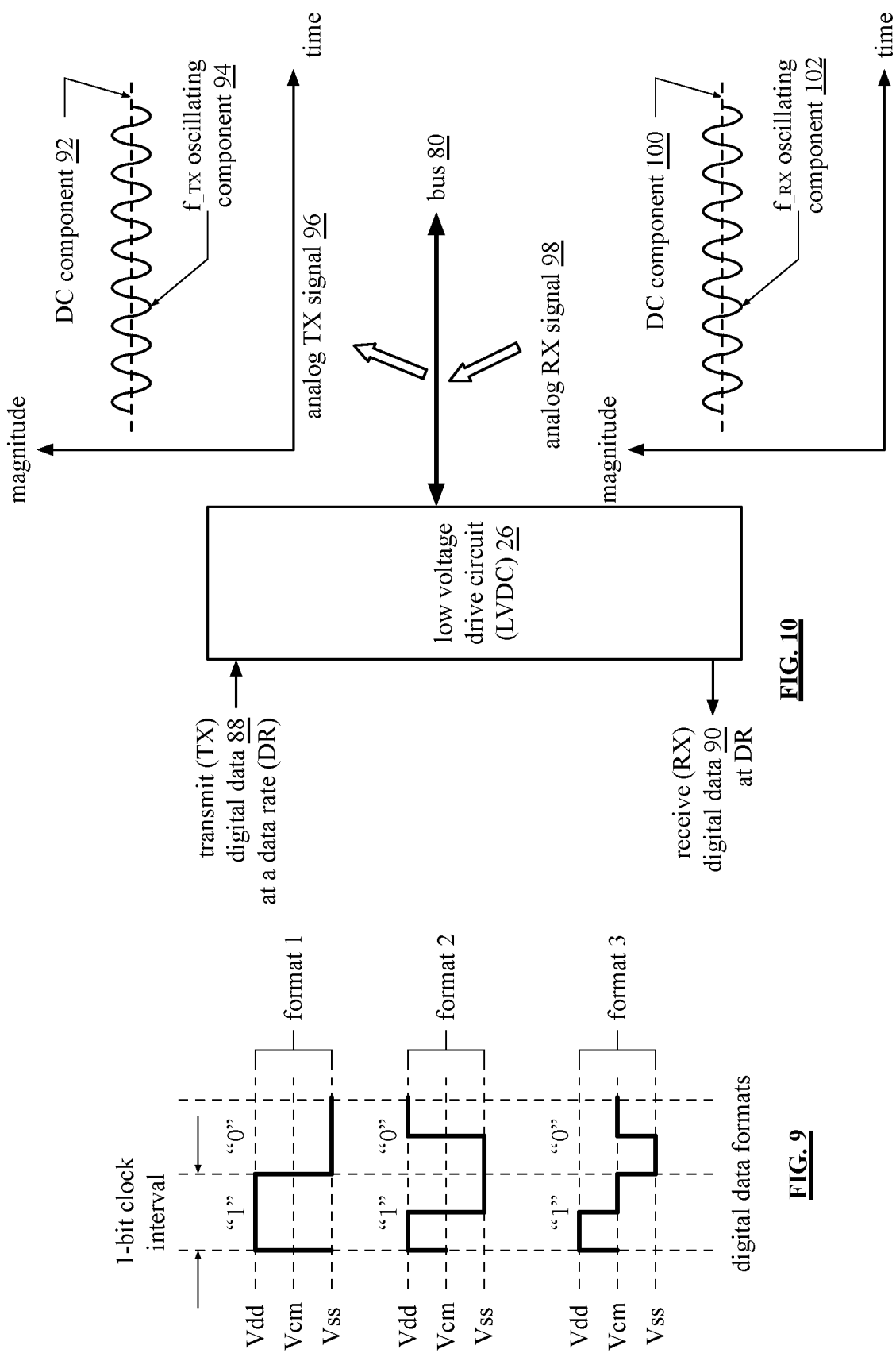

drive-sense circuit 106 drive-sense circuit 106

LVDC 26

LVDC 26 data formatting module 200 data packet 288 received digital data 258 data packet 288 frame control 291

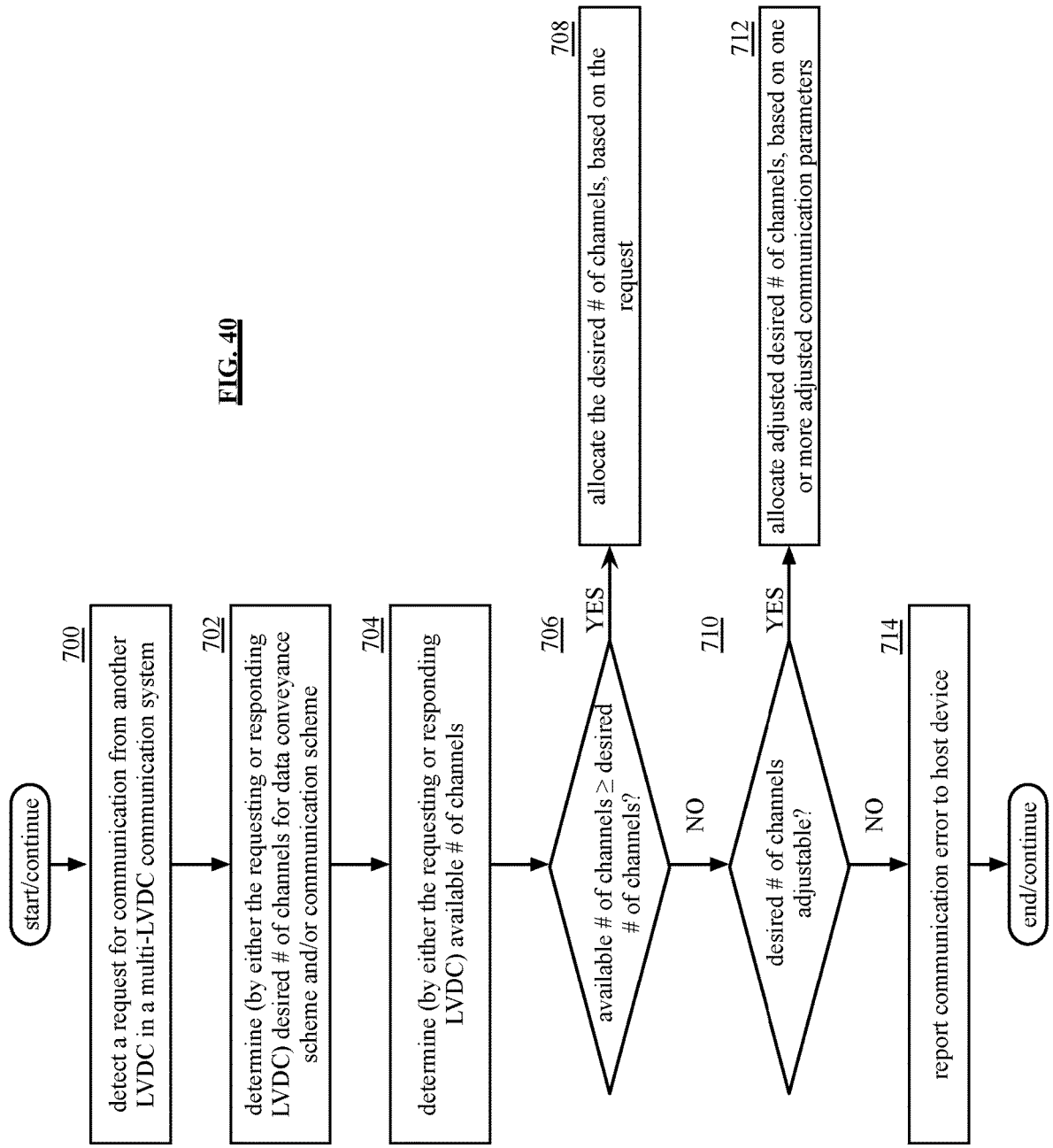

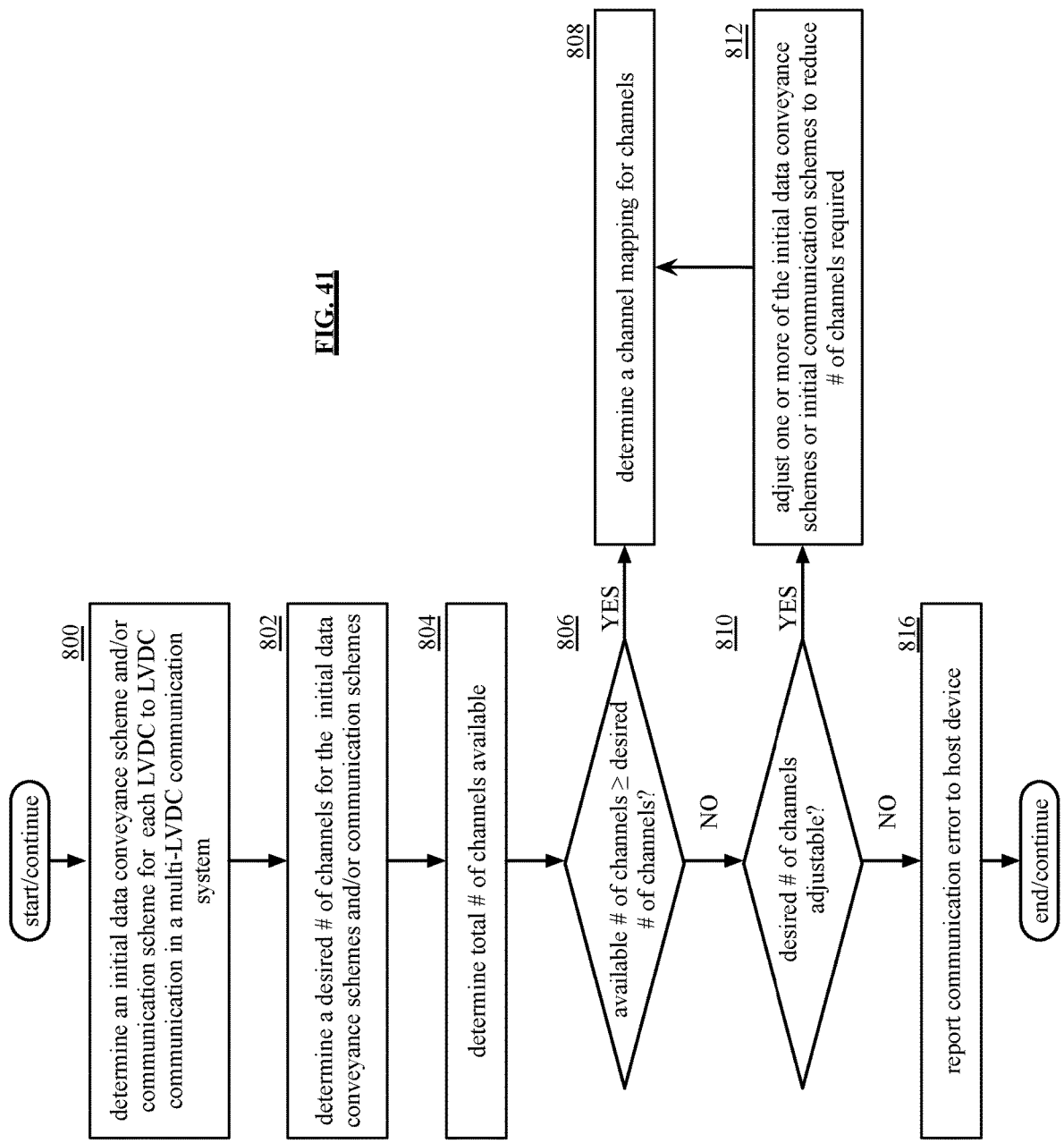

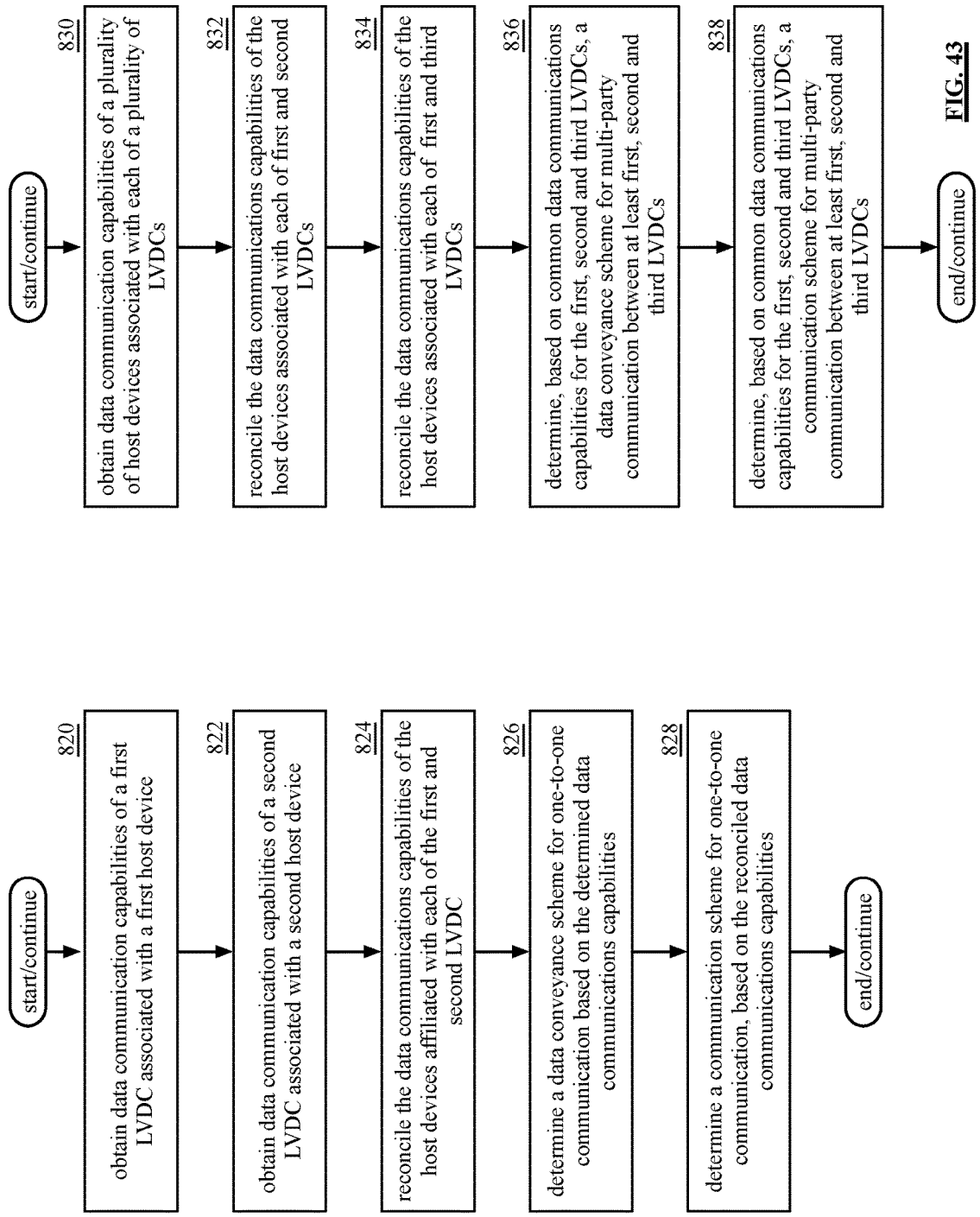

PACKET BASED COMMUNICATION USING LOW VOLTAGE DRIVE CIRCUITS

CROSS-REFERENCE TO RELATED APPLICATIONS

The present U.S. Utility Patent Application claims priority pursuant to 35 USC § 120 as a continuation of U.S. Utility application Ser. No. 16/897,786, entitled LOW VOLTAGE DRIVE CIRCUIT AND COMMUNICATION SYSTEM, filed Jun. 10, 2020, which is a continuation-in-part to U.S. patent application Ser. No. 16/247,164 entitled CHANNEL ALLOCATION AMONG LOW VOLTAGE DRIVE CIRCUITS, filed Jan. 14, 2019, issued as U.S. Pat. No. 10,831,690 on Nov. 10, 2020, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sending and receiving data via a common bus.

Description of Related Art

Data communication involves sending data from one device to another device via a communication medium (e.g., a wire, a trace, a twisted pair, a coaxial cable, air). The devices range from dies within an integrated circuit (IC), to ICs on a printed circuit board (PCB), to PCBs within a computer, to computers, to networks of computers, and so on.

Data is communicated via a wired and/or a wireless connection and is done so in accordance with a data communication protocol. Data communication protocols dictate how the data is to be formatted, encoded/decoded, transmitted, and received. For example, a wireless data communication protocol such as IEEE 802.11 dictates how wireless communications are to be done via a wireless local area network. As another example, SPDIF dictates how digital audio signals are transmitted and received. As yet another example, $I^2C$ is a two-wire serial protocol to connect devices such as microcontrollers, digital to analog converters, analog to digital converters, peripheral devices to a computer, and so on.

In addition, data communication protocols dictate how transmission errors are to be handled. For example, wireless communications often experience data errors so the protocol dictates a form of forward error correction (e.g., Reed Solomon encoding, Turbo encoded, etc.) be used. As another example, wired communication experience much less data errors than wireless communications so the protocol dictates a form of feedback error correction (e.g., resend request, etc.) be used.

For some data communications, digital data is modulated with an analog carrier signal and transmitted/received via a modulated radio frequency (RF) signal. For other data communications, the digital data is transmitted "as is" via a wire or metal trace on a PCB. Regardless of the data communication protocol, digital data is in binary form where a logic "1" value is represented by a voltage that is at least 90% of the positive rail voltage and a logic "0" is represented by a voltage it is at most 10% of the negative rail voltage.

BRIEF DESCRIPTION OF THE SEVERAL VIEWS OF THE DRAWING(S)

FIG. 9 is a schematic block diagram of examples of digital data formats;

FIG. 10 is a functional diagram of an embodiment of a Low Voltage Drive Circuit (LVDC) in accordance with the present invention;

FIG. 40 is a logic diagram of an example of a method for implementing channel allocation for communication between two Low Voltage Drive Circuits (LVDCs) in accordance with the present invention;

FIG. 41 is a logic diagram of an example of a method for implementing channel allocation to enable multiple communications between Low Voltage Drive Circuits (LVDCs) in accordance with the present invention;

FIG. 42 is a logic diagram of an example of a method for determining data conveyance and communication schemes for two-party communication between Low Voltage Drive Circuits (LVDCs) in accordance with the present invention; and FIG. 43 is a logic diagram of an example of a method for determining data conveyance and communication schemes for multi-party communication between Low Voltage Drive Circuits (LVDCs) in accordance with the present invention.

DETAILED DESCRIPTION OF THE INVENTION

Figure 1:
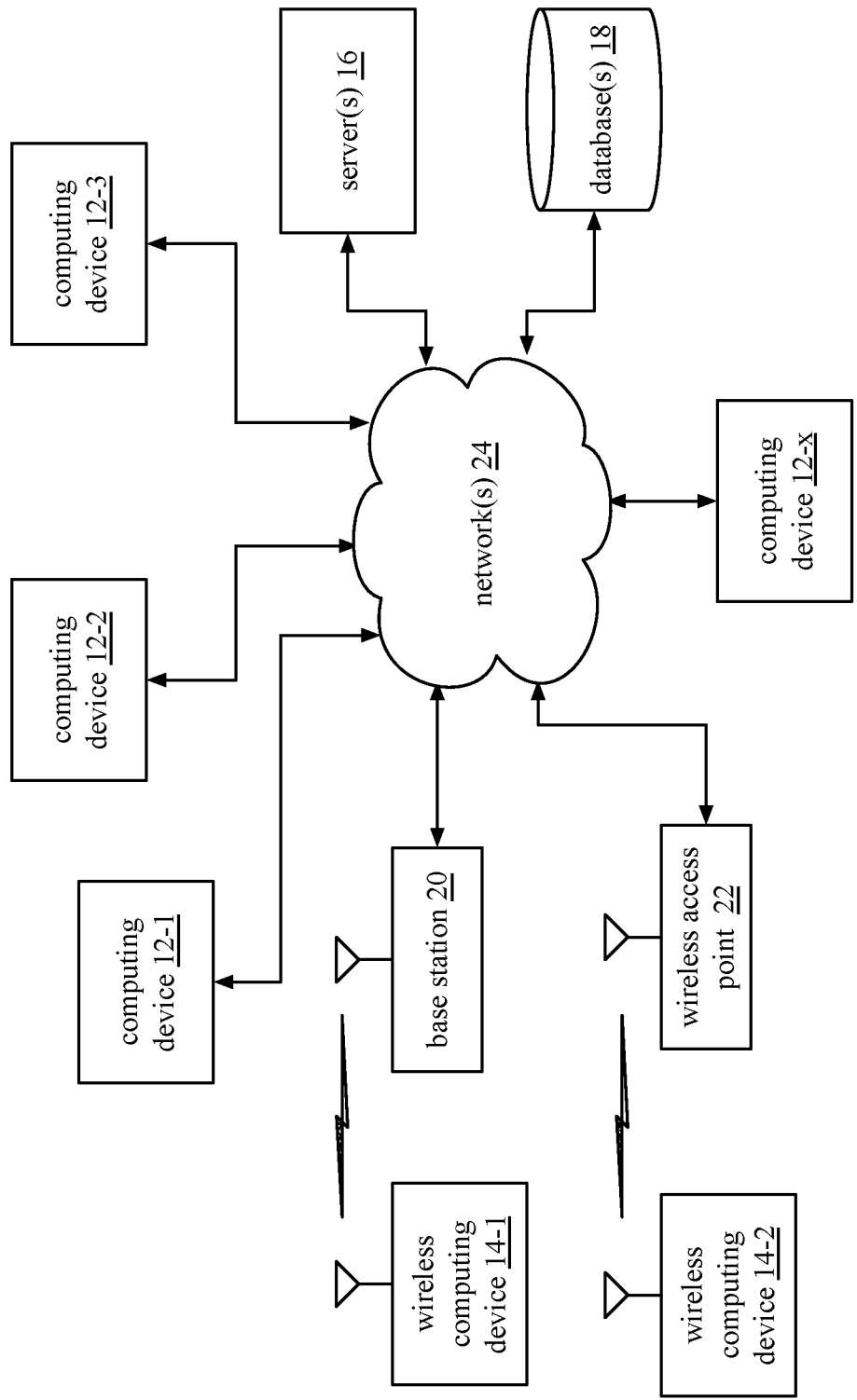
FIG. 1 is a schematic block diagram of an embodiment of a data communication system in accordance with the present invention.

FIG. 1 is a schematic block diagram of an embodiment of a data communication system 10 that includes a plurality of computing devices 12, a plurality of wireless computing devices 14, one or more servers 16, one or more databases 18, one or more networks 24, one or more base stations 20, and/or one or more wireless access points 22. Embodiments of computing devices 12 and 14 are similar in construct and/or functionality with a difference being the computing devices 12 couple to the network(s) 24 via a wired networked card and the wireless communication devices 14 coupled to the network(s) via a wireless connection. In an embodiment, a computing device can have both a wired network card and a wireless network card such that it is both computing devices 12 and 14.

A computing device 12 and/or 14 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12 and 14 will be discussed in greater detail with reference to one or more of FIGS. 3-4.

A server 16 is a special type of computing device that is optimized for processing large amounts of data requests in parallel. A server 16 includes similar components to that of the computing devices 12 and/or 14 with more robust processing modules, more main memory, and/or more hard drive memory (e.g., solid state, hard drives, etc.). Further, a server 16 is typically accessed remotely; as such it does not generally include user input devices and/or user output devices. In addition, an embodiment of a server is a standalone separate computing device and/or may be a cloud computing device.

A database 18 is a special type of computing device that is optimized for large scale data storage and retrieval. A database 18 includes similar components to that of the computing devices 12 and/or 14 with more hard drive memory (e.g., solid state, hard drives, etc.) and potentially with more processing modules and/or main memory. Further, a database 18 is typically accessed remotely; as such it does not generally include user input devices and/or user output devices. In addition, an embodiment of a database 18 is a standalone separate computing device and/or may be a cloud computing device.

The network(s) 24 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The computing devices 12, the wireless communication devices 14, the server 16, the database 18, the base station 20, and/or the wireless access point 22 include one or more low voltage drive circuits (LVDC) for communicating data via a line of a bus (e.g., a bus includes one or more lines, each line is a wired connection, a wire, a trace on a PCB, etc.). The data communication is between devices and/or is within a device. For example, two computing devices communicate with each other via their respective LVDCs. As another example, components within a computing device have associated LVDCs and the components communicate data via the LVDCs.

Figure 2:
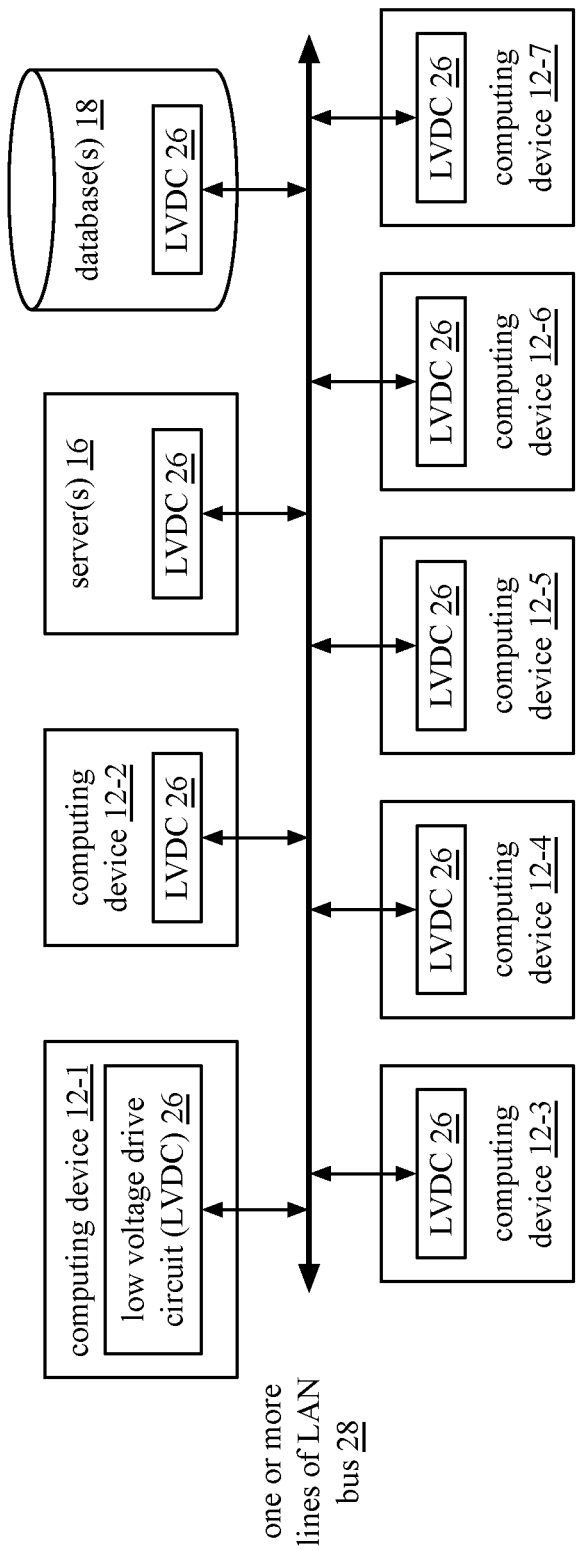
FIG. 2 is a schematic block diagram of another embodiment of a data communication system in accordance with the present invention.

FIG. 2 is a schematic block diagram of another embodiment of a data communication system 10 that includes the computing devices 12, the server 16, and the database 18 coupled to one or more lines of a LAN bus. Each device 12, 16, and 18 includes one or more LVDCs 26 for communicating data via the line of the LAN bus 28.

An LVDC 26 functions to convert transmit digital data from its host device into an analog transmit signal. As an example, a host device is a computing device, a server, or a database. As another example, a host device is an interface of one the computing device, the server, or the database. As yet another example, a host device is an integrated circuit of the computing device, the server, or the database. As further example, a host device is a die of an integrated circuit or even a functional block within an integrated circuit, such as a system-on-chip.

The LVDC 26 produces the analog transmit signal to having an oscillating component at a given frequency that represents the transmit digital data and to have a very low magnitude. For example, the magnitude of the oscillating component is between five percent and 75 percent of the rail to rail voltage (or current) of the LVDC (e.g., Vdd-Vss of the LVDC). By keeping the magnitude of the oscillating component very low with respect to the rail to rail voltage (or current), data is transmitted with very low power and very good noise immunity. As a specific example, if the voltage magnitude of the oscillating component is 25 mV (milli-volts) and the current is 0.1 mA (milli-amps), then the power is 2.5 µW (micro-watts).

The LVDC 26 also functions to convert an analog receive signal into received digital data that is provided to its host. The analog receive signal is an analog transmit signal from another LVDC of the same host or a different host and is received from the same line of the bus as which the LVDC transmits its analog transmit signal. For an LVDC, the analog receive signal is at the same frequency as its analog transmit signal for half duplex communication and is at a different frequency for full duplex communication.

An LVDC 26 is capable of communicating data with one or more other LVDCs using a plurality of frequencies. Each frequency supports a conveyance of data. For example, the transmit digital data can be divided up into data streams, where each data stream is transmitted on a different frequency of the analog transmit signal. This increases the data rate per line of the bus with very little increase in power. One or more other LVDCs can receive the multiple frequencies of the analog transmit signal, recover the data streams, and recover the transmitted digital data.

Figure 3:
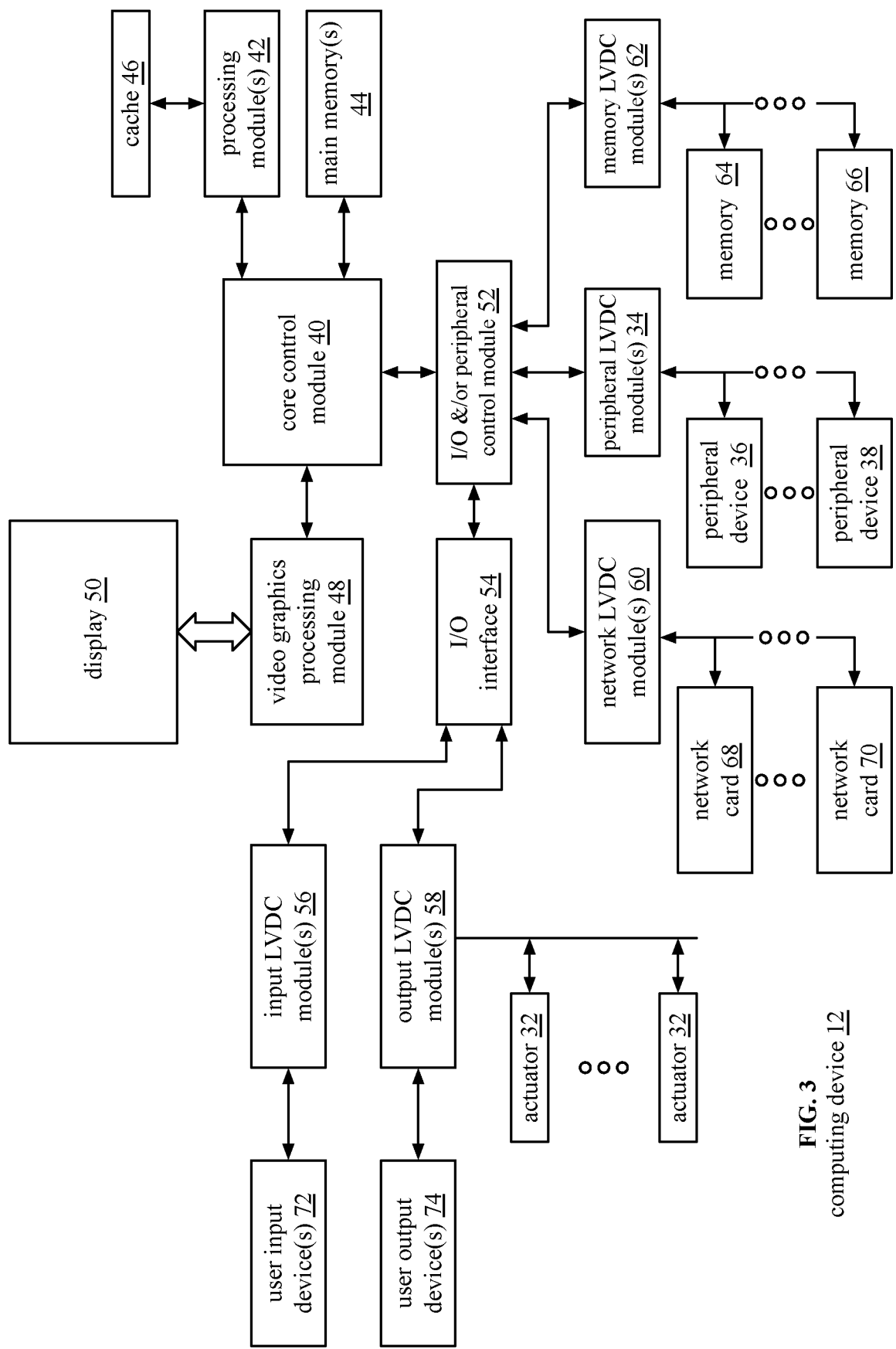
FIG. 3 is a schematic block diagram of an embodiment of a computing device in accordance with the present invention.

FIG. 3 is a schematic block diagram of an embodiment of a computing device 12 that includes a core control module 40, one or more processing modules 42, one or more main memories 44 (e.g., volatile memory), cache memory 46, a video graphics processing module 48, a display 50, an Input-Output (I/O) peripheral control module 52, one or more input LVDC modules 56, one or more output LVDC modules 58, one or more network LVDC modules 60, one or more peripheral LVDC modules 34, and one or more memory LVDC modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 (i.e., non-volatile memory) includes one or more hard drives, one or more solid state memory chips, and/or one or more other large capacity storage devices that, in comparison to cache memory and main memory devices, is/are relatively inexpensive with respect to cost per amount of data stored. The memory 64-66, which includes an LVDC, is coupled to the core control module 40 via the I/O and/or peripheral control module 52 and via one or more memory LVDC modules 62. In an embodiment, the I/O and/or peripheral control module 52 includes one or more Peripheral Component Interface (PCI) buses to which peripheral components connect to the core control module 40. A memory LVDC module 62 includes a software driver and hardware as discussed in one or more subsequent figures.

The core control module 40 coordinates data communications between the processing module(s) 42 and the network(s) 24 via the I/O and/or peripheral control module 52, the network LVDC module(s) 60, and a network card 68 or 70. A network card 68 or 70 includes an LVDC and a wired communication unit. A wired communication unit includes a Gigabit LAN connection, a Firewire connection, and/or a proprietary computer wired connection. A network LVDC module 60 includes a software driver and hardware as discussed in one or more subsequent figures.

The core control module 40 coordinates data communications between the processing module(s) 42 and input device(s) 72 via the input LVDC module(s) 56 and the I/O and/or peripheral control module 52. An input device 72 includes an LVDC and further includes one or more of a keypad, a keyboard, control switches, a touchpad, a microphone, a camera, etc. An input LVDC module 56 includes a software driver and hardware as discussed in one or more subsequent figures.

The core control module 40 coordinates data communications between the processing module(s) 42 and output device(s) 74 via the output LVDC module(s) 58 and the I/O and/or peripheral control module 52. An output device 74 includes an LVDC and a speaker, a tactile actuator, etc. An output LVDC module 58 includes a software driver and hardware as discussed in one or more subsequent figures.

The core control module 40 coordinates data communications between the processing module(s) 42 and peripheral devices 36 and 38 via the I/O and/or peripheral control module 52 and the peripheral LVDC module(s) 34. A peripheral device 36 or 38 includes an external hard drive, a headset, a speaker, a microphone, a thumb drive, a camera, etc. A peripheral LVDC module 34 includes a software driver and hardware as discussed in one or more subsequent figures.

The core control module 40 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50. While not shown, the computing device 12 further includes a BIOS (Basic Input Output System) memory coupled to the core control module 40.

Figure 4:
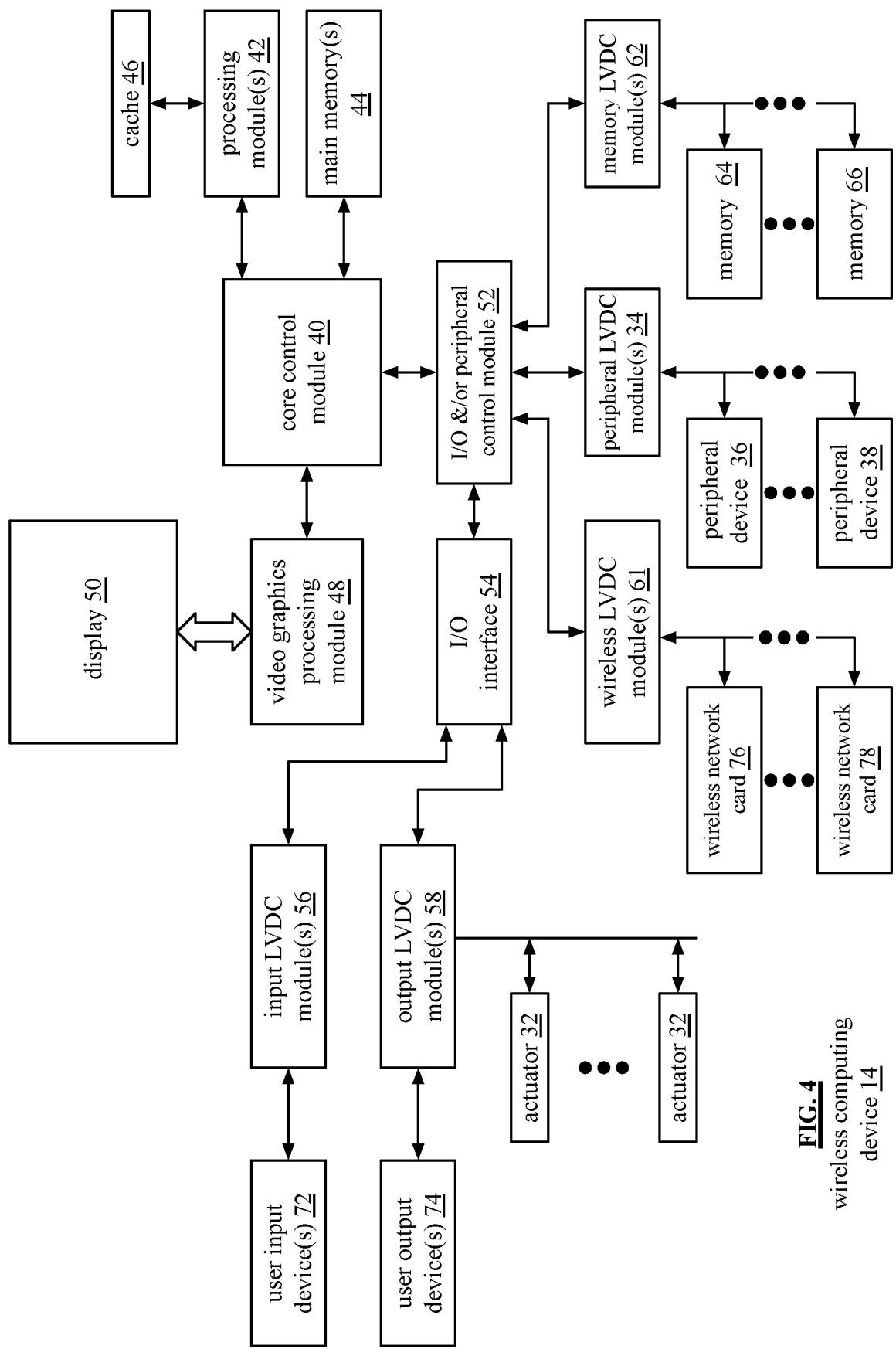
FIG. 4 is a schematic block diagram of an embodiment of a wireless computing device in accordance with the present invention.

FIG. 4 is a schematic block diagram of an embodiment of a wireless computing device 14 that includes a core control module 40, one or more processing modules 42, one or more main memories 44 (e.g., volatile memory), cache memory 46, a video graphics processing module 48, a display 50, an Input-Output (I/O) peripheral control module 52, one or more input LVDC modules 56, one or more output LVDC modules 58, one or more wireless network LVDC modules 61, and one or more memory LVDC modules 62. The common components of the wireless computing device 14 and the computing device 12 function as discussed with reference to FIG. 3. In this embodiment, communication with the network 24 is done wirelessly.

In particular, the core control module 40 coordinates data communications between the processing module(s) 42 and network(s) 24 wirelessly via the I/O and/or peripheral control module 52, the wireless network LVDC module(s) 61, and a wireless network card 76 or 78. A wireless network card 76 or 78 includes an LVDC and a wireless communication unit. A wireless communication unit includes a wireless local area network (WLAN) communication device, a cellular communication device, a Bluetooth device, and/or a ZigBee communication device. A wireless network interface module 61 includes a software driver and hardware as discussed in one or more subsequent figures.

Figure 5:
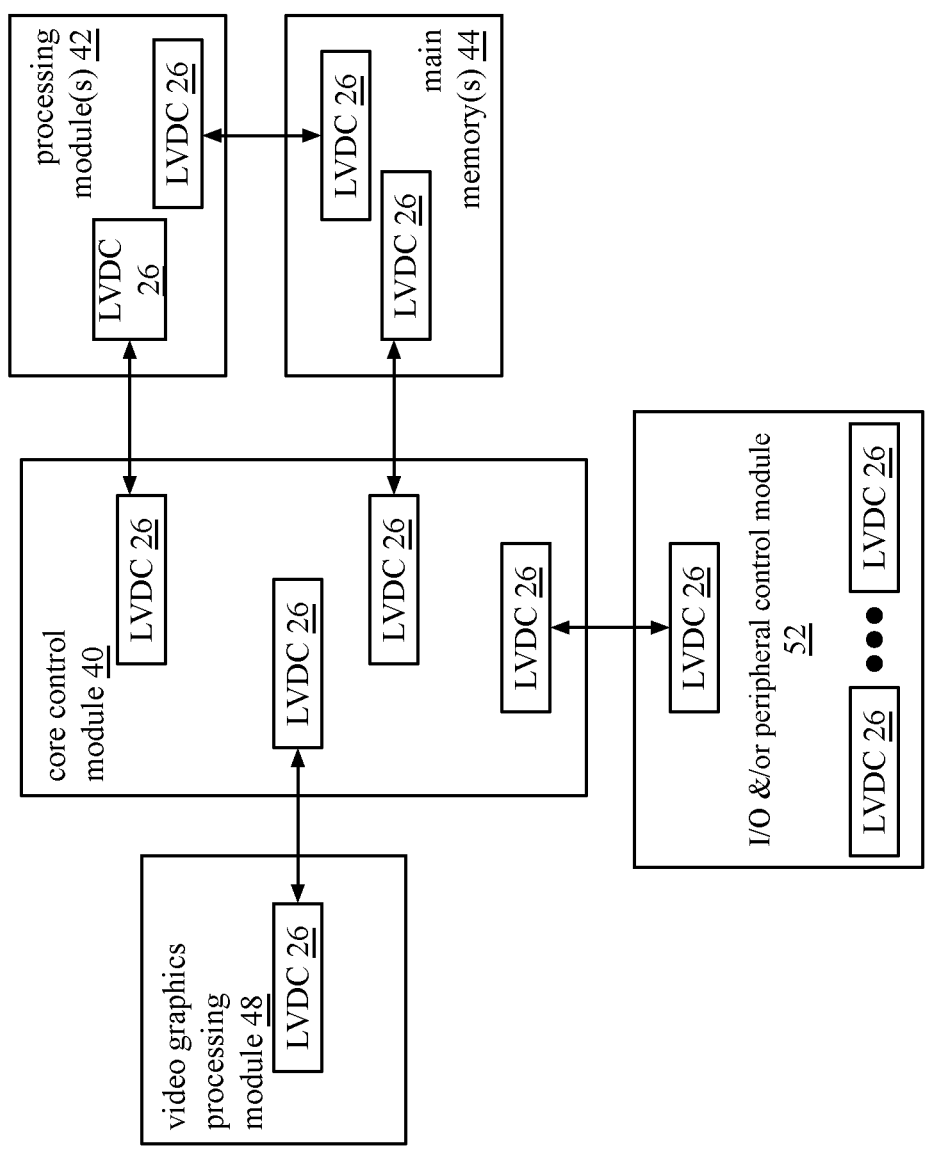
FIG. 5 is a schematic block diagram of an embodiment of a computing core of a computing device in accordance with the present invention.

FIG. 5 is a schematic block diagram of an embodiment of a computing core of a computing device 12 or 14. The computing core includes the core control module 40, the processing module(s) 42, the main memory 44, the video graphics processing module 48, and the IO and/or peripheral control module 52. These components are generally implemented as integrated circuits (ICs) and mounted on a mother board. The mother board includes traces that form buses for data to be communicated between the components.

In this embodiment, the data communication between components 40-52 is done via Low Voltage Drive Circuits (LVDCs). Each component 40-52 includes one or more LVDCs for communicating with one or more other components. For example, the core control module 40 includes four LVDC: A first for one-to-one communication with the processing module 42; a second for one-to-one communication with the main memory 44; a third for one-to-one communication with the video graphics processing module 48; and a fourth for one-to-one communication with the IO and peripheral control module 52.

In this embodiment, the core control module 40 is coupled to the processing module 42 via a single trace for data communication there-between. The core control module 40 is also coupled, via a single trace, to the main memory 44, the video graphics processing module 48, and to the IO and peripheral control module 52. Similarly, the processing module 42 is coupled to the main memory via a single trace. In this manner, the number of traces on the mother board is substantially reduced in comparison to mother boards that use conventional data communication between the components. In addition, the power to convey data is substantially reduced in the present embodiment in comparison to a mother boards that use conventional data communication.

In an alternate embodiment, each of the core control module 40, the processing module(s) 42, the main memory 44, the video graphics processing module 48, and the IO and/or peripheral control module 52 includes one LVDC that is coupled to one or more lines of a bus. In an example, the control controller 40 communicates with the processing module 42 using a first set of channels of a frequency band; communicates with main memory 44 using a second set of channels of the frequency band; communicates with the video graphics processing module 48 using a third set of channels of the frequency band; and communicates with the IO and peripheral control module 52 using a fourth set of channels of the frequency band. As an example, the frequency band ranges from 1.000 GHz to 1.100 GHz with channels at frequencies every 10 MHz. As such, there are 11 channels: the first at 1.000 GHz, the second at 1.010 GHz, and so on through the eleventh at 1.100 GHz. A specific channel includes a sinusoidal signal at a particular frequency within the frequency band.

In another example of alternative embodiment, the channels are allocated to the components on an as needed basis. For example, when the main memory has data to write to memory device(s) via the IO and/or peripheral control module 52, one or more channels are allocated for this communication. When the data has been conveyed, the allocated channels are released for reallocation to another communication.

Figure 6:
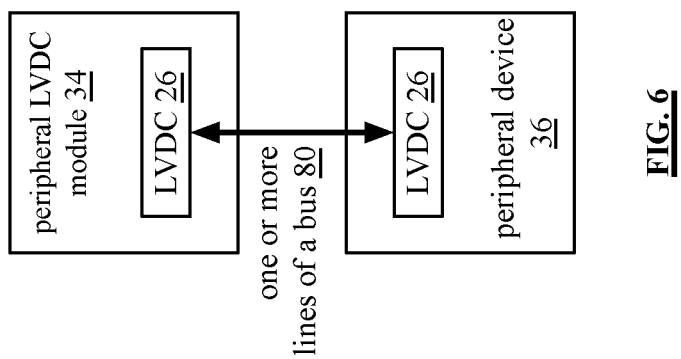
FIG. 6 is a schematic block diagram of an embodiment of a peripheral Low Voltage Drive Circuit (LVDC) module of a computing device coupled to a peripheral device in accordance with the present invention.

FIG. 6 is a schematic block diagram of an embodiment of a peripheral Low Voltage Drive Circuit (LVDC) module 34 of a computing device 12 coupled to a peripheral device 36 via LVDCs 26. The LVDCs are coupled together via one or more lines of a bus 80. The devices communicate data in a full duplex mode per line using multiple channels or in a half duplex mode per line using a single channel. For example, the LVDC of peripheral LVDC module 34 uses channels 1-3 (e.g., frequencies 1-3 of the frequency band) to transmit data to the LVDC of the peripheral device 36. In addition, the LVDC of the peripheral device 36 uses channels 4-6 (e.g., frequencies 4-6 of the frequency band) to transmit data to the LVDC of the peripheral LVDC module 34.

Figure 7:
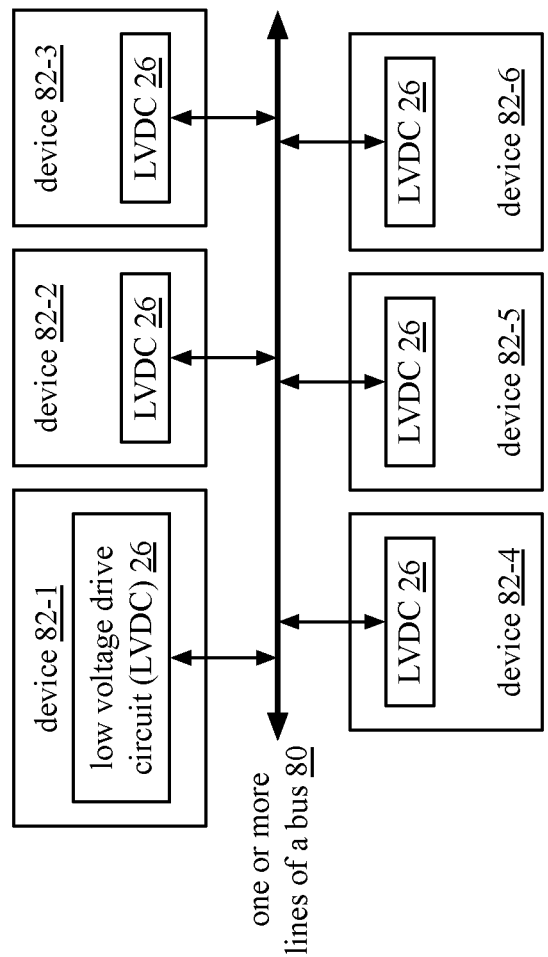
FIG. 7 is a schematic block diagram of another embodiment of a data communication system in accordance with the present invention.

FIG. 7 is a schematic block diagram of another embodiment of a data communication system that includes a plurality of devices 82-1 through 82-6. Each of the devices includes a Low Voltage Drive Circuit (LVDC) 26 coupled to one or more lines of a bus 80. The devices are one or more devices from a list that includes a die of an integrated circuit (IC), an integrated circuit (IC), a printed circuit board with components mounted thereon, a sub-system of a plurality of printed circuit boards.

The devices communicate with each other via their respective LVDCs and the one or more lines of the bus. For each line of the bus, the LVCDs are assigned (e.g., permanently, on an as needed basis, etc.) channels to transmit data to one or more other devices. An LVCD of a device is tuned to the channel(s) of another device to receive the data transmissions from the other device.

Figure 8:
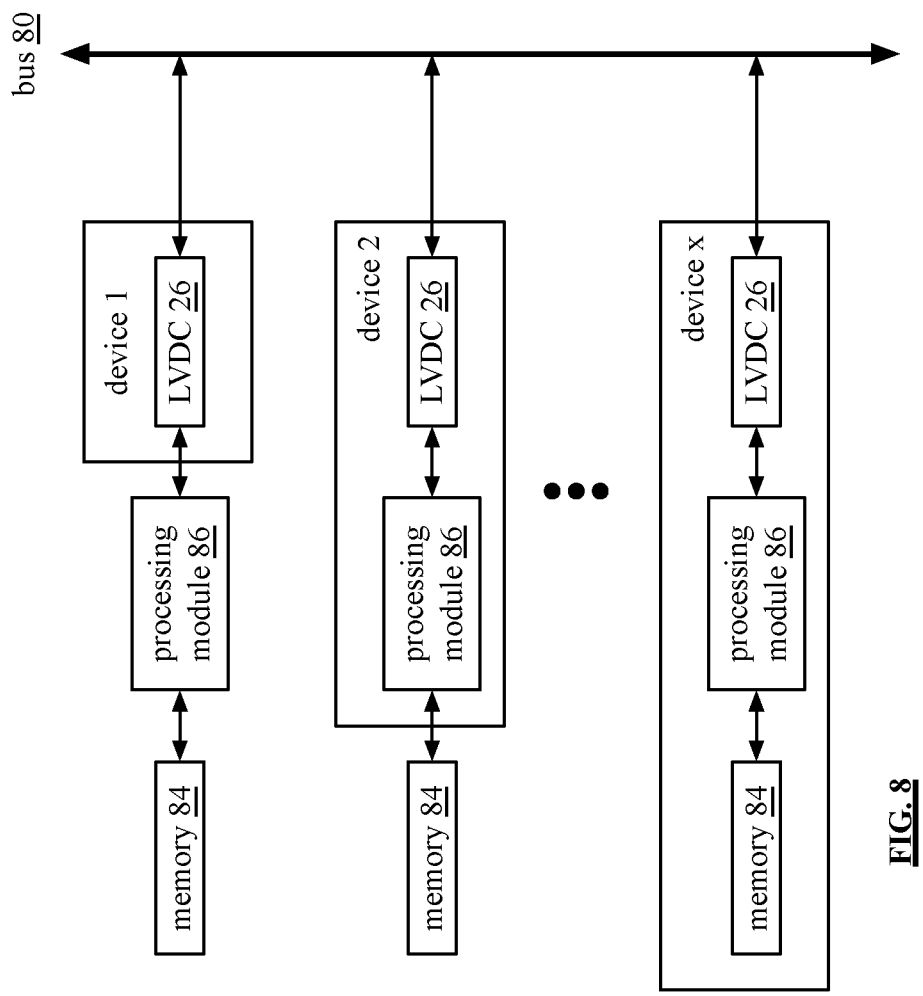
FIG. 8 is a schematic block diagram of another embodiment of a data communication system in accordance with the present invention.

FIG. 8 is a schematic block diagram of another embodiment of a data communication system that includes a plurality of devices 1-x. Each of the devices includes a Low Voltage Drive Circuit (LVDC) 26 coupled to one or more lines of a bus 80. The types of devices vary. For example, device 1 is an interface device that includes a limited amount of additional circuitry beyond the LVDC 26. In particular, device 1 does not include a processing module 86 or memory 84 (e.g., volatile or non-volatile memory). Device 1 is coupled to the processing module 86 of a next level higher component of a computing device. The processing module 86 coupled to device 1 is also coupled to memory 84.

Device 2 includes the LVDC and the processing module 86. The memory 84, however, is associated with the next higher component of the computing device. Device x includes the LVDC, the processing module 86, and the memory 84. As an example, the bus 84 is a backplane of server; device 1 is an interface for a thumb drive; device 2 is a video graphics card, and device x is a mother board. Regardless of the specific implementation of a device including an LVDC, a driver for the LVDC is stored in the memory 84.

FIG. 9 is a schematic block diagram of examples of digital data formats. As known, digital data is a string of binary values. A binary value is either a logic "1" or a logic "0". One binary value corresponds to a bit of the digital data. How the bits are organized into data words establishing the meaning for of the data words. For example, American Standard Code for Information Interchange (ASCII) defines characters using 8-bits of data. For example, a capital "A" is represented as the binary value of 0100 0001 and a lower case "a" is represented as the binary value of 0110 0001.

A binary value can be expressed in a variety of forms. In a first example format, a logic "1" is expressed as a positive rail voltage for the duration of a 1-bit clock interval and logic "0" is expressed as a negative rail voltage for the duration of the 1-bit clock interval; or vice versa. The positive rail voltage refers to a positive supply voltage (e.g., Vdd) that is provided a digital circuit (e.g., a circuit that processes and/or communicates digital data as binary values), the negative rail voltage refers to a negative supply voltage or ground (e.g., Vss) that is provided to the digital circuit, and the common mode voltage (e.g., Vcm) is half way between Vdd and Vss. The 1-bit clock interval corresponds to the inverse of a 1-bit data rate. For example, if the 1-bit data rate is 1 Giga-bit per second (Gbps), then the 1-bit clock interval is 1 nano-second).

In a second example format, a logic "1" is expressed as a non-return to zero waveform that, for the first half of the 1-bit interval, is at the positive rail voltage (Vdd) and for the second half of the 1-bit interval is at the negative rail voltage (Vss). A logic "0" is expressed as a non-return to zero waveform that, for the first half of the 1-bit interval, is at the negative rail voltage (Vss) and for the second half of the 1-bit interval is at the positive rail voltage (Vdd). Alternatively, a logic "0" is expressed as a non-return to zero waveform that, for the first half of the 1-bit interval, is at the positive rail voltage (Vdd) and for the second half of the 1-bit interval is at the negative rail voltage (Vss). A logic "1" is expressed as a non-return to zero waveform that, for the first half of the 1-bit interval, is at the negative rail voltage (Vss) and for the second half of the 1-bit interval is at the positive rail voltage (Vdd).

In a third example format, a logic "1" is expressed as a return to zero waveform that, for the first half of the 1-bit interval, is at the positive rail voltage (Vdd) and for the second half of the 1-bit interval is at the common mode voltage (Vcm). A logic "0" is expressed as a return to zero waveform that, for the first half of the 1-bit interval, is at the negative rail voltage (Vss) and for the second half of the 1-bit interval is at the common mode voltage (Vcm). Alternatively, a logic "0" is expressed as a return to zero waveform that, for the first half of the 1-bit interval, is at the positive rail voltage (Vdd) and for the second half of the 1-bit interval is at the common mode voltage (Vcm). A logic "1" is expressed as a return to zero waveform that, for the first half of the 1-bit interval, is at the negative rail voltage (Vss) and for the second half of the 1-bit interval is at the common mode voltage (Vcm).

With any of the digital data formats, a logic value needs to be within 10% of a respective rail voltage to be considered in a steady data binary condition. For example, for format 1, a logic 1 is not assured until the voltage is at least 90% of the positive rail voltage (Vdd). As another example, for format 1, a logic 0 is not assured until the voltage is at most 10% of the negative rail voltage (Vss).

FIG. 10 is a functional diagram of an embodiment of a Low Voltage Drive Circuit (LVDC) 26. In general, the LVDC 26 functions to convert transmit (TX) digital data 88 into an analog transmit signal 96 and to convert an analog receive signal 98 into receive (RX) digital data 90. The LVDC 26 receives the transmit digital data 88 from its host device and transmits the analog TX signal 96 to another LVDC coupled to the line of the bus 80. The analog transmit signal 96 includes a DC component 92 and an oscillating component 94. The oscillating component 94 includes data encoded into one or more channels of a frequency band and has a very low magnitude (e.g., 5% to 75% of the rail to rail voltage and/or current powering the LVDC and/or the host device). This allows for low power high data rate communications in comparison to conventional low voltage signaling protocols.

As an example, the transmit digital data is encoded into one channel, as such the oscillating component include one frequency: the one corresponding to the channel. As another example, the transmit digital data is divided into x number of data streams. The LVDC encoded the x number of data streams on to x number of channels. Thus, in an example the oscillating component 94 includes x number of frequencies corresponding to the x number of channels.

The LVDC 26 receives the analog receive signal 98 from another LVDC (e.g., the one it sent its analog TX signal to and/or another LVDC coupled to the line of the bus 80). The analog receive signal 98 includes a DC component 100 and a receive oscillating component 102. The receive oscillating component 102 includes data encoded into one or more channels of a frequency band by the other LVDC and has a very low magnitude. The LVDC converts the analog receive signal 98 into the receive digital data 90, which its provides to its host device.

Figure 11:
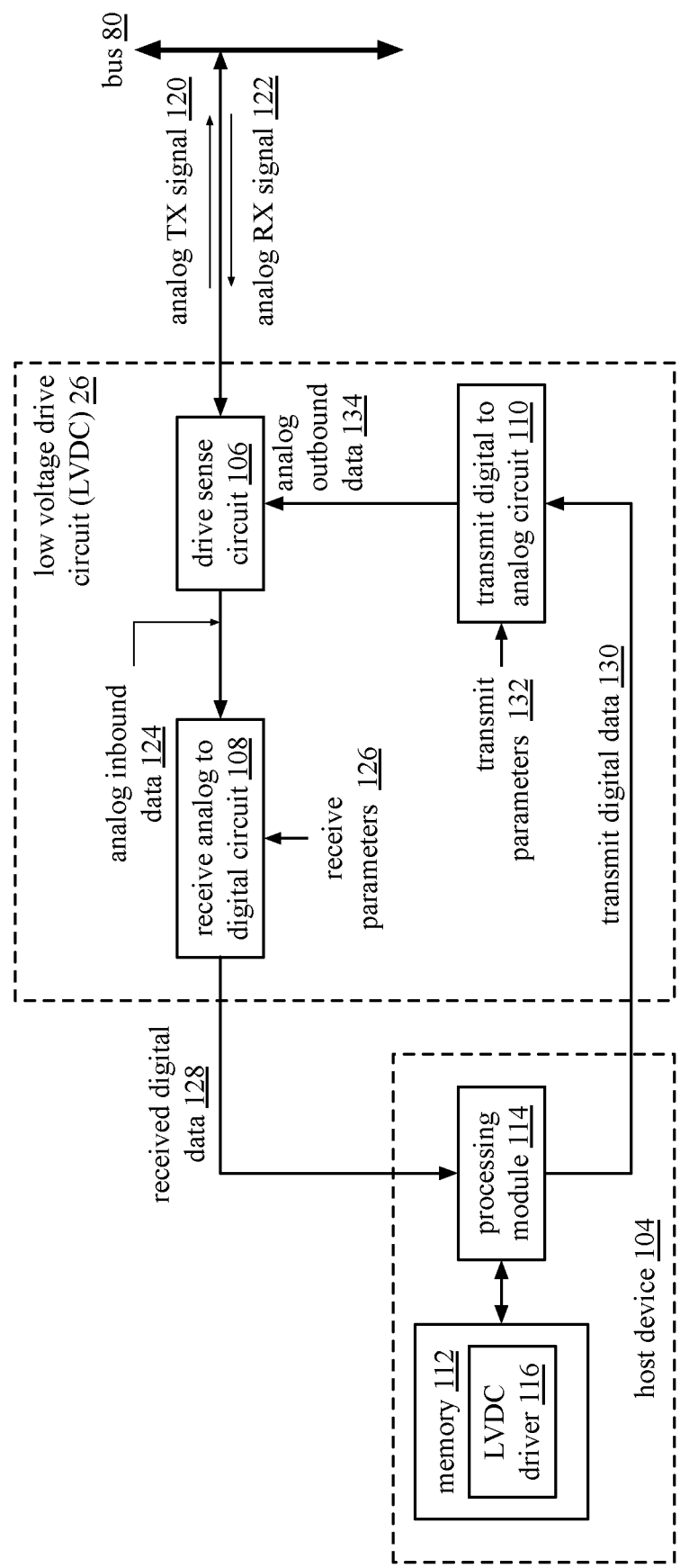
FIG. 11 is a schematic block diagram of an embodiment of a Low Voltage Drive Circuit (LVDC) coupled to a host device in accordance with the present invention.

FIG. 11 is a schematic block diagram of an embodiment of a Low Voltage Drive Circuit (LVDC) 26 coupled to a host device 104 and to one or more lines of a bus 80. The host device 104 includes a processing module 114 and memory 112 (e.g., volatile memory and/or non-volatile memory). The memory 112 stores at least part of an LVDC driver 116 application. The LVDC 26 includes a drive sense circuit 106, a receive analog to digital converter (ADC) circuit 108, and a transmit digital to analog converter (DAC) circuit 110.

In an example of operation, the processing module 104 of the host device 104 accesses the LVDC driver 116 to set up the LVDC 26 for operation. For example, the LVDC driver 116 includes operational instructions and parameters that enable the host device 104 to effectively use the LVDC for data communications. For example, the parameters include two or more of: one or more communication scheme parameters; one or more data conveyance scheme parameters, one or more receive parameters, and one or more transmit parameters. A communication scheme parameter is one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication.

A data conveyance scheme parameter is one of: a data rate per line; a number of bits per data rate interval; data coding scheme per line and per number of bits per data rate interval; direct data communication; modulated data communication; power level of signaling per line of the bus; voltage/current level for a data coding scheme per line (e.g., function of signal to noise ratio, power level, and data rate); number of lines in the bus; and a number of lines of the bus to use.

A receive parameter includes one of: a digital data format for the received digital data; a packet format for the received digital data; analog to digital conversion scheme in accordance with parameter(s) of the communication scheme and of the data conveyance scheme of transmitted data by other LVDCs; and digital filtering parameters (e.g., bandwidth, slew rate, center frequency, digital filter coefficients, number of taps of digital filtering, stages of digital filtering, etc.).

A transmit parameter includes at least one of: a digital data format for the transmit digital data; a packet format for the transmit digital data; and digital to analog conversion in accordance with parameter(s) of the communication scheme and of the data conveyance scheme.

Once the LVDC 26 is set up for a particular data communication, the transmit DAC circuit 110 receives the transmit digital data 130 from its host device 104 in one of the formats of FIG. 9, or another format, and at a data rate of the host device (e.g., 100 Mbps, 1 Gbps, etc.) If necessary, the transmit DAC circuit 110 converts the format of the transmit digital data 130 in accordance with one or more transmit parameters 132. In addition, the transmit DAC circuit 110 synchronizes the transmit digital data with a bus data rate (e.g., the data rate at which data is transmitted via a line of the bus 80) to produce a digital input of n-bits per interval of the bus data rate, where "n" is an integer greater than or equal to one.

The transmit DAC circuit 110 converts the digital input into analog outbound data 134 via a range limited digital to analog converter (DAC) and a DC reference source. The drive sense circuit 106 converts the analog outbound data 134 into the analog transmit signal 120 and drives it on to a line of the bus 80.

The drive sense circuit 106 receives the analog receive signal 122 from the bus 80 and converts it into analog inbound data 124. The receive analog to digital (ADC) circuit 108 converts the analog inbound data 124 into digital inbound data. The receive ADC circuit 108 filters the digital inbound data in accordance with one or more receive parameters 126 to produce the filtered data. The receive ADC circuit 108 formats and packetizes the filtered data in accordance with one or more receive parameters 126 to produce the received digital data 128. The receive ADC circuit 108 provides the received digital data 128 to the host device 104.

Figure 12:
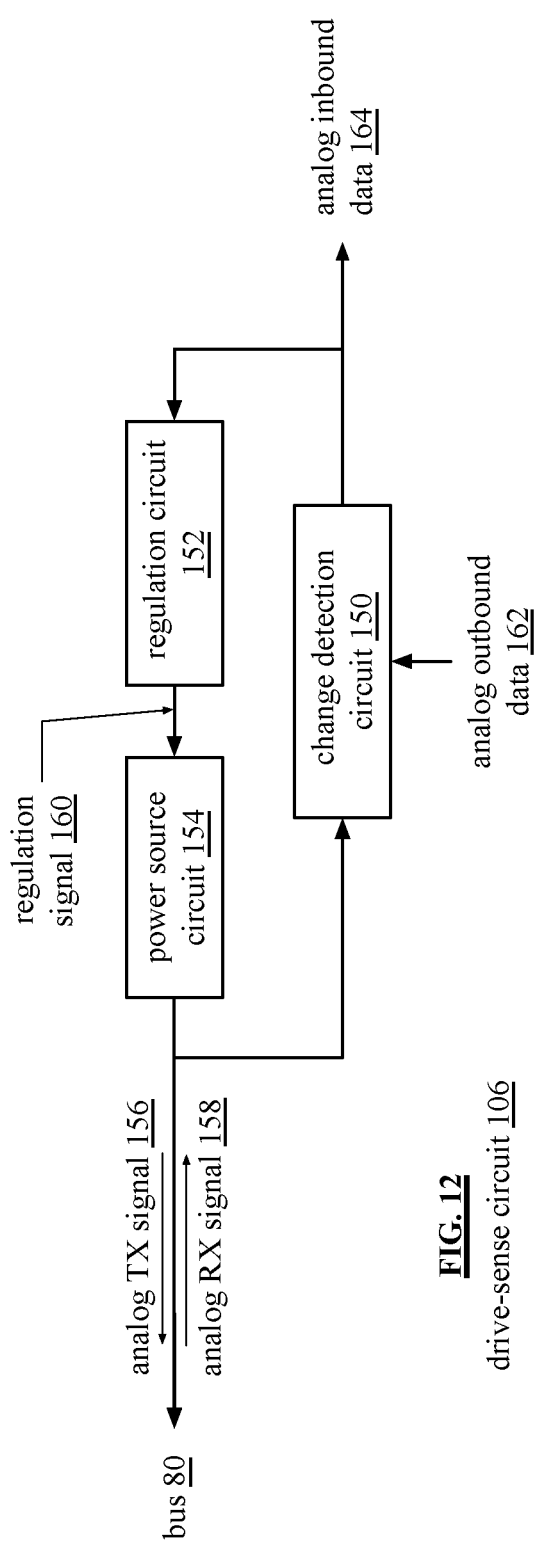
FIG. 12 is a schematic block diagram of an embodiment of a drive sense circuit of an LVDC coupled to a host device in accordance with the present invention.

FIG. 12 is a schematic block diagram of an embodiment of a drive sense circuit 106 of a Low Voltage Drive Circuit (LVDC) 26 coupled to one or more lines of a bus 80. The line(s) of the bus are coupled to one or more other LVDCs. The drive sense circuit 106 includes a change detection circuit 150, a regulation circuit 152, and a power source circuit 154.

The change detection circuit 150, the regulation circuit 152, and the power source circuit 154 operate in concert to keep the inputs of the change detection circuit 150 to substantially matching status (e.g., voltage to substantially match, current to substantially match, impedance to substantially match). The inputs to the change detection circuit 150 include the analog outbound data 162 and the signals on the line(s) of the bus 80 (e.g., the analog RX signal 158 and the analog TX signal 156).

When there is no analog RX signal, the only signal on the bus is the analog transmit signal 156. The analog transmit signal is created by adjusting the operation of the change detection circuit 150, the regulation circuit 152, and the power source circuit 154 to match the analog outbound data 162. Since the analog transmit signal 156 tracks the analog outbound data 162 within the drive sense circuit 106, when there is no analog RX signal 158, the analog inbound data 164 is a DC value.

When an analog RX signal 158 is being received, the change detection circuit 150, the regulation circuit 152, and the power source circuit 154 continue to operate in concert to keep the inputs of the change detection circuit 150 to substantially match. With the presence of the analog RX signal 158, the output of the change detection circuit 150 will vary based on the analog RS signal 158, which produces the analog inbound data 164. The regulation circuit 152 converts the analog inbound data 164 into a regulation signal 160. The power source circuit 154 adjusts the generation of its output (e.g., a regulated voltage or a regulated current) based on the regulation signal 160 to keep the inputs of the change detection circuit 150 substantially matching.

Figure 13:
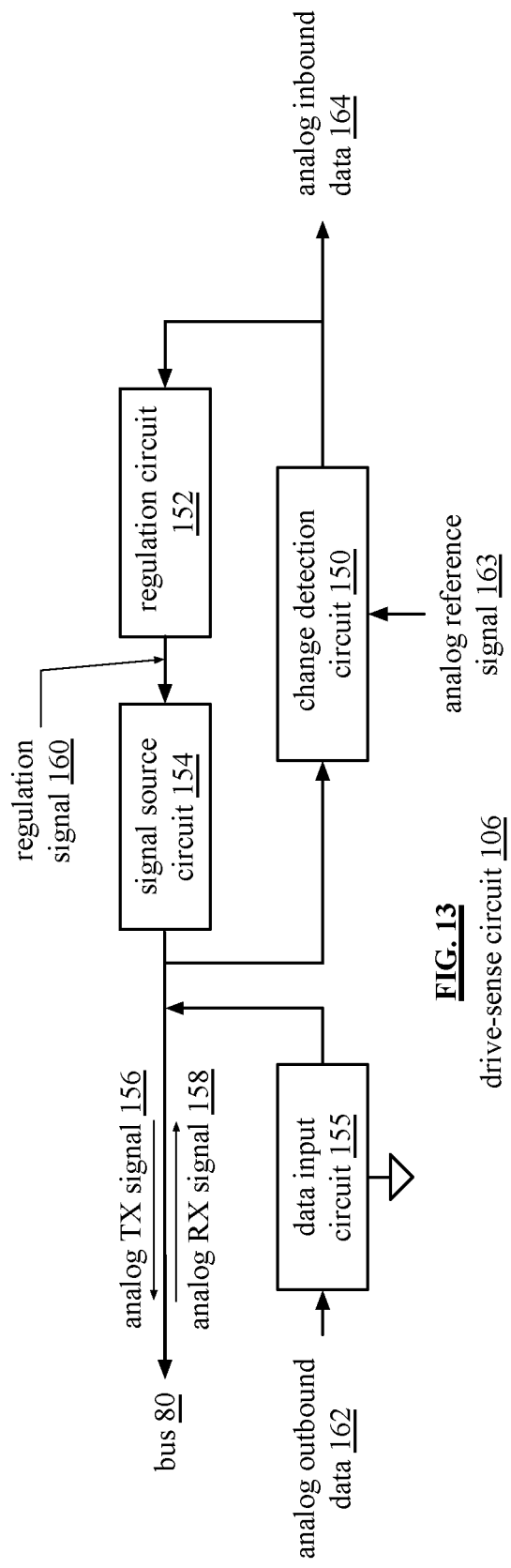
FIG. 13 is a schematic block diagram of another embodiment of a drive sense circuit of an LVDC coupled to a host device in accordance with the present invention.

FIG. 13 is a schematic block diagram of another embodiment of a drive sense circuit 106 of an LVDC 26 coupled to one or more lines of a bus 80. The drive sense circuit 106 includes the change detection circuit 150, the regulation circuit 152, the power source circuit 154, and a data input circuit 155. The change detection circuit 150, the regulation circuit 152, and the power source circuit 154 function as discussed with reference to FIG. 14 to keep the inputs of the change detection circuit 150 substantially matching. In this embodiment, however, the inputs to the change detection circuit 150 are the signals on the bus (e.g., the analog transmit signal 156 and the analog receive signal 158) and an analog reference signal 163 (e.g., a DC voltage reference signal or DC current reference signal). The analog outbound data 162 is inputted to the data input circuit 155.

The data input circuit 155 creates the analog transmit signals 156 from the analog outbound data 162 and drives it on to the bus 80. In an example, the data input circuit 155 changes the loading on the bus in accordance with the analog inbound data 162 to produce the analog transmit signal 156.

Since the analog transmit signal 156 is being created outside of the feedback loop of the change detection circuit 150, the regulation circuit 152, and the power source circuit 154, the analog inbound data164 will include a component corresponding to the analog receive signal 158 and another component corresponding to the analog transmit signal 156.

Figure 14:
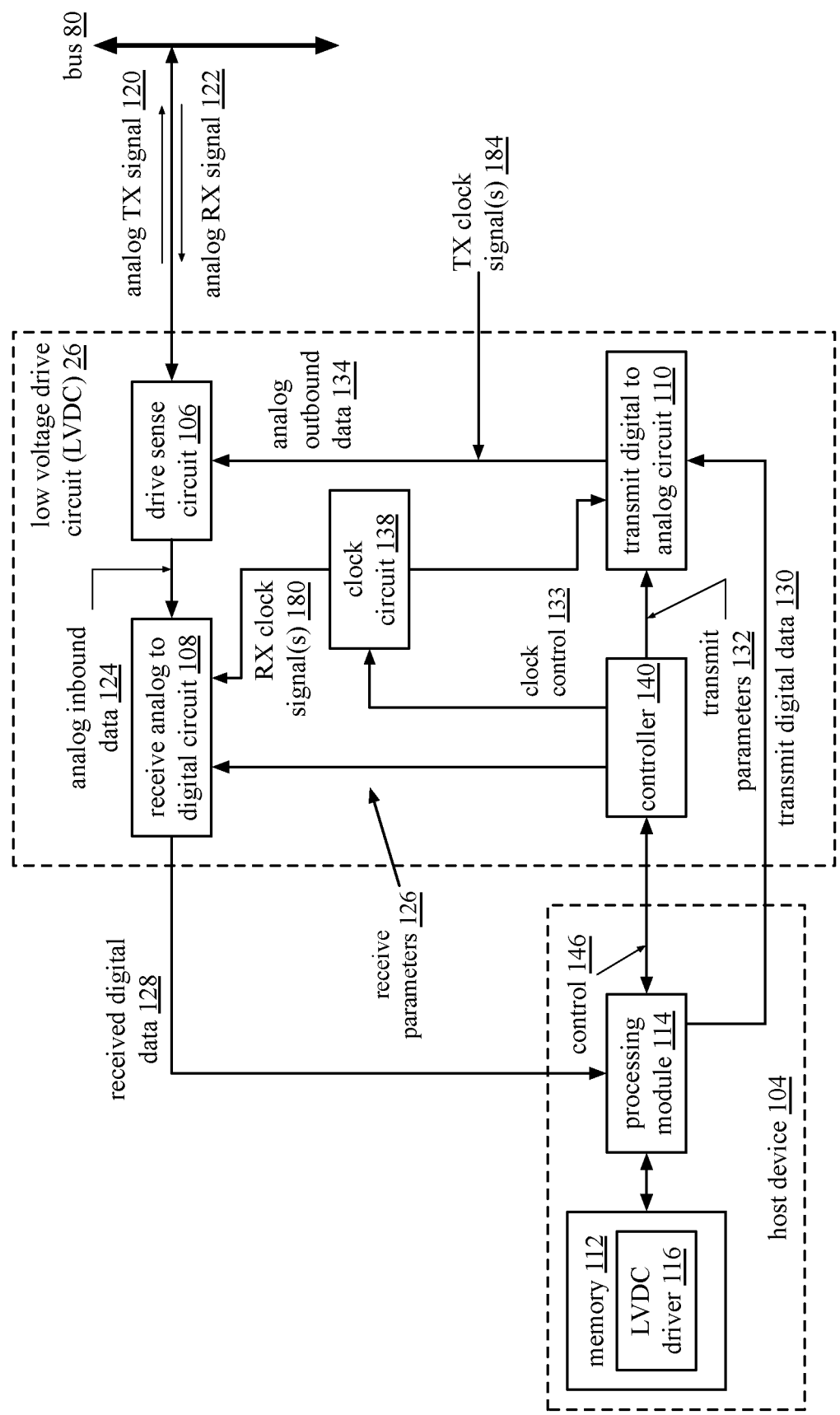
FIG. 14 is a schematic block diagram of another embodiment of a Low Voltage Drive Circuit (LVDC) coupled to a host device in accordance with the present invention.

FIG. 14 is a schematic block diagram of another embodiment of a Low Voltage Drive Circuit (LVDC) 26 coupled to a host device 104 and to one or more lines of a bus 80. The host device 104 includes a processing module 114 and memory 112 (e.g., volatile memory and/or non-volatile memory). The memory 116 stores at least part of an LVDC driver 116 application. The LVDC 26 includes a drive sense circuit 106, a receive analog to digital converter (ADC) circuit 108, a transmit digital to analog converter (DAC) circuit 110, a clock circuit 138, and a controller 140. The drive sense circuit 106, the receive ADC circuit 108, and the transmit DAC circuit 110 function as previously discussed with reference to FIG. 11.

In this embodiment, the processing module 104 of the host device 104 accesses the LVDC driver 116 to determine control information 146 to set up the LVDC 26 for operation. The processing module provides the control information 146 to the controller 140, which generates the receive parameters 126, the transmit parameters 132, and clock control signals 133 from the control information 146. In addition, the controller 140 determine one or more communication scheme parameters and/or one or more data conveyance scheme parameters based on the control information 140.

In an embodiment, the controller 140 is a processing module with associated memory. The memory (e.g., volatile and/or non-volatile) stores a plurality of look up tables: one for the communication parameters; a second for the data conveyance scheme parameters; a third for the transmit parameters 132; a fourth for the receive parameters 126; and a fifth for clock control parameters 133 (e.g., clock rate settings, duty cycle settings, etc.).

The clock circuit 138 is configured to create one or more transmit clock signals 184 and to create one or more receive clock signals 180 based on the clock control parameters, or information, 133. For example, the clock circuit 138 generates a first receive clock signal for outputting the receive digital data 128 to the host device 104 and a second receive clock for converting the analog inbound data 124 into digital inbound data. As another example, the clock circuit 138 generates a first transmit clock for receiving the transmit digital data 130 from the host device and a second transmit clock for converting the transmit digital data 130 into the analog outbound data 134.

Figure 15:
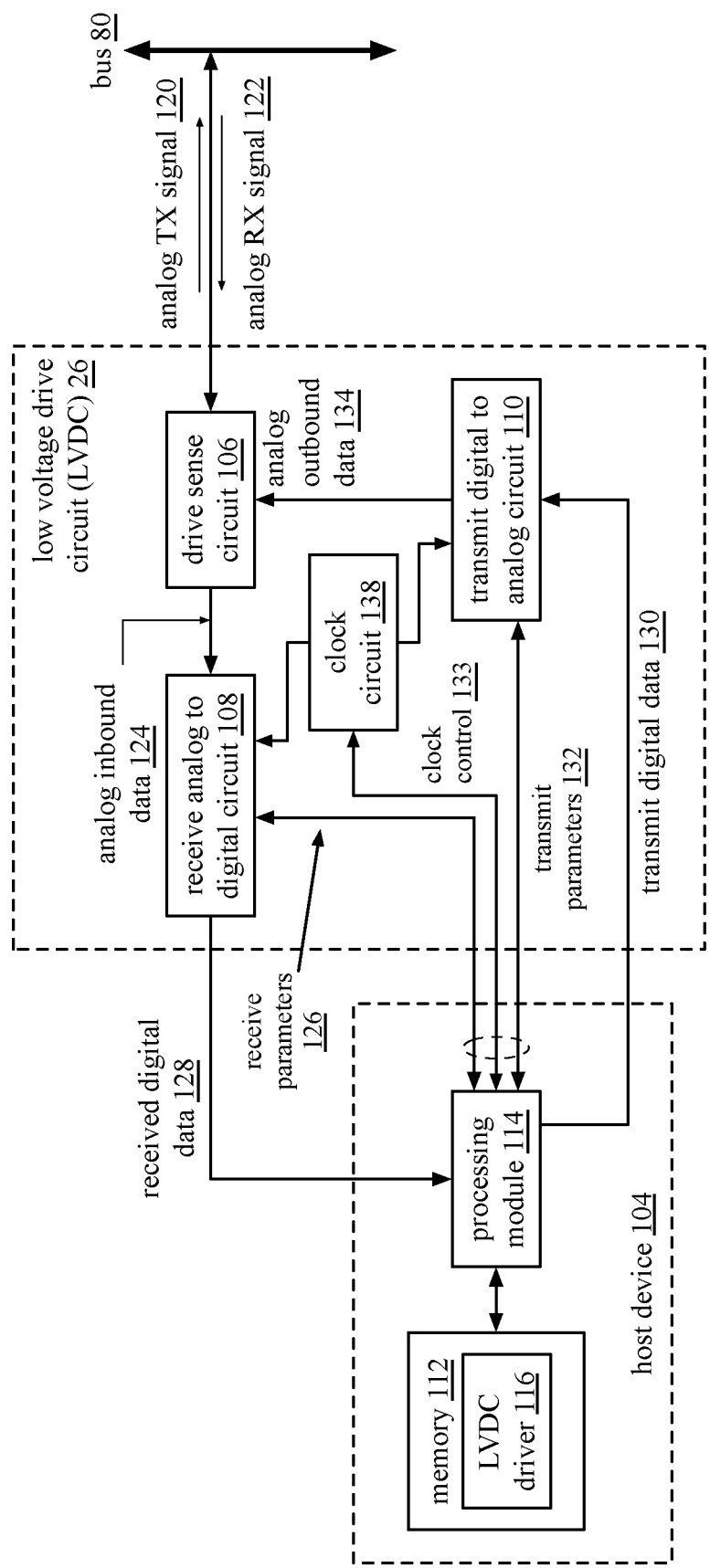
FIG. 15 is a schematic block diagram of another embodiment of a Low Voltage Drive Circuit (LVDC) coupled to a host device in accordance with the present invention.

FIG. 15 is a schematic block diagram of another embodiment of a Low Voltage Drive Circuit (LVDC) 26 coupled to a host device 104 and to one or more lines of a bus 80. This embodiment of the LVDC 26 is similar to that of FIG. 12 with the exception that this embodiment does not include the controller 140. As such, the processing module 114 generates the receive parameters 126, the clock control information 133, and the transmit parameters 132. The processing module 114 also generates the one or more communication scheme parameters and the one or more data conveyance scheme parameters.

Figure 16A:
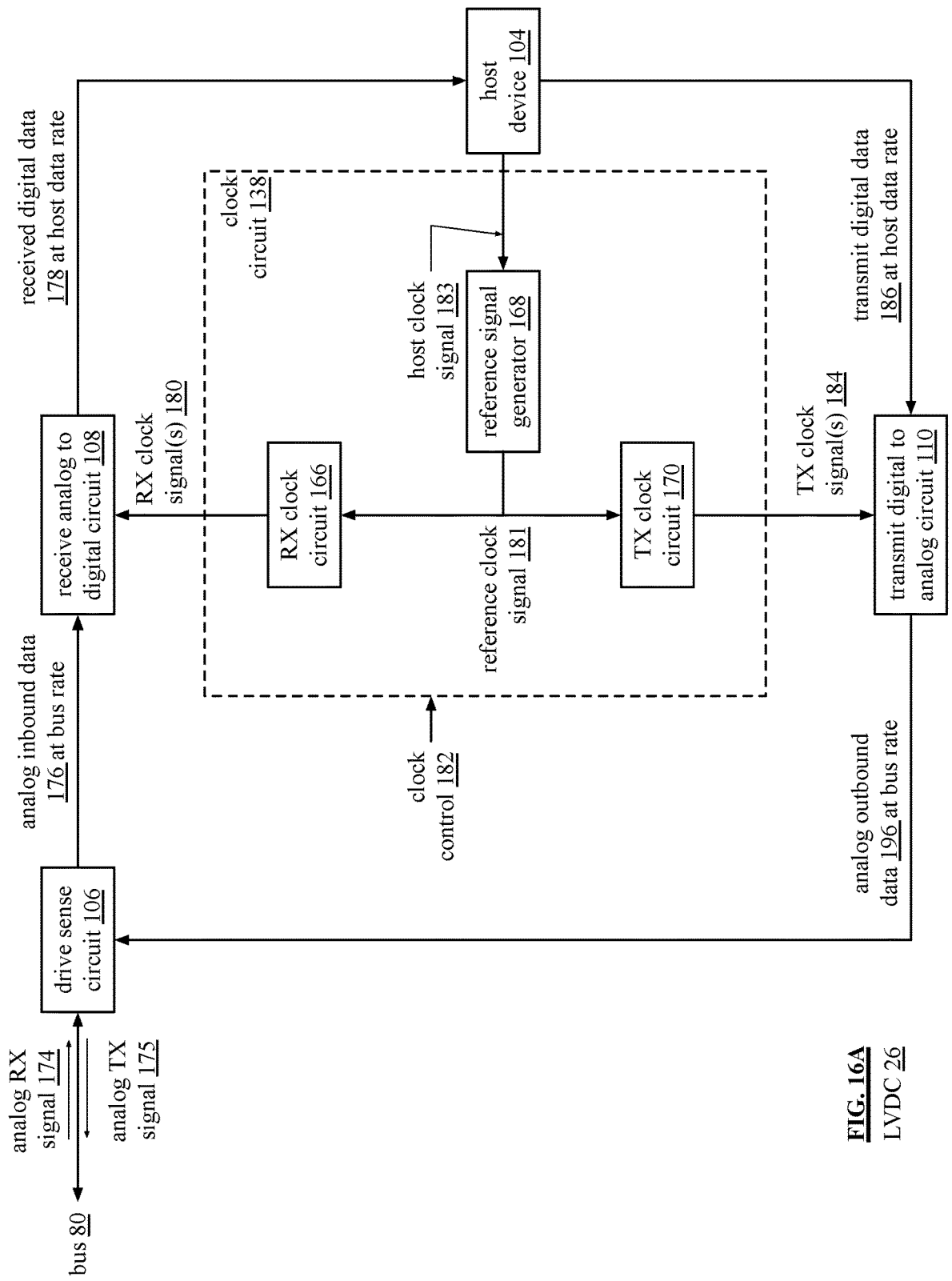
FIGS. 16A and 16B are schematic block diagrams of embodiments of a Low Voltage Drive Circuit (LVDC) coupled in accordance with the present invention.

FIG. 16A is a schematic block diagram of another embodiment of a Low Voltage Drive Circuit (LVDC) 26 coupled to a host device 104 and to one or more lines of a bus 80. The LVDC 26 includes a drive sense circuit 106, a receive analog to digital circuit 108, a transmit digital to analog circuit 110, and a clock circuit 138. The clock circuit 138 includes a reference signal generator 168, a receive (RX) clock circuit 166, and a transmit (TX) clock circuit 170. The reference signal generator 168 may be implemented in a variety of ways to produce a reference clock signal 181. For example, the reference signal generator 168 is a phase locked loop (PLL) with an input clock from the host device or from a crystal oscillator. As another example, the reference signal generator 168 is a digital frequency synthesizer. As yet another example, the reference signal generator 168 is an oscillator.

The transmit clock circuit 170 includes one or more of: one or more frequency dividers, one or more frequency multipliers, one or more phase shift circuits, and one or more PLLs to generate transmit clock signals 184 from the reference clock signal 181. For example, the host clock signal 183 is a 2.000 GHz clock. The reference signal generator 168 creates a reference clock signal 181 of 2.100 GHz from the host clock signal. The transmit clock circuit 170 generates a 2.000 GHz clock used by the signal generator 144 to receive the transmit digital data 186 from the host device 104 in sync with the host clock signal 183. The transmit clock circuit 170 also generates a 2.010 GHz clock signal for a transmit channel having a 2.010 GHz frequency. The transmit digital to analog circuit 110 uses the 2.010 GHz clock signal to generate the analog outbound data 196 to be in sync with a bus clock.

The receive clock circuit 166 also includes one or more of: one or more frequency dividers, one or more frequency multipliers, one or more phase shift circuits, and one or more PLLs to generate receive clock signals 180 from the reference clock signal 181. For example, the host clock signal 183 is a 2.000 GHz clock. The reference signal generator 168 creates a reference clock signal 181 of 2.100 GHz from the host clock signal. The receive clock circuit 166 generates a 2.020 GHz clock signal for a receive channel having a 2.020 GHz frequency. The digital output circuit 136 uses the 2.020 GHz clock signal to receive the analog inbound data 176 in sync with the bus clock. The receive clock circuit 166 also generates a 2.000 GHz clock used by the receive analog to digital circuit 108 to provide the received digital data 176 to the host device 104 in sync with the host clock signal 183.

Figure 16B:
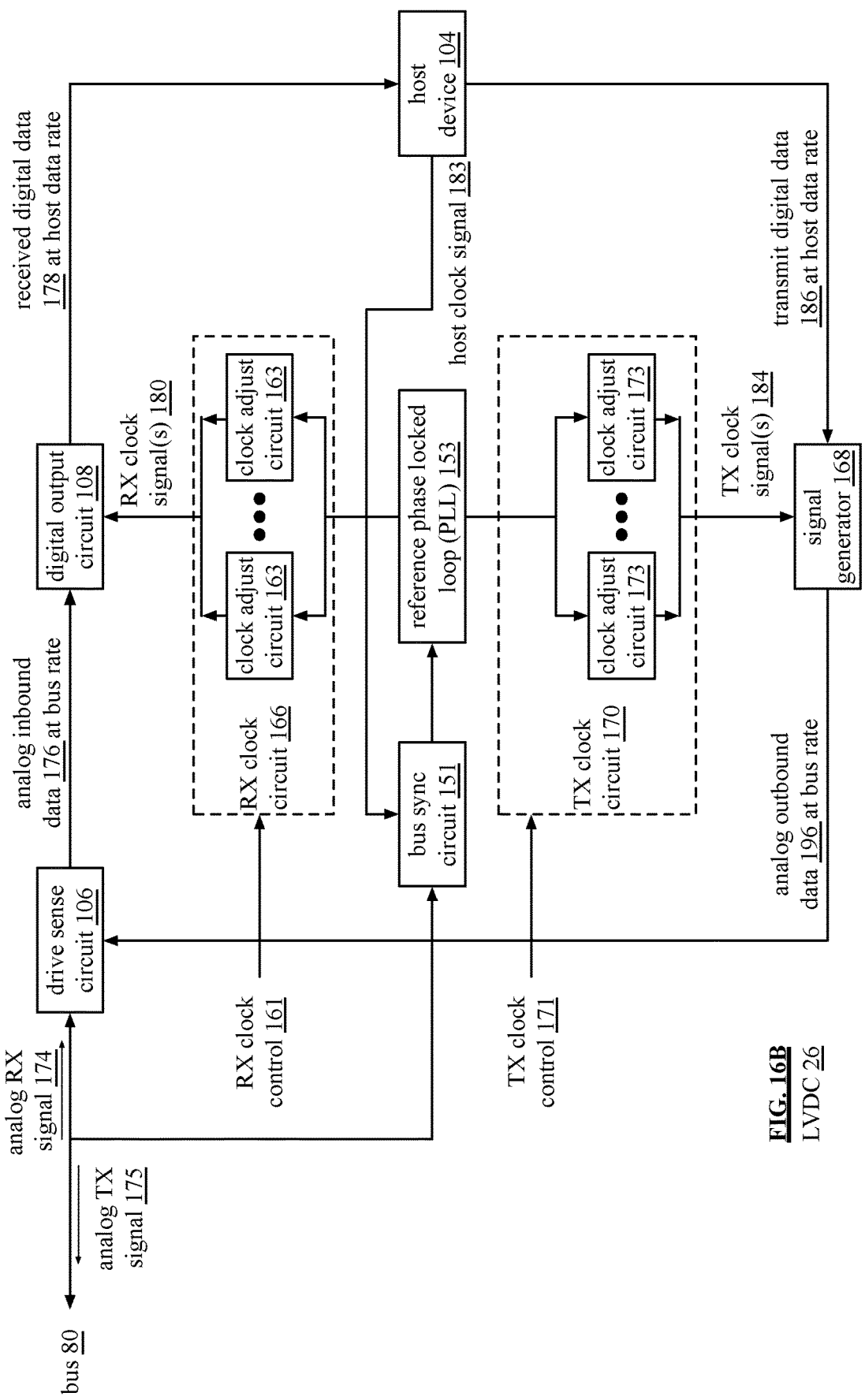

FIG. 16B is a schematic block diagram of another embodiment of the Low Voltage Drive Circuit (LVDC) 26 coupled to a host device 104 and to one or more lines of a bus 80. The LVDC 26 includes a drive sense circuit 106, a receive analog to digital circuit 108, a transmit signal generator 168, RX circuit 166 and TX clock circuit 170. The RX clock circuit 166 includes a plurality of clock adjust circuits, while the TX clock circuit 170 includes a plurality of clock adjust circuits and each of the RX clock circuit 166 and the TX clock circuit 170 is configured to receive the output of reference phase locked loop (PLL) 153. In an example, the bus sync circuit 151 utilizes signaling on the bus 80, along with a host clock signal 183 from host device 104 and derives timing information that is then provided to the PLL 153. The PLL 153 provides reference timing for the RX circuit 166 and the TX clock circuit 170. For example, RX clock circuit 166 receives a clock signal from the PLL 153 and uses the plurality of clocks adjust circuits 163 to output the RX clock signal(s) 180 to sync digital output circuit 108 to the bus rate for analog inbound data 176. Digital output circuit 108 is then able to convert analog inbound data 178 and output received digital data 178 at a data rate that can be utilized by host device 104. RX clock circuit 166 can utilize one or more clock adjust circuits 163 as needed to provide RX clock signal(s) 180 to digital output circuit 108. In practice, RX clock circuit 166 can use a plurality of clocks adjust circuits 163 to adjust the output of PLL 153 to enable digital output circuit 108 to output the converted analog inbound data 176 at the host data rate used by the host device 104.

In another example, TX clock circuit 170 uses a plurality of clocks adjust circuits 173 and outputs TX clock signal(s) 184 to signal generator 168. Signal generator 168 uses the TX clock signal(s) 184 to receive synchronize digital data 186 output by host device 104 and transmit analog outbound data 196 at bus rate for transmittal to drive sense circuit 106. In practice, TX clock circuit 171 can use a plurality of clock adjust circuits 173 to adjust the output of PLL 153 in order to enable digital output circuit 108 to output the converted analog inbound data 176 at the host data rate used by the host device 104. TX clock adjust circuit(s) 173 and clock adjust circuit(s) 163 can be configured to provide varying levels of adjustment, with the RX clock control 161 and/or TX clock control 171 configured to select one or more clock control circuits to provide adequate clock signals for synchronization.

In an example, analog RX signal 174, a sinusoidal waveform/signal on bus 80, is used as an input in bus sync circuit 151 along with host clock signal 183 to provide a reference signal to reference phase locked loop (PLL) 153, allowing PLL 153 to provide an output signal to each of the RX clock circuit 161 and TX clock circuit 171 whose phase is dependent on the signal received from bus sync circuit 151. Host clock signal 183 can be a sinusoidal waveform/signal derived from, for example, a crystal oscillator or a PLL associated with host device 104.

Figure 17:
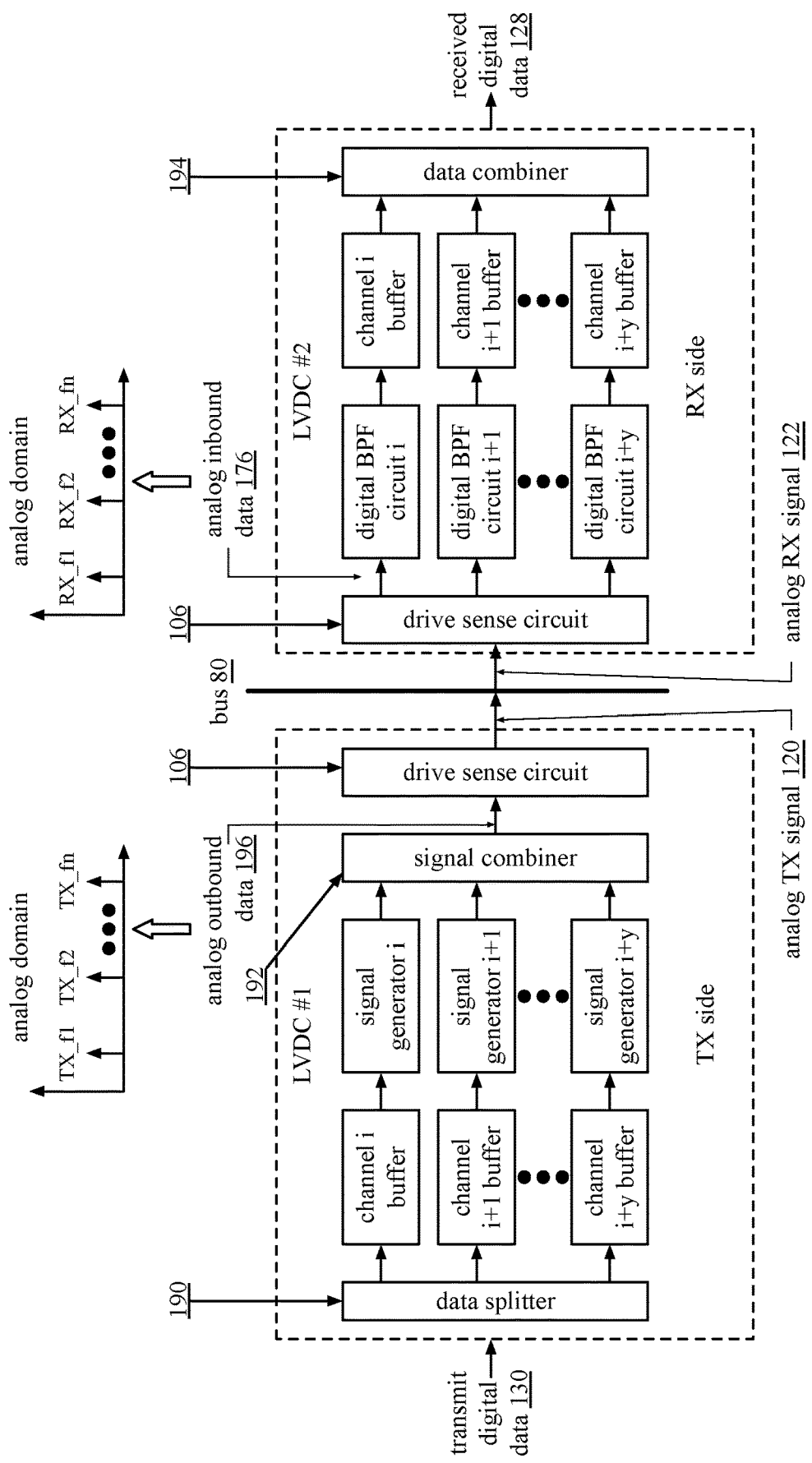
FIG. 17 is a schematic block diagram of an embodiment of a transmit side of one LVDC and a receive side of another Low Voltage Drive Circuit (LVDC) in accordance with the present invention.

FIG. 17 is a schematic block diagram of an embodiment of a transmit side of a first Low Voltage Drive Circuit (LVDC) coupled to a receive side of a second LVDC via one or more lines of a bus 80. The transmit side of the LVDC #1 includes a data splitter 190, a plurality of channel buffers (i through i+y), a plurality of signal generators (i through i+y), a signal combiner 192, and a drive sense circuit 106. With reference to FIGS. 11, and 14-16, the data splitter 190, the channel buffers (i through i+y), the signal generators (i through i+y), and the signal combiner 192 are included in the transmit digital to analog circuit 110.

The receive side of LVDC #2 includes a drive sense circuit 106, a plurality of digital bandpass filter circuits (BPF i through I+y), a plurality of channel buffers (i through i+y), and a data combiner 194. With reference to FIGS. 11, and 14-16, the digital bandpass filter circuits (BPF i through I+y), the channel buffers (i through i+y), and the data combiner 194 are included in the receive analog to digital circuit 108.

In an example, the data splitter 190 receives the transmit digital data 130 and divides it into a plurality of data streams. A corresponding channel buffer stores a data stream. For instance, channel buffer i stores data stream i; channel buffer i+1 stores data stream i+1, and so on. The data streams are written into the channel buffers in accordance with the host data rate. The data, however, is read out of the channel buffers in accordance with transmit clock rates for each of the signal generators. The transmit clocks corresponds to the frequency of the channel being used by a signal generator.

Each enabled signal generator uses a different channel to convert bits of its respective data stream into respective portions of the analog outbound data 196. For example, signal generator i uses channel 1, which has a first frequency (f1), signal generator i+1 uses channel 2, which has a second frequency (f2), and so on. Note that, one or more of the signal generators is activated to convert the transmit digital data 130 into the analog outbound data 196.

As a specific example, signal generator i converts n-bits of its data stream at a time into an analog signal component of the analog outbound data 196, where n is an integer greater than or equal to one. For an n-bit sample of its data stream, the signal generator encodes the n-bit sample into a sinusoidal signal having a frequency at f1 using amplitude shift keying (ASK) signal and/or a phase shift keying (PSK) signal. Signal generator i+1 functions similarly by encoding an n-bit sample of its data stream into a sinusoidal signal having a frequency at f2 using ASK and/or PSK.

The drive sense circuit 106 of the first LVDC converts the analog outbound data 196 into an analog transmit signal 120, which it transmits on to a line of the bus 80. The drive sense circuit 106 of the second LVDC receives it as an analog receive signal 122 and converts it into analog inbound data 176. As such, without conversion, transmission, or reception errors, the analog inbound data 176 is substantially identical to the analog outbound data 196.

Each digital bandpass filter (BPF) circuit includes an analog to digital converter and a digital bandpass filter. Each active digital BPF circuit receives the analog inbound data 176. In addition, each active digital BPF circuit is tuned for a different channel. For example, digital BPF circuit i is tune for frequency 1, digital BPF circuit i+1 is tuned for frequency 2, and so on. As such, digital BPF circuit i converts the analog inbound data into digital inbound data, filters it, and outputs the n-bit digital values corresponding to the data stream processed by signal generator i. Similarly, digital BPF circuit i+1 converts the analog inbound data into digital inbound data, filters it, and outputs the n-bit digital values corresponding to the data stream processed by signal generator i+1; and so on.

The channel buffers of the receive side of LVDC store the n-bit digital values outputted by their respective digital BPF circuits. The data combiner 194 retrieves data from the channel buffers and periodically outputs the received digital data 128. For example, a block of data is inputted into the data splitter 190 in accordance with a data rate of the host device (host 1) coupled to the first LVDC. As a specific simplified example, assume the data block includes 24-bits and is clocked into the data splitter serially over 24 intervals of a data clock of host 1. Further assume that the 24-bits are divided into three data streams, each 8-bits. As such, three paths will be activated between the data splitter 190 of LVDC #1 and the data combiner 194 of LVDC #2.

Each activated path operates independent of the other paths and at different rates to process their respective data streams of the data block. For example, the first path (e.g., signal generator i through digital BPF circuit i) operates in accordance with frequency f1, which is at slightly higher frequency than that of the data rate of host 1; the second path (e.g., signal generator i+1 through digital BPF circuit i+1) operates in accordance with frequency f2, which is at slightly higher frequency than that of frequency f1; and the third path (e.g., signal generator i+2 through digital BPF circuit i+2) operates in accordance with frequency f3, which is at slightly higher frequency than that of frequency f2.

Continuing with the simplified example, further assume that the data clock of host 1 is 1.000 GHz for a 125 Mega Byte per second (MBps) data rate, which corresponds to a 1 Gbps data rate; data is provided to the data splitter a byte at a time; frequency f1 is at 1.010 GHz, frequency f2 is at 1.020 GHz, and frequency f2 is at 1.030 GHz. There are a variety of ways the data splitter 190 can divide the data and put it into the channel buffers. For example, the data splitter 190 uses a bit-by-bit round robin distribution.

As data is put into the channel buffers on the transmit side, the signal generates begin to process them. In this example, a bit at a time. Since signal generator i+2 is operating at a rate that is faster than the other two signal generates, it will finish processes its 8-bits slightly before the others. As such, digital BPF circuit i+2 will finish recovering the 8-bits of data slightly before the other digital BPF circuits. The timing difference is compensated for by the buffers on each end such that, as 24-bits goes into the transmitting LVDC at the rate of the first host device, the same 24-bits will come out of the receiving LVDC at the rate of the host device of the second LVDC.

Figure 18:
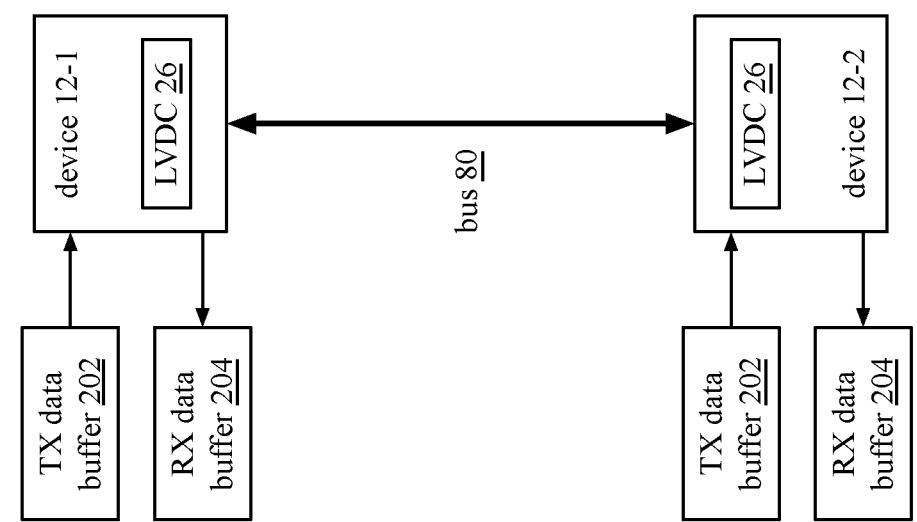
FIG. 18 is a schematic block diagram of another embodiment of a peripheral a Low Voltage Drive Circuit (LVDC) in accordance with the present invention.

FIG. 18 is a schematic block diagram of another embodiment of a peripheral Low Voltage Drive Circuit (LVDC) module (such as, for example, peripheral LVDC module 34 of FIG. 6) of a computing device coupled to another computing device. Each of the computing devices includes an LVDC 26 coupled to one or more lines of a bus 80, which can be fixed or variable between computing devices 12-1 and 12-2, depending on system configuration. Devices 12-1 and 12-2 can be one or more devices from a list that includes a die of an integrated circuit (IC), an integrated circuit (IC), a printed circuit board with components mounted thereon, a sub-system of a plurality of printed circuit boards and functional blocks in an SOC. Additionally, devices 12-1 and 12-2 can be modules or portions of modules, such as the network LVDC module(s) 60, peripheral LVDC module(s) 34, memory LVDC module(s) 62, wireless LVDC module(s) 61, input LVDC module(s) 56, and output LVDC module(s) 58 of FIGS. 3 and 4. Each of devices 12-1 and 12-2 can include one or more transmit (TX) data buffers 202 and receive (RX) data buffers 204.

In an embodiment, each of devices 12-1 and 12-2 can include the host device 104, memory 112, LVDC driver 116 of FIG. 11, as well as processing module 114 of FIGS. 12 and 14 (not shown). Additionally (or alternatively, as relevant), each device 12-1 and 12-2 can include processing module 86 and/or memory 84 of FIG. 8. In an embodiment, flow control of TX data buffers 202 and RX data buffers 204 can be regulated by one or more processors associated with device 12-1 or 12-2 (such as processing module 114 of host device 104 or processing module 86 og FIGS. 8 and 11) to adjust the transmit and/or receive communication parameters between devices 12-1 and 12-2.

In an example, communication between devices 12-1 and 12-2 can be initiated based on a system power up, system reset, or system enable of one or both of devices 12-1 and 12-2. In a specific example of operation and implementation, an initiation or handshake commences when one or more RX sections of device 12-1 is enabled by the associated processing module to receive signals over a dedicated control channel on bus 80. In an example the processing module triggers a randomly generated delay to listen for a message from another device on the control channel. Alternatively, the delay can be predetermined or can be calculated based on system priorities. Prior to expiration of the delay, device 12-1, in this example, receives a response message from the other device (device 12-2 in this example) indicating that device 12-2 is available. For example, the message may be the equivalent of an indicator of device 12-2 signaling "I am here". If no message is received prior to expiration of the randomly generated delay, device 12-1 can transmit a message that it is available and then wait for a determined time period for a response from device 12-2.

If a response message is not received within the determined time period, device 12-1 can retry the initiation as indicated above for a determined number of times until a response is received. If no response is received at device 12-1 after more than the determined number of initiation attempts a connection error can be indicated. The determined number of retry attempts can be, for example, predetermined or may be calculated based on system priorities.

When a response message is received from device 12-2, one of device 12-1 or 12-2 can progress to another phase of connection set-up. In a specific example of operation and implementation, device 12-1 can be designated to set-up communication parameters over bus 80 after receiving a message response from device 12-2. In another example the first device to indicate availability can be designated for communication set-up. For example, device 12-2 transmits an availability message that is received by device 12-1 during the delay time period; in this case device 12-2 can set-up communication parameters once it receives a response message from device 12-1.

Communication parameters can include, for example, whether communication will be in full-duplex mode per line using multiple channels or in a half-duplex mode per line using a single channel. Other communication parameters include a data conveyance scheme and/or parameter, such as a number of channels available for communication and an assignment of particular communication channels for each of devices 12-1 and 12-2. When half-duplex mode is determined, each channel will be used for both transmit and receive for a given device in a time divided manner. For example, where half-duplex mode is indicated device 12-1 will be designated to receive only during a given time period, after which it will transmit only during the following time period. The allocated time divisions can be symmetric, where each device is given an equal amount of transmit and receive time, or asymmetric, depending on system needs and/or configuration.

Figure 19:
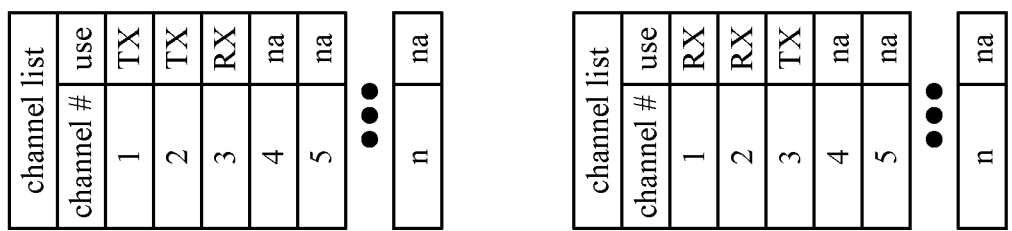
FIG. 19 is an example of a look-up table or list that can be used by a device responsible for communication set-up in accordance with the present invention.

FIG. 19 is an example of a look-up table or list that can be used by a device responsible for communication set-up, to assign channel numbers 1-n to each of device 12-1 and 12-2 operating in full-duplex mode. In a specific example of operation and implementation, specific channels designated to transmit on device 12-1 are designated for receive only on device 12-2. In an example channels 1-n are frequency-based channels on a single line bus 80, in another example channels 1-n are divided between a plurality of bus lines available on bus 80.

Figure 20:
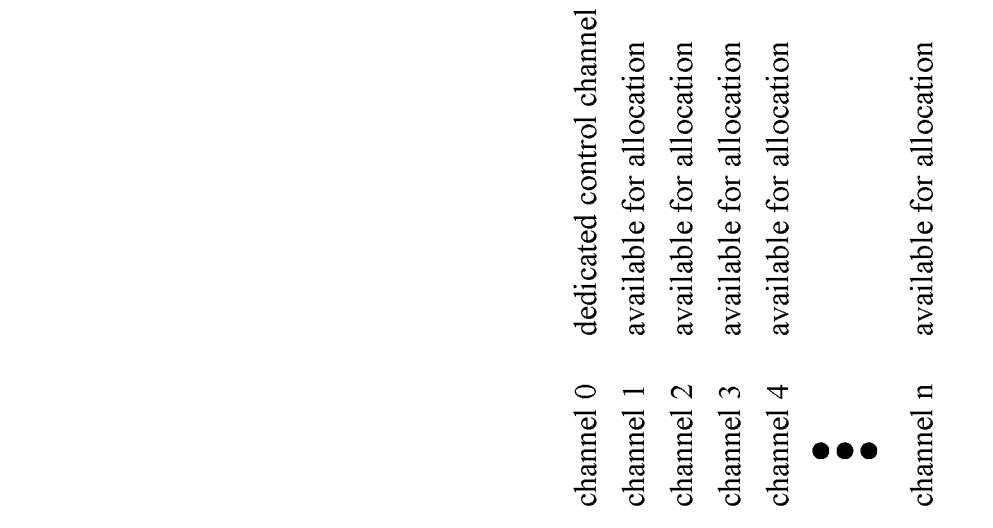
FIG. 20 is an example of a channel allocation table available to a device for communication set-up in accordance with the present invention.

FIG. 20 is an example of a channel allocation table for communication between Low Voltage Drive Circuits (LVDCs). In the example channel 0 is predetermined as a control channel and channels 1-n are available to the device(s) for allocation in communication. The channel allocation table may be implemented in a variety of ways. For example, a single channel allocation table includes the channel allocations for each line of a bus. As an alternative example, a separate channel allocation table exists for each line on the bus. As a further example, each processing entity maintains a copy of the channel allocation table(s). In yet another example, the processing entities share a global version of the channel allocation table(s).

Figure 21:
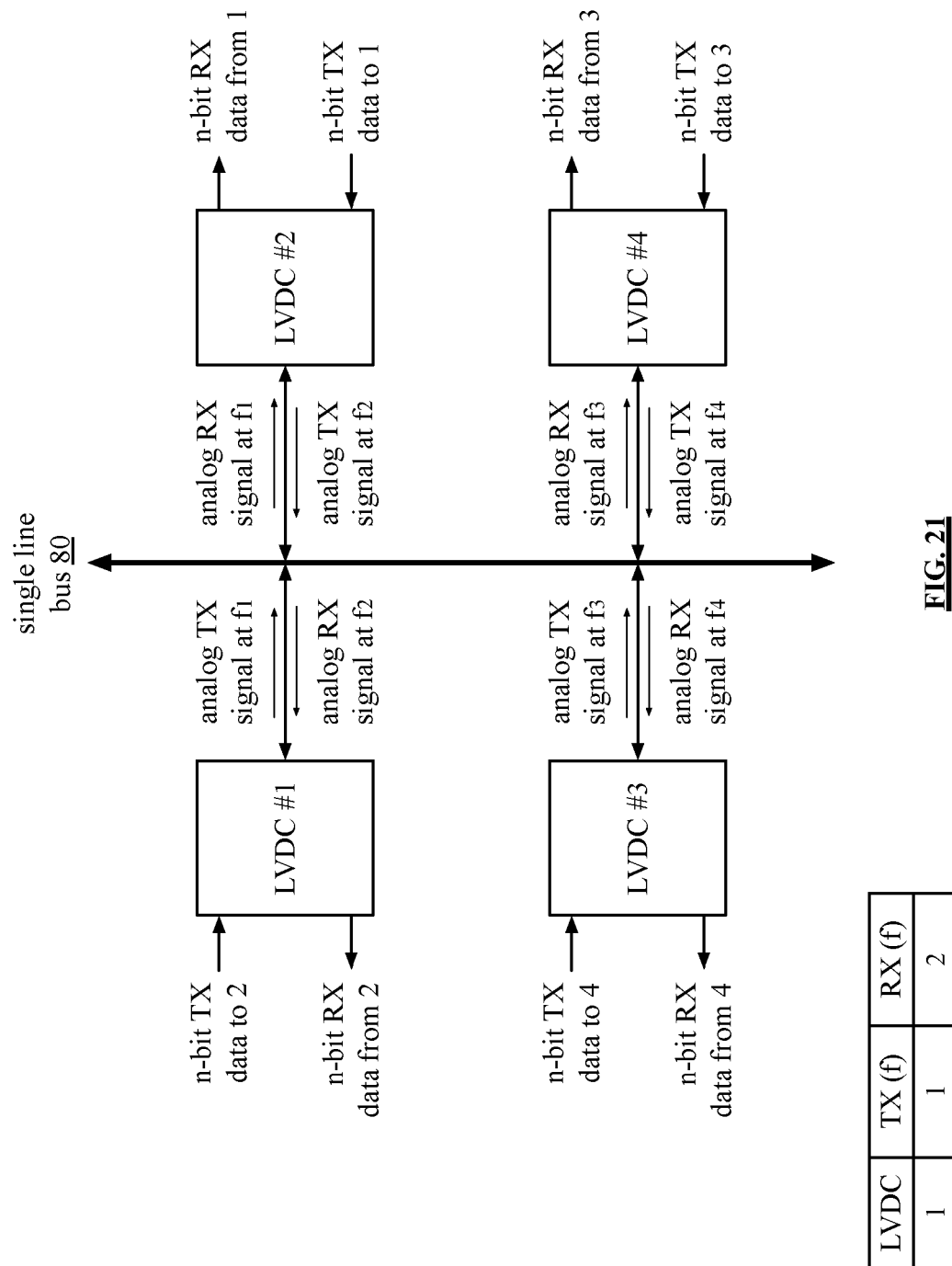
FIG. 21 is a schematic block diagram of an embodiment of one-to-one communications between Low Voltage Drive Circuits (LVDCs) on a single line of a bus in accordance with the present invention.

FIG. 21 is a schematic block diagram of an embodiment of one-to-one communications between Low Voltage Drive Circuits (LVDCs) on a single line of a bus 80. In this example, LVDC 1 and LVDC 2 are engaged in a one-to-one communication and LVDC 3 and LVDC 4 are engaged in a one-to-one communication on a common single line of the bus 80. Each of the LVDCs 1-4 are associated with its own host device, which was previously discussed with reference to one or more of FIGS. 2-8, 11, 14, and 15.

To support the one-to-one communication between LVDC 1 and 2, LVDC 1 is allocation channel (f1) for its transmissions to LVDC 2 and LVCD 2 is allocated channel (f2) for its transmissions to LVDC 1. Similarly, to support the one-to-one communication between LVDC 3 and 4, LVDC 3 is allocation channel (f3) for its transmissions to LVDC 4 and LVCD 4 is allocated channel (f4) for its transmissions to LVDC 3.

As an example of operation, the transmit digital to analog circuit 110 of LVDC 1 converts n-bit transmit (TX) data per data clock cycle of a host device into analog outbound data and the drive sense circuit of LVDC 1 converts the analog outbound data into an analog TX signal on channel (f1). For example, the n-bit TX data is 1-bit data at a data clock rate of 1 GHz, thus the data rate is 1 Giga-bit-per-second (Gbps). LVDC 1 encodes the 1-bit data at 1 Gbps into a sinusoidal signal (or other type of oscillating signal waveform such as a square wave, sawtooth, triangular, etc.) at frequency f1 to produce the analog TX signal on channel f1. The 1-bit data may be encoded into the sinusoidal signal in several ways. For example, the 1-bit data is directly encoded into one or more cycles of the sinusoidal signal using amplitude shift keying (ASK) and/or phase shift keying (PSK). As another example, the 1-bit data is converted into an analog signal that is up-converted by a local oscillation having a frequency at f1 to produce the analog TX signal.

The drive sense circuit 106 of LVDC 1 transmits the analog TX signal at f1 on the single line of the bus 80. Each of the other LVDCs 2-4 receive the analog TX signal at f1 but only LVDC 2 is tuned to process the analog TX signal at f1 as an analog RX signal at f1. In particular, the receive analog to digital circuit 108 of LVDC 2 is tuned to process received signals on channel f1, which corresponds to the analog TX signal at f1. The receive analog to digital circuit 108 of LVDC 3 is tuned to process signals on channel f4 and the receive analog to digital circuit 108 of LVDC 4 is tuned to process signals on channel f3. The receive analog to digital circuit 108 of LVDC 2 converts the analog RX signal at f1 into an n-bit of data per data clock interval of the host device associated with LVDC 2.

Similarly, the transmit digital to analog circuit 110 of LVDC 2 converts its n-bit transmit (TX) data input (e.g., n-bits of data per data clock cycle of its associated host device) into analog outbound data. The drive sense circuit of LVDC 2 converts the analog outbound data into an analog TX signal on channel (f2) and transmits the resulting signal on to the line of the bus 80. Each of the other LVDCs 1, 3, and 4 receive the analog TX signal at f2, but only LVCD 1 is tuned to process the analog TX signal at f2 as an analog RX signal at f2 to produce n-bit RX of data per data clock cycle of its associated host device.

The one-to-one communication between LVCD 3 and 4 operates similarly to the one-to-one communication between LVDC 1 and 2. The allocation of channel 1 to LVDC 1, channel 2 to LVDC 2, channel 3 to LVDC 3, and channel 4 to LVDC 4 may be done in several ways. For example, a channel is allocated to an LVDC on a permanent basis (e.g., a channel is allocated to the LVDC regardless of whether its host device is enabled or not). As another example, a channel is allocated to an LVDC when its host device has data to transmit. As yet another example, a channel is allocated to an LVDC while its host device is enabled.

Figure 22:
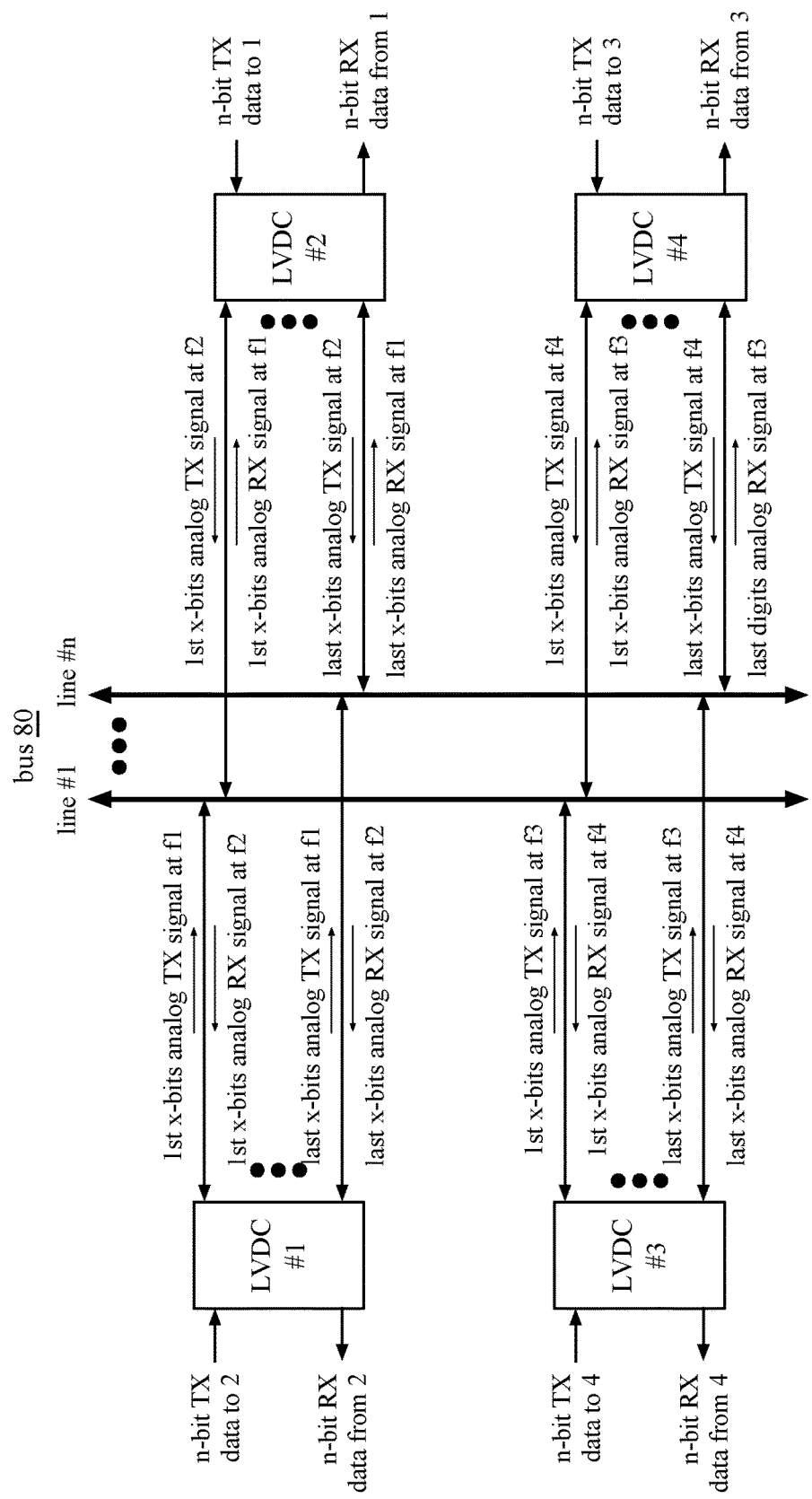
FIG. 22 is a schematic block diagram of an example of multiple Low Voltage Drive Circuits (LVDCs) coupled directly via multi-line bus in accordance with the present invention.

FIG. 22 is a schematic block diagram of an embodiment of one-to-one communications between Low Voltage Drive Circuits (LVDCs) on multiple lines of a bus 80. In this example, the bus 80 includes "n" lines, wherein "n" is an integer greater than or equal to 2. As in the example of FIG. 21, LVDCs 1 and 2 are engaged in a one-to-one communication and LVDCs 3 and 4 are engaged in a one-to-one communication. In this example, however, the LVCDs are transmitting and receiving data via multiple lines of the bus, which increases the data rate conveyance between the LVDCs.

As an example of operation, LVCD 1 has n-bits of data per data clock cycle of its associated host device to transmit to LVDC 2. LVDC 1 divides the n-bits of data into a number of streams of data, where the number corresponds to the number of lines of the bus being used for transmitting the data. For example, assume 4 lines of the bus are being used, where the bus includes 4 or more lines. As such, the n-bits of data per data clock cycle is divided into 4 x-bits of data per clock cycle, where x is an integer greater than or equal to 1. Thus, if x=2, then n=8 such that 8-bits per data clock cycle is being transmitted.

In this specific example, LVDC 1 includes four digital to analog transmit (DAC TX) circuits and four drive sense circuits. A first DAC TX circuit processing the first x-bits of data, a second first DAC TX circuit processing the second x-bits of data, a third DAC TX circuit processing the third x-bits of data, and a fourth DAC TX circuit processing the fourth x-bits of data. Each DAC TX circuit of LVDC 1 produces analog outbound data. Each of the corresponding drive sense circuits of LVDC 1 converts the respective analog outbound data into analog TX signal at f1, which is drives on to a respective one of the lines of the bus 80. In particular, the first drive sense circuit drives the first analog TX signal at f1 on to a first line of the bus, the second drive sense circuit drives the second analog TX signal at f1 on to a second line of the bus, the third drive sense circuit drives the third analog TX signal at f1 on to a third line of the bus, and the fourth drive sense circuit drives the fourth analog TX signal at f1 on to a fourth line of the bus.

Continuing with this example, LVDC 2 includes four drive sense circuits and four analog to digital receive (ADC RX) circuits. The first drive sense circuit receives, as a first analog RX signal at f1, the first analog TX signal at f1 from a first line of the bus, the second drive sense circuit receives, as a second analog RX signal at f1, the second analog TX signal at f1 from a second line of the bus, and so on. Each of the drive sense circuits also receives the corresponding analog TX signal at f3 from LVDC 3 and the corresponding analog TX signal at f4 from LVDC 4. Accordingly, each drive sense circuit converts the analog RX signals at f1, f3, and f4 into inbound analog data, which has an inbound analog data component from LVDC 1, an inbound analog data component from LVDC 3, and an inbound analog data component from LVDC 4.

The corresponding ADC RX circuits of LVDC 2 are tuned to process the inbound analog data component from LVDC 1 and ignore the inbound analog data components from LVDC 3 and 4. As such, each of the corresponding ADC RX circuits of LVDC 2 converts its respective inbound analog data component from LVDC 1 into x-bits of data per data clock cycle of the host device associated with LVDC 2. In particular, the first ADC RX circuit produces the first x-bits of data, the second ADC RX circuit produces the second x-bits of data, the third ADC RX circuit produces the third x-bits of data, and the fourth ADC RX circuit produces the fourth x-bits of data. The LVDC combines the four x-bits of data into the n-bits of data from the first LVDC; which is done per data clock cycle of the host device associated with the second LVDC.

LVDC 2 communicates its n-bits of data per data clock cycle to LVDC 1 in a similar manner. The one-to-one communication between LVDC 3 and LVDC 4 is performed in a similar is a schematic block diagram of an embodiment of a one-to-many communication between Low Voltage Drive Circuits (LVDCs) on multiple lines of a bus 80. In this example, the bus 80 includes "n" lines, wherein "n" is an integer greater than or equal to 2. As in the example of FIG. 23, LVDC 1 is engaged in a one-to-many and many-to-one communication with LVDCs 2-4. In this example, however, the LVCDs are transmitting and receiving data via multiple lines of the bus, which increases the data rate conveyance between the LVDCs.

For example, LVDC 1 converts n-bits of TX data per data clock interval into an analog TX signal at f1. LVDC 1 transmits the analog TX signal at f1 to LVDCs 2-4 via the lines of the bus. LVDC 1 transmits a first x-bits of the n-bits of the TX data in a first analog TX signal transmitted on a first line of the bus, transmits a second x-bits of the n-bits of the TX data in a second analog TX signal transmitted on a second line of the bus, and so on until the last x-bits are transmitted on the last line of bus being used. As an example, if "n" is 16 and "x" is 2, then there are eight lines of the bus being used.

The receive section of each of LVDCs 2-4 receive the first through last x-bits analog TX signals from LVDC 1 as first through last x-bits analog RX signal at f1. The receive sections convert each of the first through last x-bits analog RX signals at f1 into first through last x-bits of RX data from LVDC 1. The receive sections then combine the first through last x-bits of RX data from LVDC 1 to produce n-bits of RX data from LVDC 1 per data clock interval.

Each of LVDCs 2-4 transmits sections converts n-bits of its TX data per data clock interval to LVDC 1 into first through last x-bits of TX data. The transmit sections convert the first through last x-bits of TX data into first through last x-bits analog TX signals at f2, f3, and f4, respectively. The transmit sections then transmit the first through last x-bits analog TX signals at f2, f3, and f4, respectively, on the lines of the bus.

The receive section of LVDC 1 receives the first through last x-bits analog TX signals at f2, f3, and f4 from LVDCs 2-4 as first through last x-bits analog RX signals at f2, f3, and f4. The receive section converts each of the first through last x-bits of each of the analog RX signals at f2, f3, and f4 into first through last x-bits of RX data from LVDCs, 2-4. The receive section then combines the first through last x-bits of RX data from LVDC 2 to produce n-bits of RX data from LVDC 2 per data clock interval; combines the first through last x-bits of RX data from LVDC 3 to produce n-bits of RX data from LVDC 3 per data clock interval, and combines the first through last x-bits of RX data from LVDC 4 to produce n-bits of RX data from LVDC 4 per data clock interval.

As a specific example, LVDC 1 is affiliated with a data processing host and LVDCs 2-4 are each affiliated with data collecting hosts. On a periodic basis, the data processing host requests, via LVDC 1, that the data collecting hosts send its recently collected data to the data processing host. In response to the requests, each of the data collecting hosts send their respective data, via LVDCs 2-4, to the data processing host, via LVDC 1.

Figure 23:
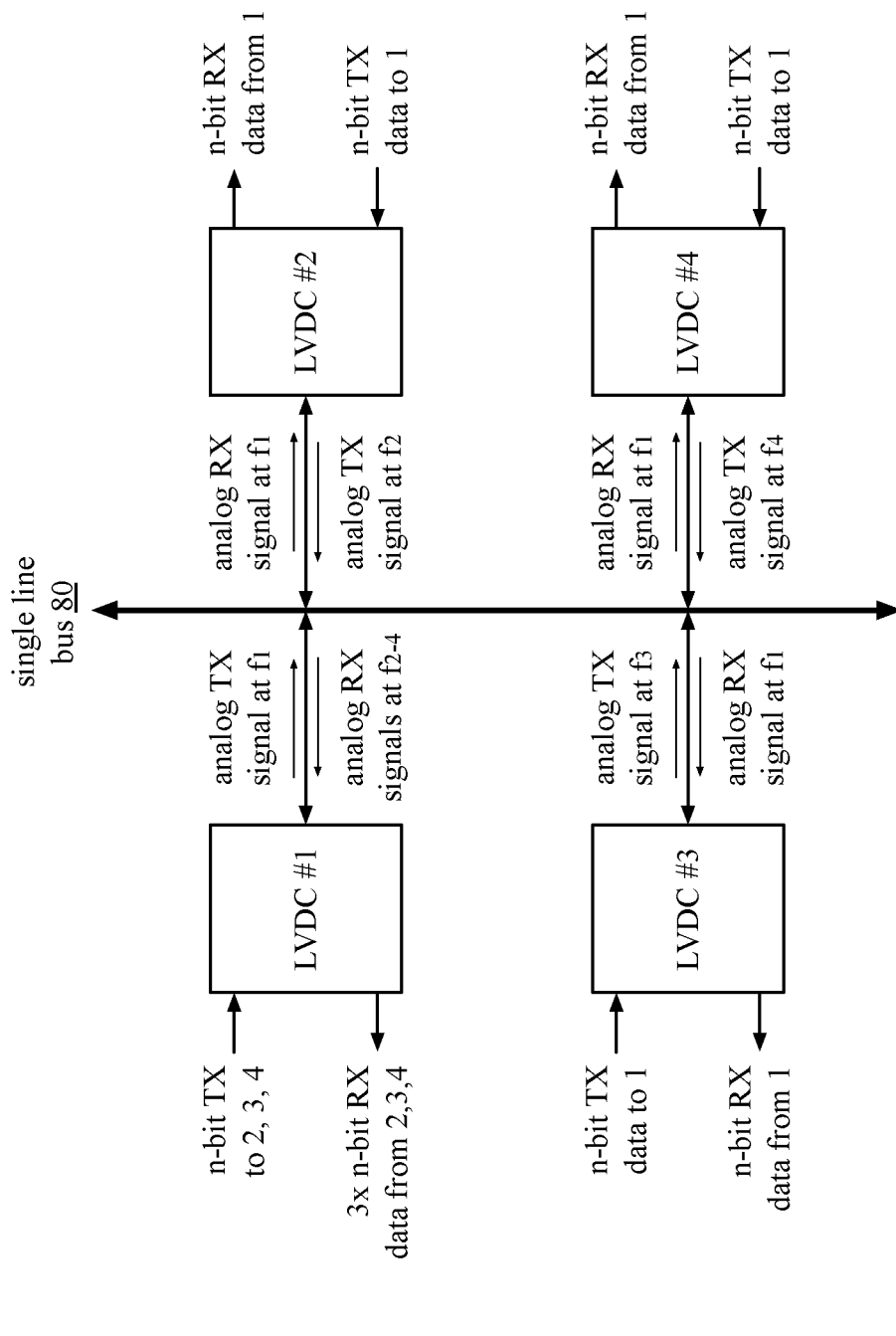
FIG. 23 is a schematic block diagram of an example of a Low Voltage Drive Circuit (LVDC) coupled to multiple Low Voltage Drive Circuits (LVDCs) on a single line bus in accordance with the present invention.

In each of the examples using multiple lines of a bus, each LVDC includes a number of drive sense circuits, receive analog to digital circuits, and transmit digital to analog circuits that is equal to or greater than the number of lines of the bus being used. For example, if 8 lines of the bus are being used, then each LVDC coupled to the bus includes 8, or more, of each of the drive sense circuits, receive analog to digital circuits, and transmit digital to analog circuits FIG. 23 is a schematic block diagram of an embodiment of one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts n-bits (1 or more) of transmit (TX) data per data clock interval into an analog TX signal at f1 and transmits it on channel f1 of a line the bus 80 to each of LVDCs 2, 3, and 4. The receive section of each of LVDCs 2, 3, and 4 are tuned to process the analog TX signal at f1 as an analog RX signal at f1 and recover the n-bits of TX data per data clock interval.

LVDC 2 converts n-bits of TX data destined for LVDC 1 into an analog TX signal f2 and transmits it on channel f2 of a line of the bus 80. Similarly, LVDC 3 converts n-bits of TX data destined for LVDC 1 into an analog TX signal f3 and transmits it on channel f3 of a line of the bus 80 and LVDC 4 converts n-bits of TX data destined for LVDC 1 into an analog TX signal f4 and transmits it on channel f4 of a line of the bus 80.

All of the LVCDs receive the analog TX signals f2-f4 as analog RX signals f2-f4 via the line of the bus 80, but only LVDC 1's receive section is tuned to process the analog RX signals f2-f4. For instance, LVDC 1 recovers the n-bits of TX data per data clock cycle of LVDC 2 from analog RX signal at f2; recovers the n-bits of TX data per data clock cycle of LVDC 3 from analog RX signal at f3; and recovers the n-bits of TX data per data clock cycle of LVDC 4 from analog RX signal at f4. In this embodiment, communication is generally set up as a broadcast from LVDC 1 to the other LVDCs and each of the other LVDCs individually communication with LVDC 1 (e.g., respond to the broadcast communication).

Figure 24:
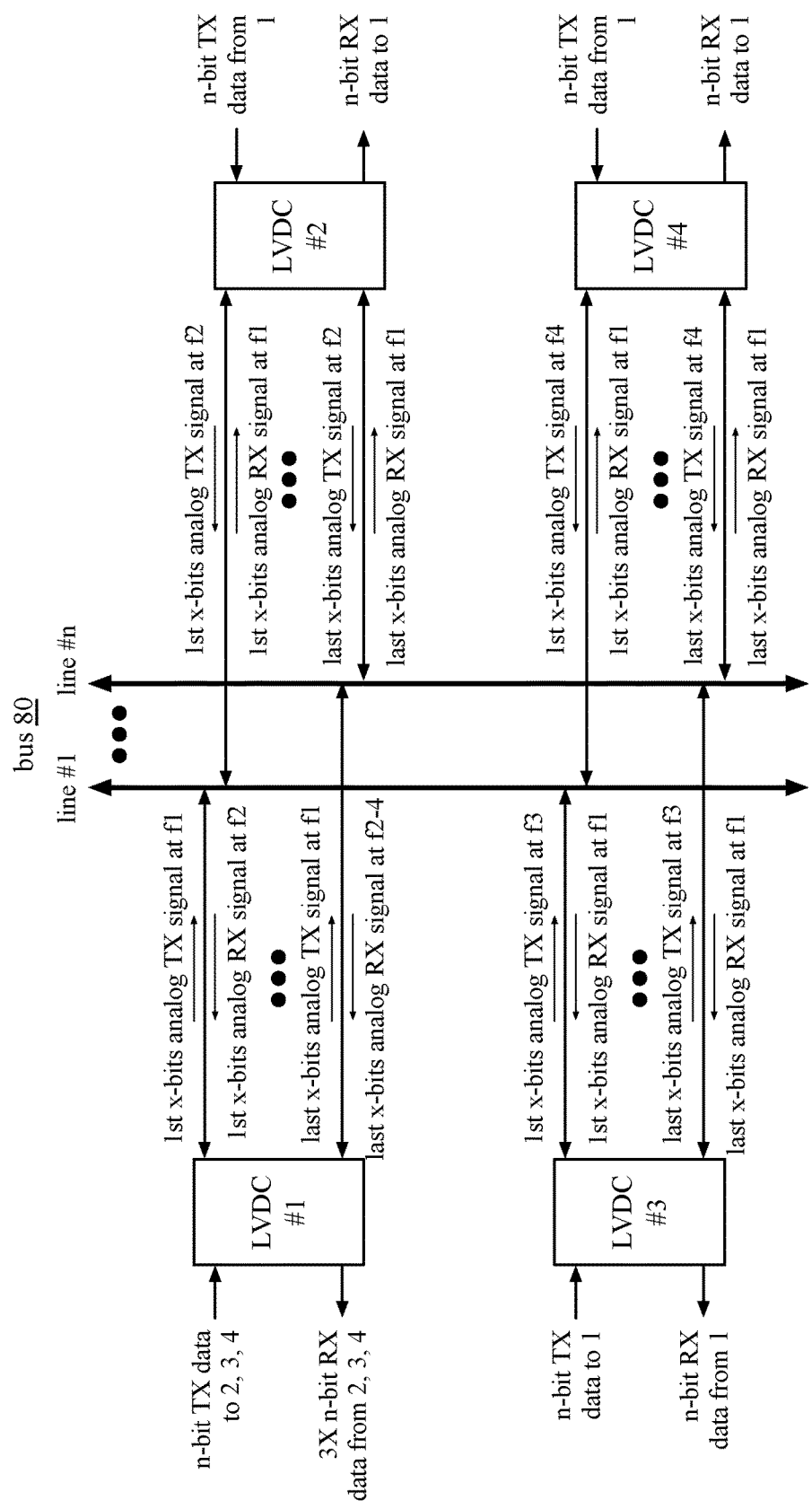
FIG. 24 is a schematic block diagram of an example of a Low Voltage Drive Circuit (LVDC) coupled to multiple LVDCs on a multi-line bus in accordance with the present invention.

FIG. 24 is a schematic block diagram of an embodiment of a one-to-many communication between Low Voltage Drive Circuits (LVDCs) on multiple lines of a bus 80. In this example, the bus 80 includes "n" lines, wherein "n" is an integer greater than or equal to 2. As in the example of FIG. 23, LVDC 1 is engaged in a one-to-many and many-to-one communication with LVDCs 2-4. In this example, however, the LVCDs are transmitting and receiving data via multiple lines of the bus, which increases the data rate conveyance between the LVDCs.

For example, LVDC 1 converts n-bits of TX data per data clock interval into an analog TX signal at f1. LVDC 1 transmits the analog TX signal at f1 to LVDCs 2-4 via the lines of the bus. LVDC 1 transmits a first x-bits of the n-bits of the TX data in a first analog TX signal transmitted on a first line of the bus, transmits a second x-bits of the n-bits of the TX data in a second analog TX signal transmitted on a second line of the bus, and so on until the last x-bits are transmitted on the last line of bus being used. As an example, if "n" is 16 and "x" is 2, then there are eight lines of the bus being used.

The receive section of each of LVDCs 2-4 receive the first through last x-bits analog TX signals from LVDC 1 as first through last x-bits analog RX signal at f1. The receive sections convert each of the first through last x-bits analog RX signals at f1 into first through last x-bits of RX data from LVDC 1. The receive sections then combine the first through last x-bits of RX data from LVDC 1 to produce n-bits of RX data from LVDC 1 per data clock interval.

Each of LVDCs 2-4 transmits sections converts n-bits of its TX data per data clock interval to LVDC 1 into first through last x-bits of TX data. The transmit sections convert the first through last x-bits of TX data into first through last x-bits analog TX signals at f2, f3, and f4, respectively. The transmit sections then transmit the first through last x-bits analog TX signals at f2, f3, and f4, respectively, on the lines of the bus.

The receive section of LVDC 1 receives the first through last x-bits analog TX signals at f2, f3, and f4 from LVDCs 2-4 as first through last x-bits analog RX signals at f2, f3, and f4. The receive section converts each of the first through last x-bits of each of the analog RX signals at f2, f3, and f4 into first through last x-bits of RX data from LVDCs, 2-4. The receive section then combines the first through last x-bits of RX data from LVDC 2 to produce n-bits of RX data from LVDC 2 per data clock interval; combines the first through last x-bits of RX data from LVDC 3 to produce n-bits of RX data from LVDC 3 per data clock interval, and combines the first through last x-bits of RX data from LVDC 4 to produce n-bits of RX data from LVDC 4 per data clock interval.

As a specific example, LVDC 1 is affiliated with a data processing host and LVDCs 2-4 are each affiliated with data collecting hosts. On a periodic basis, the data processing host requests, via LVDC 1, that the data collecting hosts send its recently collected data to the data processing host. In response to the requests, each of the data collecting hosts send their respective data, via LVDCs 2-4, to the data processing host, via LVDC 1.

In each of the examples using multiple lines of a bus, each LVDC includes a number of drive sense circuits, receive analog to digital circuits, and transmit digital to analog circuits that is equal to or greater than the number of lines of the bus being used. For example, if 8 lines of the bus are being used, then each LVDC coupled to the bus includes 8, or more, of each of the drive sense circuits, receive analog to digital circuits, and transmit digital to analog circuits.

Figure 25:
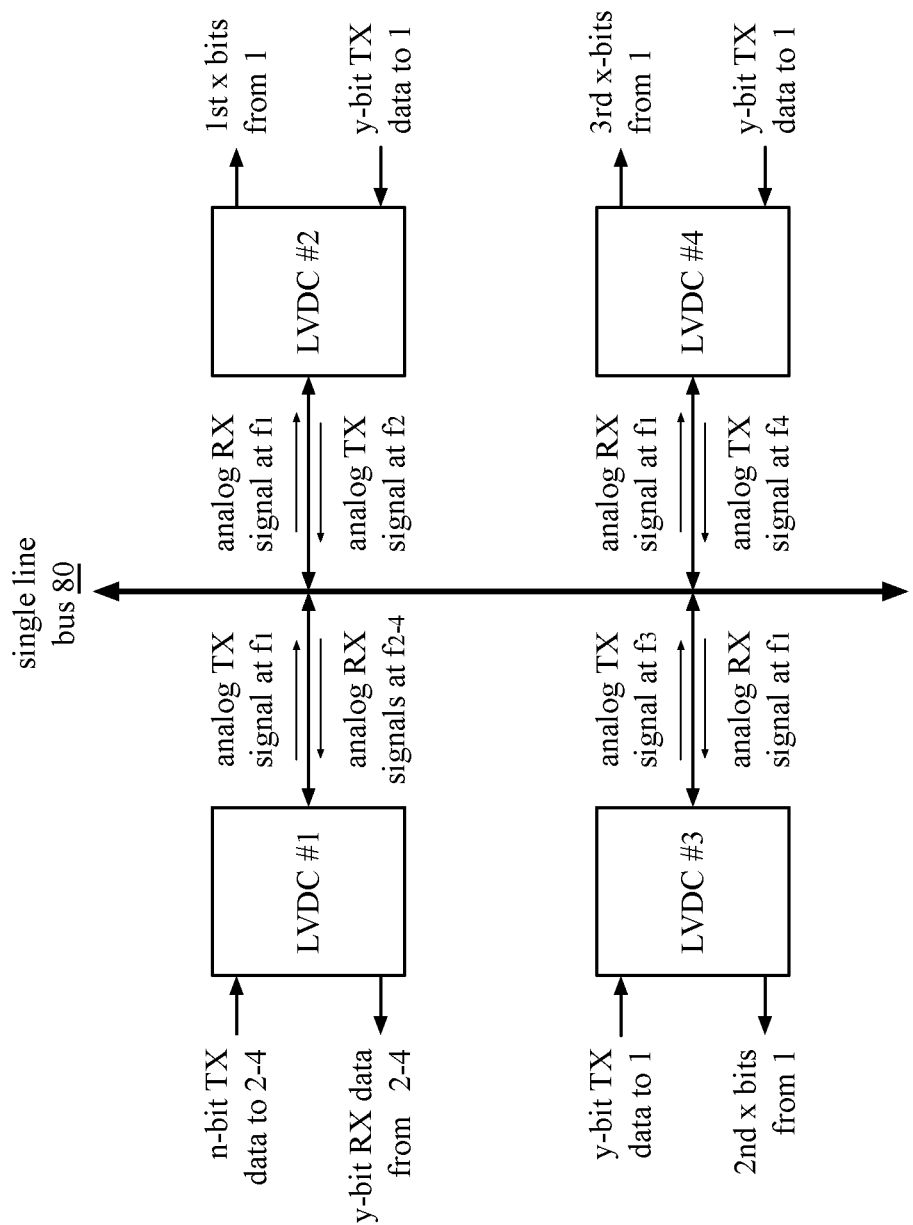
FIG. 25 is a schematic block diagram of an example of another Low Voltage Drive Circuit (LVDC) coupled to multiple Low Voltage Drive Circuits (LVDCs) on a single line bus in accordance with the present invention.

FIG. 25 is a schematic block diagram of another embodiment of a one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts n-bits (multiples of 3 bits) of transmit (TX) data per data clock interval into an analog TX signal at f1 and transmits it on channel f1 of a line the bus 80 to each of LVDCs 2, 3, and 4.

The receive section of each of LVDCs 2, 3, and 4 are tuned to process the analog TX signal at f1 as an analog RX signal at f1 and recover the n-bits of TX data per data clock interval. The receive section of LVDC 2 outputs the first x-bits (e.g., ⅓ of the n-bits) from recovered n-bits; the receive section of LVDC 3 outputs the second x-bits (e.g., ⅓ of the n-bits) from recovered n-bits; and the receive section of LVDC 4 outputs the third x-bits (e.g., ⅓ of the n-bits) from recovered n-bits.

Communication from LVDCs 2-4 to LVDC 1 functions as discussed with reference to FIG. 23. In this manner, LVDC 1 can communication separate messages to each of the LVDCs 2-4 using a single channel on a line of the bus and each of the LVDCs 2-4 can provide separate responses to their unique messages from LVDC 1.

Figure 26:
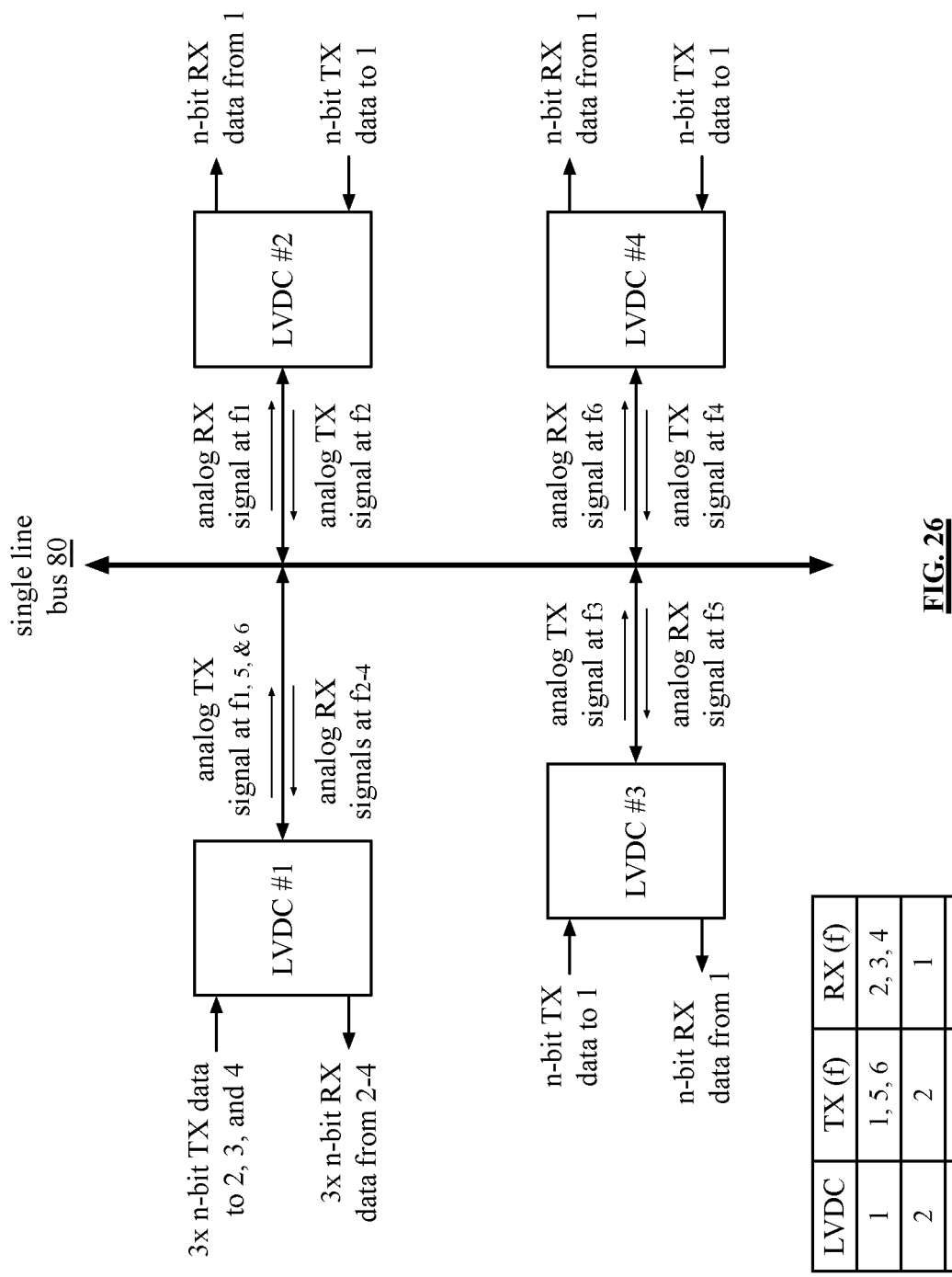
FIG. 26 is a schematic block diagram of an example of a Low Voltage Drive Circuit (LVDC) coupled to multiple Low Voltage Drive Circuits (LVDCs) on single line bus in accordance with the present invention.

FIG. 26 is a schematic block diagram of another embodiment of a one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts three separate n-bits of transmit (TX) data per data clock interval into three analog TX signals; one at f1, a second at f5, and a third at f6. LVDC 1 transmits the three analog TX signals on a line the bus 80 to each of LVDCs 2, 3, and 4.

The receive section of LVDC 2 is tuned to process the analog TX signal at f1 as an analog RX signal at f1 and recover the n-bits of TX data per data clock interval. The receive section of LVDC 3 is tuned to process the analog TX signal at f5 as an analog RX signal at f5 and recover the n-bits of TX data per data clock interval. The receive section of LVDC 4 is tuned to process the analog TX signal at f6 as an analog RX signal at f6 and recover the n-bits of TX data per data clock interval.

LVDC 2 converts n-bits of TX data destined for LVDC 1 into an analog TX signal f2 and transmits it on a line of the bus 80. Similarly, LVDC 3 converts n-bits of TX data destined for LVDC 1 into an analog TX signal f3 and transmits it on a line of the bus 80 and LVDC 4 converts n-bits of TX data destined for LVDC 1 into an analog TX signal f4 and transmits it a line of the bus 80.

The receive section of LVDC 1 recovers the n-bits of TX data per data clock cycle of LVDC 2 from analog RX signal at f2; recovers the n-bits of TX data per data clock cycle of LVDC 3 from analog RX signal at f3; and recovers the n-bits of TX data per data clock cycle of LVDC 4 from analog RX signal at f4. In this embodiment, LVDC 1 can communication separate messages to each of the LVDCs 2-4 using separate channels on a line of the bus and each of the LVDCs 2-4 can provide separate responses on other channels to their unique messages from LVDC 1.

Figure 27:
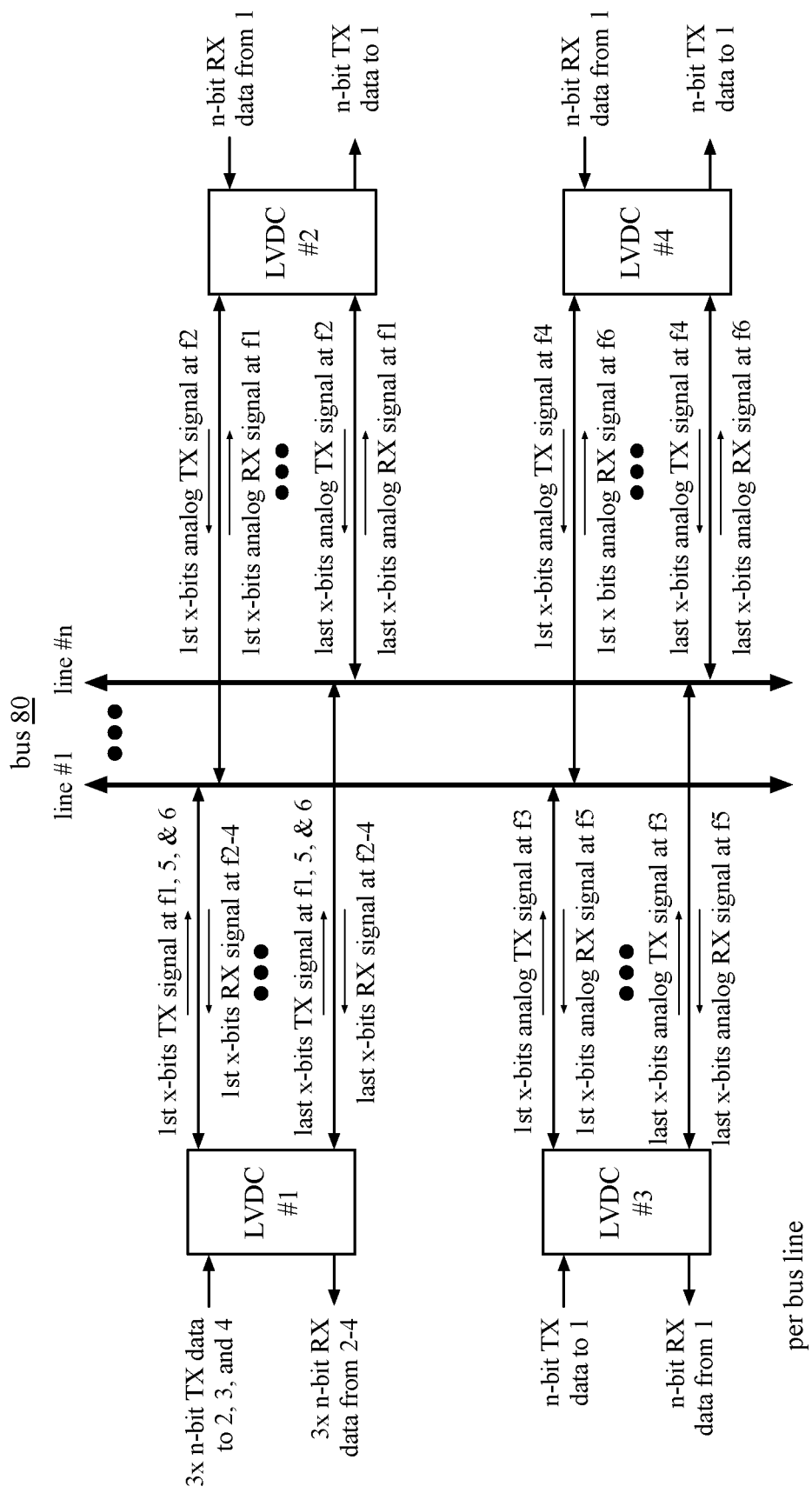
FIG. 27 is a schematic block diagram of an example of a Low Voltage Drive Circuit (LVDC) coupled to multiple Low Voltage Drive Circuits (LVDCs) on a multi-line bus in accordance with the present invention.

FIG. 27 is a schematic block diagram of another embodiment of a one-to-many and many-to-one communication between Low Voltage Drive Circuits (LVDCs) on multiple lines of a bus 80. In this example, the bus 80 includes "n" lines, wherein "n" is an integer greater than or equal to 2. As in the example of FIG. 26, LVDC 1 is engaged in a one-to-many and many-to-one communication with LVDCs 2-4. In this example, however, the LVCDs are transmitting and receiving data via multiple lines of the bus, which increases the data rate conveyance between the LVDCs.

For example, LVDC 1 converts n-bits of TX data per data clock interval into an analog TX signal at f1 for LVDC 2; converts n-bits of TX data per data clock interval into an analog TX signal at f5 for LVDC 3; and converts n-bits of TX data per data clock interval into an analog TX signal at f6 for LVDC 4. For each of the LVDCs 2-4, LVDC 1 transmits a first x-bits of the n-bits of the TX data in a first analog TX signal transmitted on a first line of the bus, transmits a second x-bits of the n-bits of the TX data in a second analog TX signal transmitted on a second line of the bus, and so on until the last x-bits are transmitted on the last line of bus being used.

The receive section of LVDC 2 receives the first through last x-bits analog TX signals at f1 from LVDC 1 as first through last x-bits analog RX signal at f1; the receive section of LVDC 3 receives the first through last x-bits analog TX signals at f5 from LVDC 1 as first through last x-bits analog RX signal at f5; and the receive section of LVDC 4 receives the first through last x-bits analog TX signals at f6 from LVDC 1 as first through last x-bits analog RX signal at f6. Each of the receive sections convert their respective first through last x-bits of the analog RX signals into first through last x-bits of RX data from LVDC 1. Each of the receive sections then combine the first through last x-bits of RX data from LVDC 1 to produce n-bits of RX data from LVDC 1 per data clock interval.

The transmission of data from each of LVDCs 2-4 to LVCD 1 is similar to the transmission discussed with reference to FIG. 26. In this embodiment, LVDC 1 can communication separate messages to each of the LVDCs 2-4 using separate channels on multiple lines of the bus and each of the LVDCs 2-4 can provide separate responses on other channels on the multiple lines of the bus to their unique messages from LVDC 1.

Figure 28:
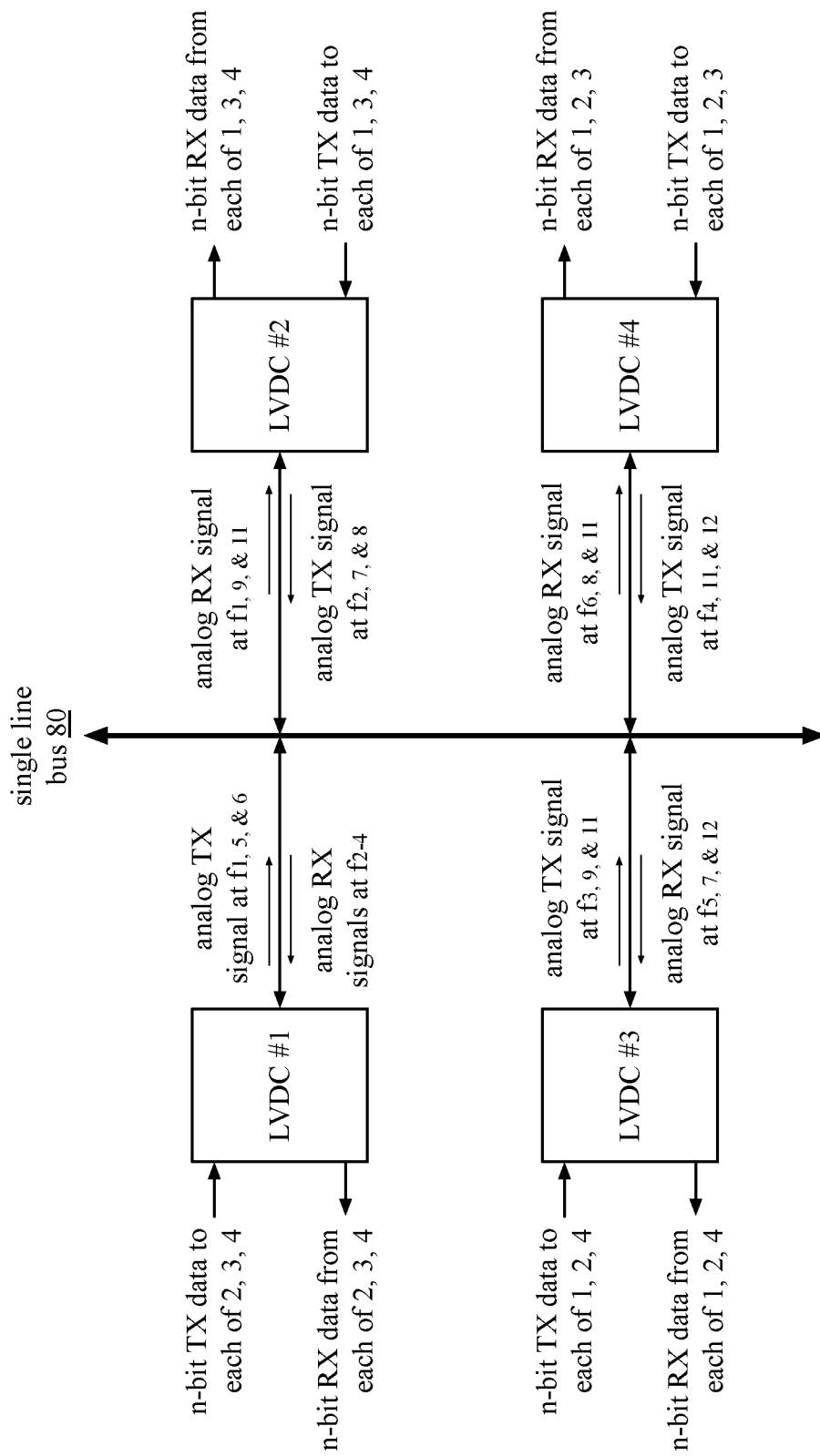
FIG. 28 is a schematic block diagram of an example of one-to-one communication between multiple Low Voltage Drive Circuit (LVDCs) on a single line bus in accordance with the present invention.

FIG. 28 is a schematic block diagram of another embodiment of many one-to-many and many-to-one communications between Low Voltage Drive Circuits (LVDCs) on a single line of a bus 80. In this example, LVDC 1 is in a one-to-many and many-to-one communication with LVDCs 2-4; LVDC 2 is in a one-to-many and many-to-one communication with LVDCs 1, 3, 4; LVDC 3 is in a one-to-many and many-to-one communication with LVDCs 1, 2, 4; and LVDC 4 is in a one-to-many and many-to-one communication with LVDCs 1-3. A one-to-many and many-to-one communication operates as previously discussed.

The channels are allocated to support the many communications. For example, LVDC 1 transmits data to LVDC 2 on channel 1, transmits data to LVDC 3 on channel 5, and transmit data to LVDC 4 on channel 6. LVDC 1 receives data from LVDC 2 on channel 2, receives data from LVDC 3 on channel 3, and receives data from LVDC 4 on channel 4. As another example, LVDC 2 transmits data to LVDC 1 on channel 2, transmits data to LVDC 3 on channel 7, and transmit data to LVDC 4 on channel 8. LVDC 2 receives data from LVDC 1 on channel 2, receives data from LVDC 3 on channel 9, and receives data from LVDC 4 on channel 11. As yet another example, LVDC 3 transmits data to LVDC 1 on channel 3, transmits data to LVDC 2 on channel 9, and transmit data to LVDC 4 on channel 10. LVDC 3 receives data from LVDC 1 on channel 5, receives data from LVDC 2 on channel 7, and receives data from LVDC 4 on channel 12. As a further example, LVDC 4 transmits data to LVDC 1 on channel 4, transmits data to LVDC 2 on channel 11, and transmit data to LVDC 3 on channel 12. LVDC 4 receives data from LVDC 1 on channel 6, receives data from LVDC 2 on channel 8, and receives data from LVDC 3 on channel 10.

Figure 29:
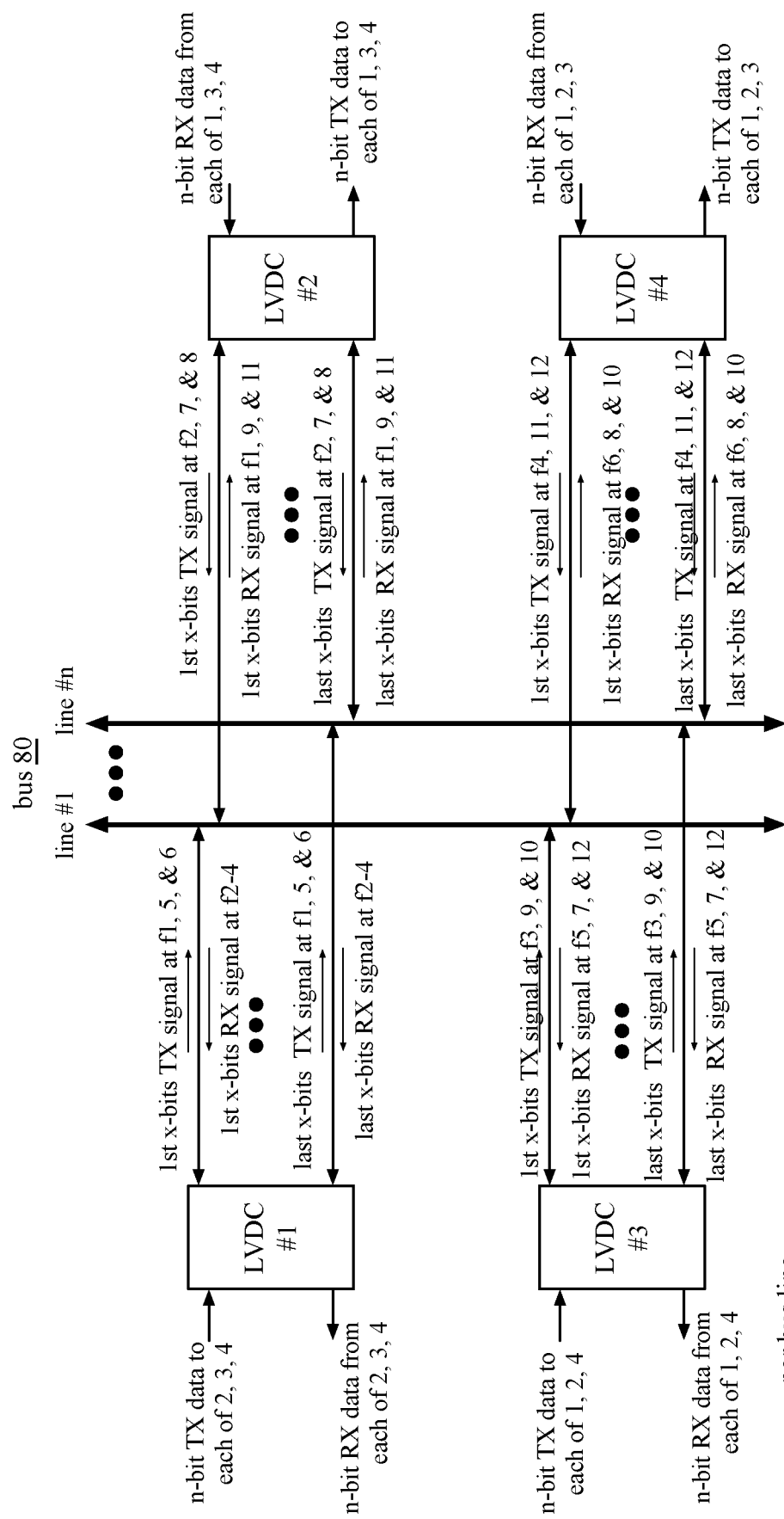
FIG. 29 is a schematic block diagram of an example of one-to-one communication between multiple Low Voltage Drive Circuit (LVDCs) on a multi-line bus in accordance with the present invention.

FIG. 29 is a schematic block diagram of another embodiment of many one-to-many and many-to-one communications between Low Voltage Drive Circuits (LVDCs) on multiple lines of a bus 80. In this example, the bus 80 includes "n" lines, wherein "n" is an integer greater than or equal to 2. As in the example of FIG. 30, the LVDCs are engaged in many one-to-many and many-to-one communications. In this example, however, the LVCDs are transmitting and receiving data via multiple lines of the bus, which increases the data rate conveyance between the LVDCs.

Figure 30:
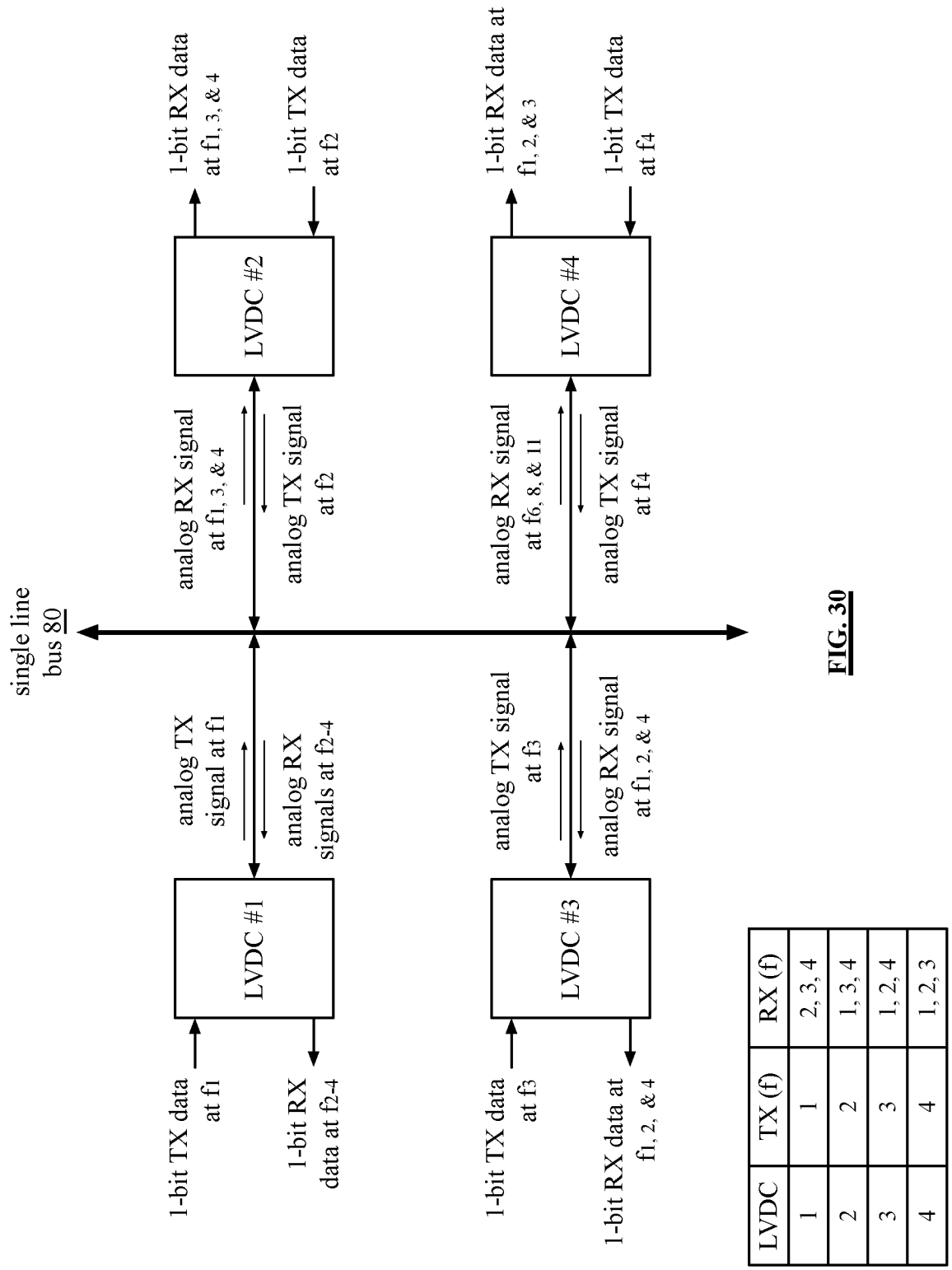
FIG. 30 is a schematic block diagram of an example of broadcast communication between multiple Low Voltage Drive Circuit (LVDCs) on a single-line bus in accordance with the present invention.

FIG. 30 is a schematic block diagram of another embodiment of many broadcast communications between Low Voltage Drive Circuits (LVDCs) on a single line of a bus 80. In this example, LVDC 1 is in a broadcast communication with LVDCs 2-4; LVDC 2 is in a broadcast communication with LVDCs 1, 3, 4; LVDC 3 is in a broadcast communication with LVDCs 1, 2, 4; and LVDC 4 is in a broadcast communication with LVDCs 1-3. A broadcast communication is sending by one LVDC to many other LVDCs and not receiving a direct response. For example, a software update can be done using a broadcast communication. As another example, streaming video can be done using a broadcast communication.

The channels are allocated to support the broadcast communications. For example, LVDC 1 transmits data to LVDCs 2-4 on channel 1, LVDC 2 transmits data to LVDCs 1, 3, 4 on channel 2, LVDC 3 transmits data to LVDCs 1, 2, 4 on channel 3, and LVDC 4 transmits data to LVDCs 1, 2, 3 on channel 4.

Figure 31:
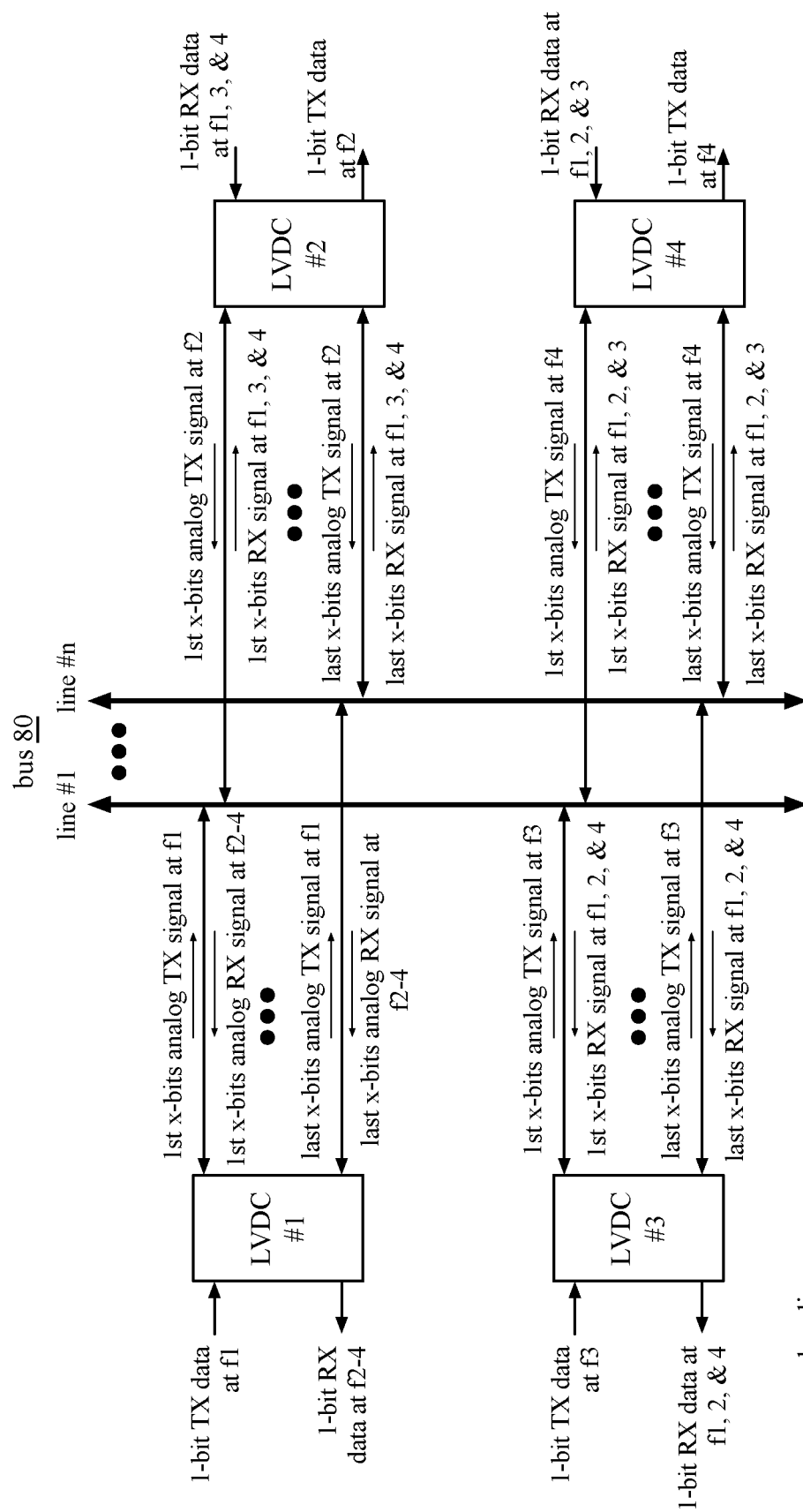
FIG. 31 is a schematic block diagram of an example of broadcast communication between multiple Low Voltage Drive Circuit (LVDCs) on a multi-line bus in accordance with the present invention.

FIG. 31 is a schematic block diagram of another embodiment of many broadcast communications between Low Voltage Drive Circuits (LVDCs) on multiple lines of a bus 80. In this example, the bus 80 includes "n" lines, wherein "n" is an integer greater than or equal to 2. As in the example of FIG. 32, the LVDCs are engaged in many broadcast communications. In this example, however, the LVCDs are transmitting data via multiple lines of the bus, which increases the data rate conveyance between the LVDCs.

Figure 32:
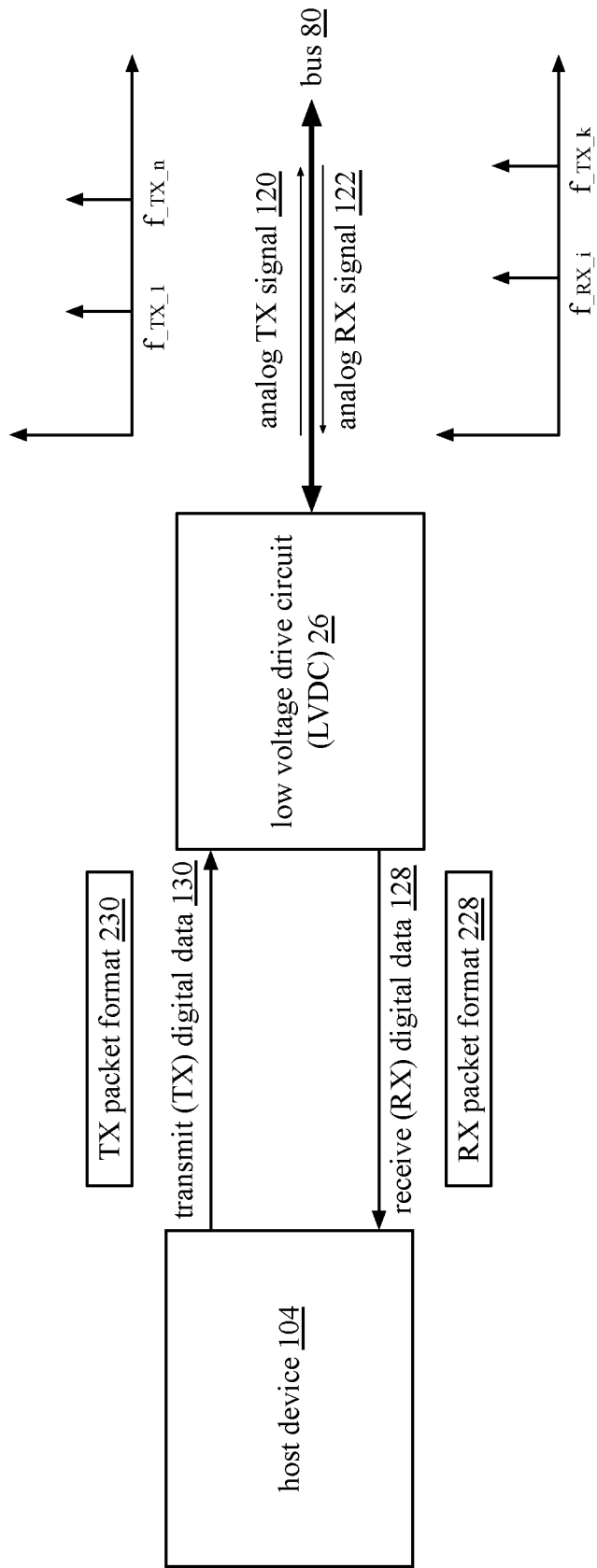
FIG. 32 is a schematic block diagram of an example of a Low Voltage Drive Circuit (LVDC) coupled to a host device using data packets in accordance with the present invention.

FIG. 32 is a schematic block diagram of a Low Voltage Drive Circuit (LVDC) coupled to a host device 104 and analog bus 80. Communication between the host device 104 and LVDC 26 is digital and uses a data format packet. In an example of operation, TX format packet format 230 is used for TX digital data 130 and RX packet format 228 is used for RX digital data 128. The host device 104 includes the processing module 114 and memory 112 (e.g., volatile memory and/or non-volatile memory) of FIG. 11, while LVDC 26 includes drive sense circuit 106, receive analog to digital converter (ADC) circuit 108, transmit digital to analog converter (DAC) circuit 110, clock circuit 138, and controller 140, of FIG. 11. LVDC 26 can also include clock circuit 138 of FIG. 14. In a specific example of implementation and operation, clock circuit 138 of FIG. 14 generates a first receive clock signal for outputting the receive digital data 128 to the host device 104 and a second receive clock for converting the analog inbound data into digital inbound data 128.

In a specific example of implementation and operation, the LVDC 26 converts analog receive (RX) signal 122 to a digital format and further formats it using RX packet format 228 into formatted units of data comprising control information and data and transmits it as receive digital data 128 to host device 104. Host device 104 receives the formatted receive digital data 128 and de-formats it to recover the data for use by the host device 104. In an example, LVDC 26 receives analog RX signal 122, converts the analog RX signal 122 using a digital converter (ADC) circuit to digital data and selects from one or more of a plurality of formats to format the digital data to formatted packets. LVDC 26 then transmits the formatted packets to host device 104 at a data rate synced with host device 104.

In a specific example of implementation and operation, when transmitting host 104 formats data using transmit (TX) packet format 230 for transmission as TX digital data 130 to LVDC 26. LVDC 26 then converts the formatted digital data using an analog converter (DAC) circuit for transmission on bus 80 as analog TX signal 120.

In examples of implementation and operation, TX packet format 230 and RX packet format 228 can include a simple header and data format and/or can include additional formatting options such as a data integrity framing and sequence numbering and even packet framing. In one embodiment, data is divided at host device 104 into payload chunks and a header is added, along with a cyclic redundancy check (CRC) footer before transmitting it to LVDC 26, where it is converted using a digital converter (ADC) circuit to analog outbound data and converted by data sense circuit 106 of FIG. 17 to analog transmit signal 120 for loading on bus 80. In one embodiment a formatted data packet can be distributed using the data splitter 190 of FIG. 17 to channel buffers and read out of the channel buffers in accordance with transmit clock rates for each of a plurality of signal generators, also of FIG. 17. The transmit clock rates will correspond to the frequency of the channel being used by each of the signal generators. The signal combiner of FIG. 17 can then be used to generate analog outbound data 192 of FIG. 17.

The data rates for TX digital data 130 and RX digital data 128 can include 1-bit per time interval up to n-bits per interval. In an example, the data rate for TX digital data 130 and RX digital data 128 are the same. In another example, the data rate for TX digital data 130 can be up to n-bits per interval, while the data rate for RX digital data 128 can be less than n-bits per interval (for example 1-bit per interval).

In a specific example of implementation and operation further illustrated in FIG. 14, RX digital data 128 can be formatted at the LVDC by controller 140, based on control 146 from processing module 114 of the host device 104. In an example, controller 140 transmits the receive parameters, as determined by the host device 104, to the receive analog to digital circuit 108 such that received digital data 128 is in a format expected by the host device 104. Likewise, controller 140 provides transmit parameters 132 to the transmit digital to analog circuit 110, thereby enabling transmit digital to analog circuit 110 provide analog outbound data 134 appropriate for transmission on analog bus 80. In a specific example of implementation and operation referring to FIG. 15, the function of controller 140 can be provided by processing module 114 of the host device 104.

Figure 33A:
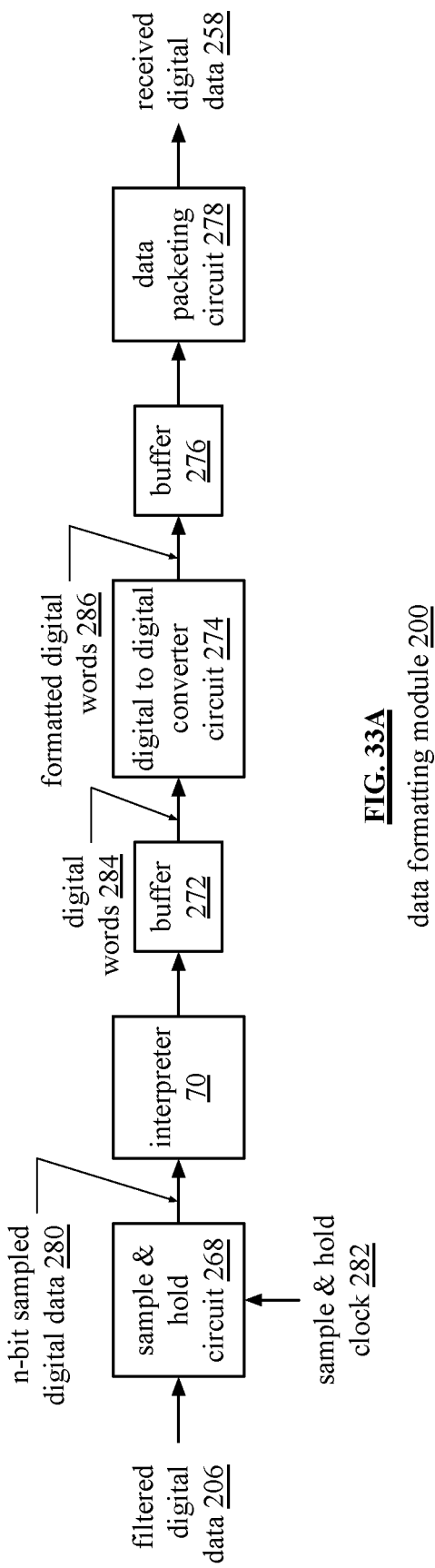
FIG. 33A is a schematic block diagram of an embodiment of a data formatting module for formatting data packets in accordance with the present invention.

FIG. 33A is a schematic block diagram of an embodiment of a data formatting module 200 that includes sample & hold circuit 268, interpreter 270, buffer 272, digital to digital converter circuit 274, buffer 276, and data packeting circuit 278. Data formatting module 200 formats and packetizes filtered digital data 206 in accordance with one or more receive parameters to produce received digital data 258.

In an example of operation and implementation, the sample & hold circuit 268 samples and holds an "n"-bit sampled digital data value 208 of filtered digital data 206 (e.g., a pulse representative of 1-bit, 2-bit, etc., of data) received every data clock cycle from a digital filtering circuit at a sample & hold clock 282 rate to produce an n-bit sampled digital data 280 value. the interpreter 270 interprets the n-bit sampled digital data 280. The interpreter 270 converts n-bit sampled digital data 280 to a binary string. The interpreter 270 writes interpreted n-bit sampled digital data into buffer 272 operating according to a write rate/read rate clock cycle until a digital word 284 is formed (e.g., 8-bits of data, 16-bits of data, etc.). The buffer 272 outputs digital words 284 to digital to digital converter circuit 274 for further formatting. The digital to digital converter circuit 274 formats digital words 284 to formatted digital words 286 and writes formatted digital words 286 to buffer 276. The data packeting circuit 278 creates data packets from formatted digital words 286 and outputs data packets as received digital data 258.

In another example with reference to FIG. 16B, the filtered digital data 206 (analog inbound data 176) is received at a clock rate dictated by the analog bus 80, converted to n-bit sampled digital data 280 and then converted to received digital data 258 at host data rate using RX clock signal 180. Continuing with reference to FIG. 16B, RX clock signal 180 is derived from the clock rate of analog bus 80 and a host clock signal 183, which are adjusted at RX clock circuit 166 to provide RX clock signal 180. Also, transmit (TX) digital data from host device is converted to analog outbound data, such as analog outbound data 196 using a process that is roughly the reverse of that illustrated in FIG. 16B. A host device formats digital data that is converted to analog outbound data utilizing a the clock rate of the analog bus 80 and a host clock signal 183, as further described with reference to FIG. 16B. In a specific example, host device 104 formats TX digital data 130 from FIG. 32 using TX packet format 230 that is converted to analog outbound data 196 of FIG. 16B utilizing the clock rate of analog bus 80 and a host clock signal 183.

Figure 33B:
FIG. 33B is a schematic block diagram of an embodiment of a data format for data packets in accordance with the present invention.

FIG. 33B is an example of received digital data 258 formatted as a data packet 288. The data packet 288 includes a header 290, data fields 1-$x$, and integrity field 292. The header 290 includes information about the data carried by packet 288. For example, the header 290 information includes packet length, synchronization, packet number, protocol, and/or addressing information. The data fields 1-$x$ contain one or more digital words of any specified byte size (e.g., 64 bytes). Integrity field 292 includes error checking such as a Cyclic Redundancy Check (CRC), checksum, hash of the packet. If an error is detected via integrity field 292, the packet may be resent (i.e., feedback error correction) or an error-correcting code is used to correct certain errors (i.e., feed forward error correction such as Reed Solomon, etc.).

In various embodiments, format requirements of a given data packet depend on a number of factors. For example, if a LVDC communication system is supporting communication between two devices, such as illustrated in FIG. 18, the packets can be relatively rudimentary, whereas a LVDC communication system supporting communication between multiple LVDCs, such as those illustrated in FIGS. 21-31, can require increasingly sophisticated data packet formats.

In an example based on FIG. 18, where a control channel is available, the data packet format can include a header 290 that includes minimal information, such as the size of the packet and an indication of a number of packets in a given data transmission or message and/or the sequence number for the data packet, along with the data fields 1-x being transmitted. In some examples, integrity field 292 may not be needed or can consist of a checksum to ensure that the data and/or header was not damaged in transit. In an example, communication can be initiated by system power up, system reset, or system enable of one or both of devices, as discussed with reference to FIG. 18.

Figure 33C:
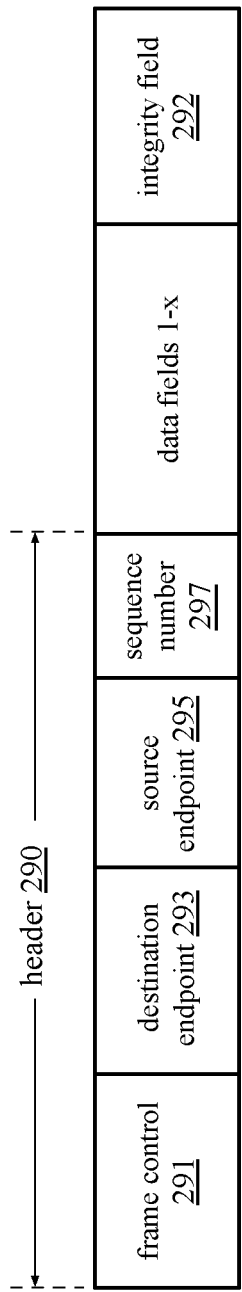
FIG. 33C is a schematic block diagram of another embodiment of a data format for data packets in accordance with the present invention.

FIG. 33C is another example of received digital data 258 formatted as a data packet 288 including header 290. In a specific example of implementation and operation, the data packet 288 can include a header comprising a frame control 291, a destination endpoint 293, a source endpoint 295, a sequence number 297 for data packet 288, along with an integrity field 292. The sequence number 297 can specify the number assigned to a first byte of data in a transmission and/or can also be used to identify an initial sequence number to be used in the transmission. Additional fields (not shown), such as a data offset field to indicate the size of the header (where the header includes fields of variable length), and an acknowledgement field can also be included.

In certain implementations, one or more of the packet fields for the formatted packet may be unnecessary, depending on the requirements and/or attributes of a particular implementation of a Low Voltage Drive Circuits (LVDCs) based communication system. For example, in a system that is limited to reporting data for a particular sensor associated with a host controller, the packet may be limited to fields necessary for system requirements. For example, the communication can use "send and pray" packets that include data content that, if lost, do not adversely affect the operation of the communication system. For example, when a system includes packets that are transmitted periodically and the absence of one or more periodically transmitted packets is not particularly detrimental, integrity field 292 can be eliminated. In another example, where all traffic on a particular channel and/or frequency is intended for a single recipient and/or is between a predetermined pair of host devices, one or more of destination endpoint 293 or source endpoint 297 may not required.

Further, a sequence number 297 may not be required when messages are limited to a single packet, whereas messages consisting of multiple packets can require a sequence number 297 to ensure that packets are processed by the host in sequence. Additionally, when an integrity field 292 is included in the packet, the host may respond to a transmitted packet by requesting a resend of the packet, which may arrive out of sequence with already received packets, thereby motivating the inclusion of sequence information, such as sequence number 297.

In another example, destination endpoint 293 and source endpoint 295 might not be required. For example, connected hosts are assigned a specific frequency for communication, since the destination and endpoint are already known. Accordingly, depending on the intended communication and attributes for communication between Low Voltage Drive Circuits (LVDCs) in a communication system, any of the fields are optional with the exception of the data fields and a simple header 290.

Figure 33D:
FIG. 33D is a schematic block diagram of another embodiment of a data format for data packets in accordance with the present invention.

FIG. 33D is an example of a frame control field 291 for received digital data 258 formatted as a data packet 288 that itself includes fields for a frame type 294, a delivery mode 296 and an acknowledge (ACK) request 298. In an example of operation, frame control field 291 can include a frame type 294 for data packet 288, such as "data" or "control", a delivery mode 296, such as "unicast" or "multicast", and an ACK request 298. Any of the fields, frame type 294, delivery mode 296 and acknowledge (ACK) request 298 are optional, depending on the intended communication and attributes for communication between Low Voltage Drive Circuits (LVDCs) in a communication system. For example, when each of the LVDC's with connected hosts are assigned a specific frequency for communication, such as with reference to the system of FIG. 21, a communication system may not require a delivery mode or another of the frame control fields. In another example, an ACK request 298 may not be desired/required when the packet includes an integrity field 292, potentially reducing the necessity of an ACK response. In the example, a request to resend a particular packet would be required only when a packet integrity check 292 fails for the packet, thereby reducing traffic on the analog bus 80 with unnecessary and/or unneeded ACK responses.

Figure 33E:
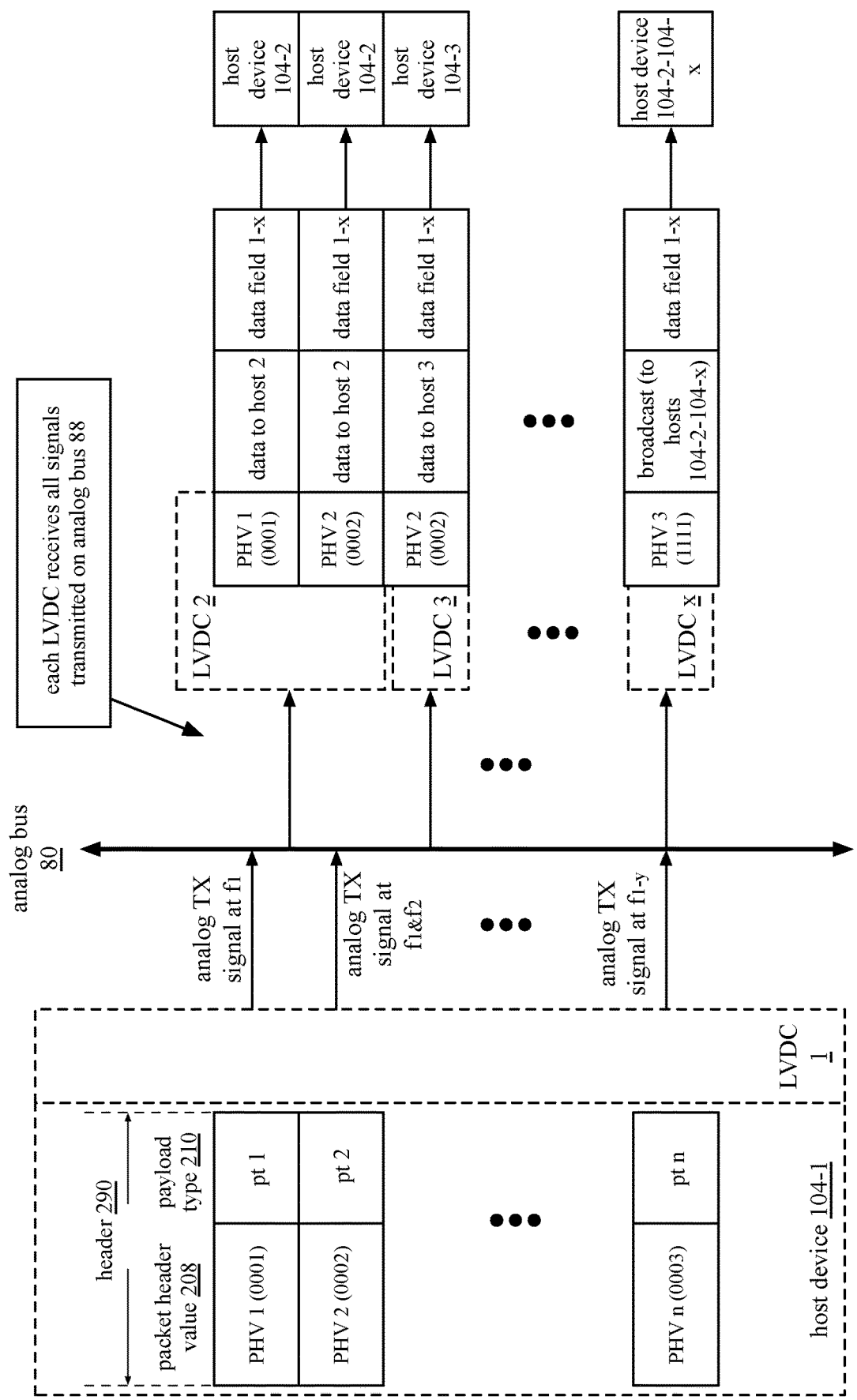
FIG. 33E is a schematic block diagram of host devices 104 1-$x$ coupled to analog bus 80 using Low Voltage Drive Circuits (LVDCs) in accordance with the present invention.

FIG. 33E is a schematic block diagram of host devices 104 1-x coupled to analog bus 80 using Low Voltage Drive Circuits (LVDCs). Communication between each of the host devices 104 1-x utilizes a Low Voltage Drive Circuit (LVDC) coupled to each of the host devices and utilizes a data format packet, such as those described with reference to FIGS. 33A-33D, for communication between each of host devices 104 1-x and an associated LVDC, such as described with reference to FIG. 32. In an example of operation, a packet header 290 is associated with each data packet and includes a packet header value (PHV) 208 and a payload type (pt) 210. Also, each data packet can include one or more data fields and other fields (not shown), as described with reference to FIGS. 33A-33D.

In an example, the host device 104-1 is adapted to format data for transmission (TX) using one or more data packets, such as the data packet 288 of FIG. 33B. Data packet 288 can be formatted according to the TX packet format 230 of FIG. 32 and transmitted as TX digital data 130 to an LVDC, such as LVDC 26. The packet header 290 for each formatted data packet includes a packet header value (PHV) 208 that the LVDC will use to configure the TX parameters for transmission of the data on analog bus 80. In an example of operation, a host device 104-1 provides one or more transmit frequencies to the associated LVDC for the data transmission, and the LVDC uses them to configure transmit parameters, such as the transmit parameters 132 of FIG. 15. Alternatively, the host device 104-1 provides transmit frequencies to a controller associated with an associated LVDC, such as controller 140 in FIG. 14, that in turn provides transmit parameters 132 for the associated LVDC. In yet another example, one or more transmit frequencies used by an associated LVDC to configure TX parameters for one or more data packets can be included in PHV 208 for each of the one or more data packets.

In an example of operation, LVDC 1 is associated with host 104-1 and is configured to receive one or more data packets, such as data packet 288, from host 104-1 and is also configured to vary the load on analog bus 80 in accordance with the configured transmit parameters to generate an analog transmit signal, such as analog TX signal 120 from FIG. 32, at one or more frequencies as dictated by the transmit parameters transmitted by host 104-1.

Each of host devices 104-1-x is coupled to analog bus 80 via a respective LVDC, each of which is configured to receive one or more analog receive (RX) signals via the analog bus 80. In an example of operation, an LVDC is configured to receive an analog receive (RX) signal, such as analog RX signal 122 from FIG. 32, and output receive (RX) digital data 128 formatted as data packets (such as data packet 288 from FIG. 33B) formatted according to an RX packet format (such as RX packet format 228 of FIG. 32). Each of the LVDCs is configured to receive an intended analog RX signal and produce analog inbound data, such as analog inbound data 124 of FIG. 32. In an example of implementation and operation, each LVDC, such as LVDC 2, is configured to receive analog RX signals intended for multiple LVDCs coupled to the analog bus 80 and produces analog inbound data intended for only the host associated to LVDC 2. The LVDC then converts the analog inbound data to received digital data, such as the received digital data 258 of the data formatting module 200 of FIG. 33A. In an example, the received digital data is formatted into data packets for receipt by a host device by the associated LVDC receiving an analog RX signal intended for the associated LVDC. In an example of operation and implementation, the LVDCs 2 through x are configured to receive any signal that is transmitted to the analog bus 80 by LVDC 1. In another example of operation and implementation, the LVDCs 1 and 3 through x are configured to receive any signal that is transmitted to the analog bus 80 by LVDC 2.

In an example of operation and implementation, the host device 104-1 intends to transmit a data message to host device 104-2. In the example, host device 104-1 provides transmit frequency f1 for the LVDC 1 associated with host device 104-1 for a pending data message; the LVDC 1 configures the data message for transmittal at f1, based at least in part on the part on the packet header value (PHV) of 0001 and/or a payload type 210 having a particular value of payload type (pt) being pt 1 associated with the pending data message, and varies the loading at f1 on analog bus 80 to transmit an analog TX signal at f1 for the data message. The transmitted analog TX signal is received at f1 by the LVDC 2 associated with host device 104-2, which converts it to data packets, including a header 290 with the packet header value 0001 for receipt by host device 104-2.

In another example of operation and implementation, when host device 104-1 intends to transmit a data message to host devices 104-2 and 104-3, the host device 104-1 provides transmit frequencies f1 and f2 for the LVDC 1 associated with host device 104-1 for a pending data message; the LVDC 1 configures the data message for transmittal at f1 and f2, based at least in part on the part on a packet header value (PHV) of 0002 and/or a payload type 210 having a particular value of payload type (pt) being pt 2 associated with the pending data message, and varies the load at f1 and f2 on analog bus 80 to transmit an analog TX signal at f1 and f2 for the data message. The transmitted analog TX signal is received at f1 by the LVDC 2 associated by host devices 104-2 and at f2 by the LVDC 3 associated with host devices 104-3, each of which converts it to data packets, including a header 290 with the packet header value 0002 for receipt by host devices 104-2 and 104-3.

In yet another example of operation and implementation, when host device 104-1 intends to broadcast the same data message to host devices 104-2-104-x, host device 104-1 provides transmit frequencies f1-fy for the LVDC 1 associated with host device 104-1 for a pending data message, where each of the frequencies f1-fy is associated with a host device coupled to analog bus 80 using an LVDC. The LVDC 1 for host device 104-1 configures the data message for transmittal at each of frequencies f1-fy, based at least in part on the part on a packet header value (PHV) of 0003 and/or a payload type 210 having a particular value of payload type (pt) being pt 3, associated with the pending data message, and varies the load at f1-fy on analog bus 80 to transmit an analog TX signal at f1-fy for the data message. The transmitted analog TX signal is received at each of f1-fy by the LVDC associated with each of host devices 104-2-104-x, each of which converts it to data packets, including a header 290 with the packet header value 0003 for receipt by host devices 104-2-104-x.

Figure 33F:
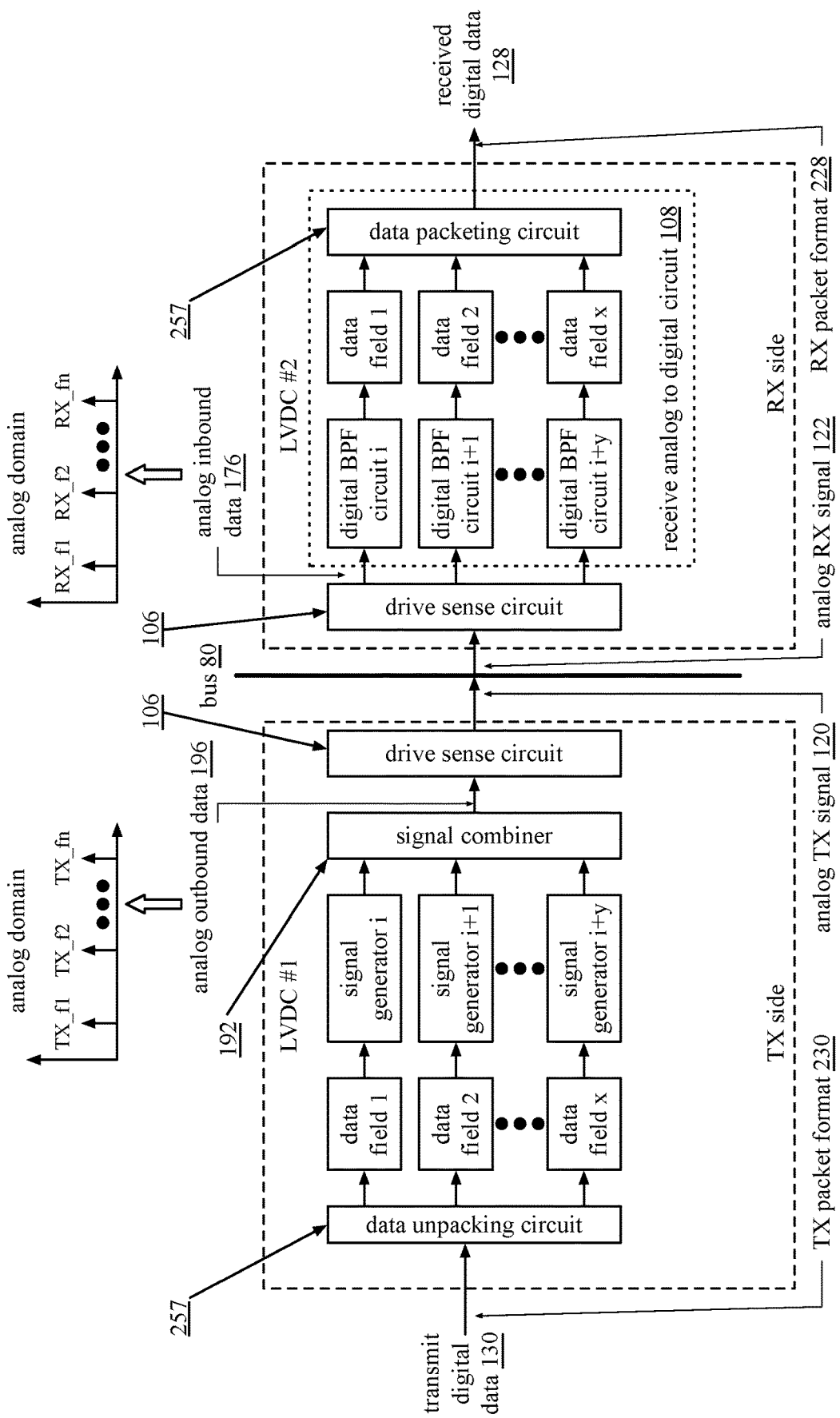
FIG. 33F is a schematic block diagram of an embodiment of a transmit side of one LVDC and a receive side of another Low Voltage Drive Circuit (LVDC) in accordance with the present invention.

FIG. 33F is a schematic block diagram of an embodiment of a transmit side of a first Low Voltage Drive Circuit (LVDC) coupled to a receive side of a second LVDC via one or more lines of a bus 80. The transmit side of the LVDC #1 includes a data unpacking circuit 257 that generates data fields (1 through x), based on the transmit digital data 130. The transmit side of the LVDC #1 also includes a plurality of signal generators (i through i+y), a signal combiner 192, and a drive sense circuit 106. With reference to FIGS. 11, and 14-16, the data unpacking circuit 257, the data fields (1 through x), the signal generators (i through i+y), and the signal combiner 192 are included in the transmit digital to analog circuit 110.

The receive side of LVDC #2 includes a drive sense circuit 106, a plurality of digital bandpass filter circuits (BPF i through i+y), a plurality of data field buffers (1 through x), and a data combiner 194. With reference to FIGS. 11, and 14-16, the digital bandpass filter circuits (BPF i through I+y) that recover data fields (1 through x) and the data packeting circuit 256 are included in the receive analog to digital circuit 108.

In an example of operation, the data unpacking circuit 257 receives the transmit digital data 130 from host device 104 and generates a plurality of data fields based on the transmit digital data 130. With reference to FIG. 32, transmit digital data 130 can be formatted by host device 104 using TX format 230. The host device 104 includes the processing module 114 and memory 112 (e.g., volatile memory and/or non-volatile memory) of FIG. 11, while LVDC 26 includes drive sense circuit 106, receive analog to digital converter (ADC) circuit 108, transmit digital to analog converter (DAC) circuit 110, clock circuit 138, and controller 140, of FIG. 11. In one example, the data fields are generated by unpacking circuit 257 based on information transmitted in a data packet from a host 104, where the transmit digital data 130 is formatted according to TX packet format 230. In another example, the data unpacking circuit 257 generates the transmit digital data 130 into data fields according to a pre-determined scheme. With reference to FIG. 32, transmit digital data 130 can be formatted by host device 104 using TX format 230. The host device 104 includes the processing module 114 and memory 112 (e.g., volatile memory and/or non-volatile memory) of FIG. 11, while LVDC 26 includes drive sense circuit 106, receive analog to digital converter (ADC) circuit 108, transmit digital to analog converter (DAC) circuit 110, clock circuit 138, and controller 140, of FIG. 11.

In an example, each data field is stored in a corresponding data field buffer. For instance, a first data field buffer stores data field 1; a second data field buffer stores data field 2, and so on. In an example, transmit digital data 130 in the form of transmit data packets formatted according to TX format 230 are written into the data field buffers in accordance with the host data rate. The data fields are read out of the data field buffers in accordance with transmit clock rates for each of the signal generators. The transmit clocks corresponds to the frequency of the channel being used by a signal generator.

Each enabled signal generator converts bits of its respective data field into respective portions of the analog outbound data 196. For example, signal generator i uses data field 1, using a first frequency (f1), signal generator i+1 uses data field 2, using a second frequency (f2), and so on. Note that one or more of the signal generators is activated to convert the data fields of transmit digital data 130 into the analog outbound data 196.

As a specific example of operation, signal generator i converts n-bits of data field 1 at a time into an analog signal component of the analog outbound data 196, where n is an integer greater than or equal to one. For an n-bit sample of its data stream, the signal generator encodes the n-bit sample into a sinusoidal signal having a frequency at f1 using amplitude shift keying (ASK) signal and/or a phase shift keying (PSK) signal. Signal generator i+1 functions similarly by encoding an n-bit sample of its data stream into a sinusoidal signal having a frequency at f2 using ASK and/or PSK.

The drive sense circuit 106 of the first LVDC converts the analog outbound data 196 into an analog transmit signal 120, which it transmits on to a line of the bus 80. The drive sense circuit 106 of the second LVDC receives it as an analog receive signal 122 and converts it into analog inbound data 176. As such, without conversion, transmission, or reception errors, the analog inbound data 176 is substantially identical to the analog outbound data 196.

Each digital bandpass filter (BPF) circuit includes an analog to digital converter and a digital bandpass filter. Each active digital BPF circuit receives the analog inbound data 176. In addition, each active digital BPF circuit is tuned for a different channel. For example, digital BPF circuit i is tune for frequency 1, digital BPF circuit i+1 is tuned for frequency 2, and so on. As such, digital BPF circuit i converts the analog inbound data into digital inbound data, filters it, and outputs the n-bit digital values corresponding to the data stream processed by signal generator i. Similarly, digital BPF circuit i+1 converts the analog inbound data into digital inbound data, filters it, and outputs the n-bit digital values corresponding to the data stream processed by signal generator i+1; and so on.

The data field buffers of the receive side of LVDC store the n-bit digital values outputted by their respective digital BPF circuits. The data packeting circuit 256 retrieves data from the data field buffers and periodically outputs data packets as received digital data 128. For example, a data packet is inputted into the data packeting circuit 256 in accordance with a data rate of the host device coupled to the first LVDC.

Each signal generator/digital BPF circuit pair operates independently of the other signal generators and at different rates to process their respective data fields of the data packet received at data unpacking circuit 257. In a specific example, the first signal generator/digital BPF circuit pair (e.g., signal generator i through digital BPF circuit i) operates in accordance with frequency f1, which is at slightly higher frequency than that of the data rate of host 1; the second signal generator/digital BPF circuit (e.g., signal generator i+1 through digital BPF circuit i+1) operates in accordance with frequency f2, which is at slightly higher frequency than that of frequency f1; and the third signal generator/digital BPF circuit (e.g., signal generator i+2 through digital BPF circuit i+2) operates in accordance with frequency f3, which is at slightly higher frequency than that of frequency f2.

Referring again to FIG. 17, in a specific example of operation the data clock of host 1 is 1.000 GHz for a 125 Mega Byte per second (MBps) data rate, which corresponds to a 1 Gbps data rate; data is provided to the data splitter a byte at a time; frequency f1 is at 1.010 GHz, frequency f2 is at 1.020 GHz, and frequency f2 is at 1.030 GHz.

As transmit digital data is put into the data field buffers on the transmit side, the signal generators begin to process them. In one example of operation the signal generators begin to process them a bit at a time. In another example, since signal generator i+2 is operating at a rate that is faster than the other two signal generators, it will finish processing data field 3 slightly before the others. As such, digital BPF circuit i+2 will finish recovering data field 3 slightly before the other digital BPF circuits. The timing difference is compensated for by the data field buffers on each end.

In an example of implementation and operation, a first Low Voltage Drive Circuit (LVDC) coupled to a receive side of a second LVDC via one or more lines of a bus 80 receives a transmit digital data packet from a host device coupled to the first LVDC. The first LVDC generates a plurality of data fields based on the received transmit digital data packet, then generates one or more analog outbound data signals based on the plurality of data fields. The first LVDC then drives one or more analog transmit signals on to bus 80 by varying loading on bus 80 to represent the one or more analog transmit signals.

The first LVDC is adapted to detect one or more analog receive signals from the second LVDC and other LVDCs coupled to the analog bus 80, where the analog receive signal varies loading on the bus based on one or more analog outbound data signals from the second LVDC and/or other LVDCs. The first LVDC generates one or more analog inbound data signals based on the one or more respective analog receive signals and generates a plurality of receive data fields based on the generated analog inbound data signal. The receive data fields are then used to generate a received data packet and outputs the received data packet to the host coupled to the first LVDC.

Figure 34A:
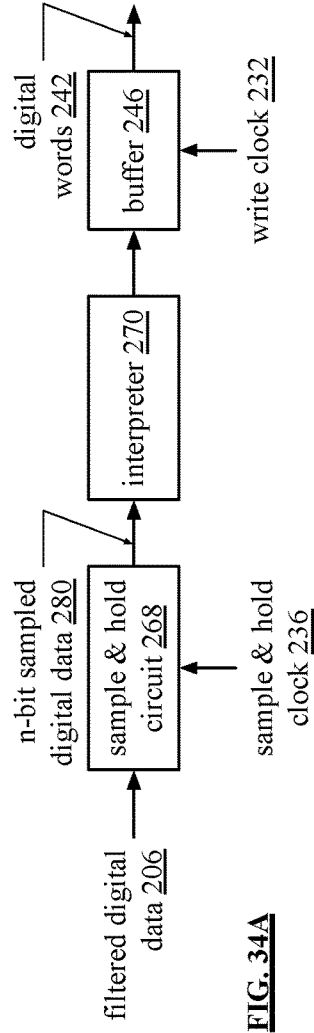
FIG. 34A is a schematic block diagram of an embodiment of a portion of a data formatting module in accordance with the present invention.

FIG. 34A is a schematic block diagram of an embodiment of a portion of a data formatting module 200 that includes sample & hold circuit 268, interpreter 270, and buffer 246. Sample & hold circuit 268 samples and holds an n-bit digital value data of filtered digital data 206 (e.g., a pulse representative of 1-bit, 2-bit, etc., of data) received every data clock cycle from a digital filtering circuit a sample & hold clock 236 rate to produce an n-bit sampled digital data 280 value. Interpreter 270 interprets the n-bit sampled digital data 280. For example, interpreter 270 converts n-bit sampled digital data 280 to a binary string. Interpreter 270 writes interpreted n-bit sampled digital data into buffer 246 operating according to a write clock 232 cycle until a digital word 242 is formed (e.g., 8-bits of data, 16-bits of data, etc.).

Figure 34B:
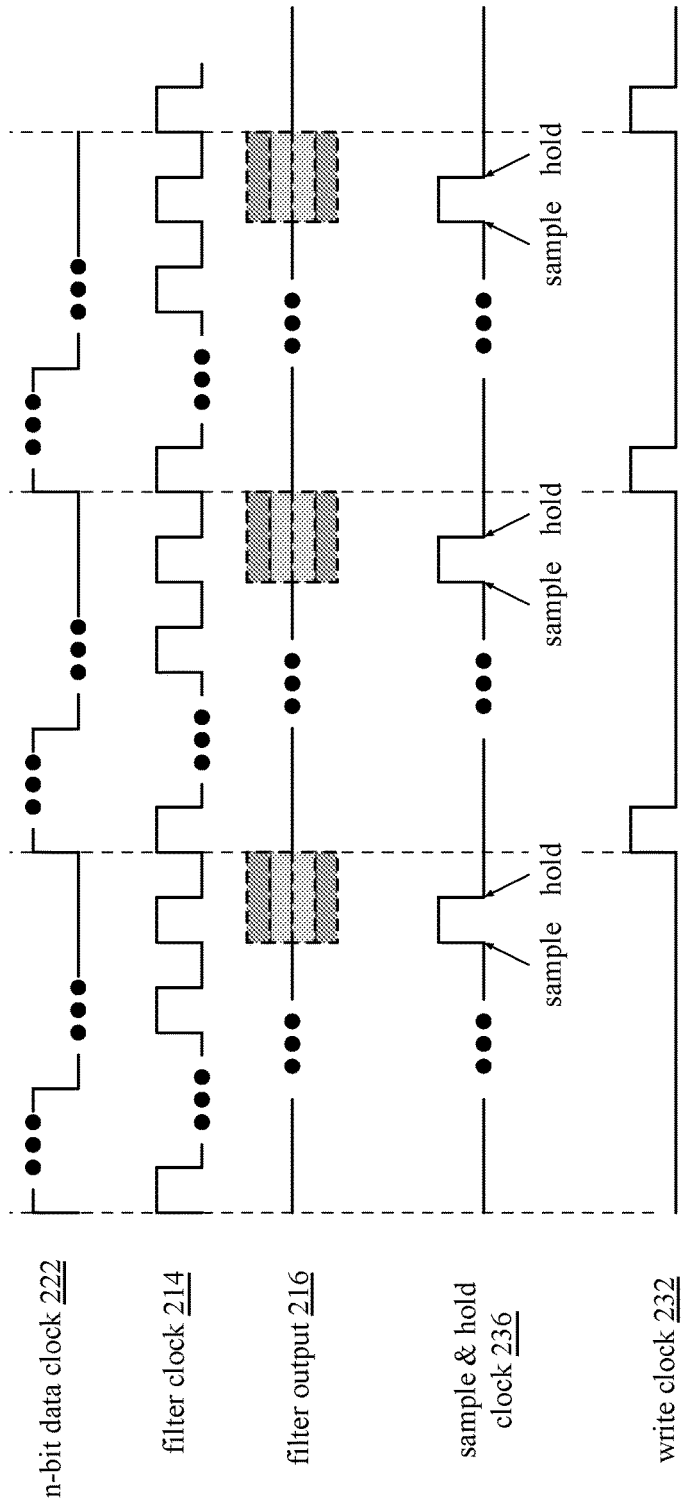
FIG. 34B is an example of clock signals of the portion of formatting module of FIG. 34A in accordance with the present invention.

FIG. 34B is an example of clock signals of the portion of formatting module 200 of FIG. 34A. Sample & hold circuit 268 samples and holds an n-bit digital value data of filtered digital data 206 (e.g., a pulse representative of 1-bit, 2-bit, etc., of data) received every n-bit data clock 222 cycle. Filter clock 214 (e.g., of digital BPF 206) operates at "x" (e.g., where "x" is the number of filter taps) times the n-bit data clock 222. At the end of the data clock 222 cycle (e.g., after x cycles of the filter clock 214), the filter output 216 (e.g., a pulse representative of the input data (e.g., logic 1 or 0 for 1-bit or logic 00, 01, 10, or 11 for 2-bit based on magnitude, phase, and/or frequency, etc.)) is output as filtered digital data 206 to sample & hold circuit 268.

Sample & hold clock 236 is set to capture/sample the filtered digital data 206 on the rising edge of every filter output 216 for a certain time (e.g., ½ filter cycle) and hold for a certain time (e.g., ½ filter cycle). Sample & hold circuit 268 outputs n-bit sampled digital data 280 to interpreter 270 as discussed with reference to FIG. 34A. Interpreter 270 writes interpreted n-bit sampled digital data (e.g., a plurality of n-bit digital values on an-bit digital value by n-bit digital value basis) into buffer 246, where buffer 246 stores the plurality of n-bit digital values on an n-bit digital value by n-bit digital value basis in accordance with a write clock operating according to a write clock cycle 232 until a digital word 242 is formed (e.g., 8-bits of data, 16-bits of data, etc.).

Figure 35A:
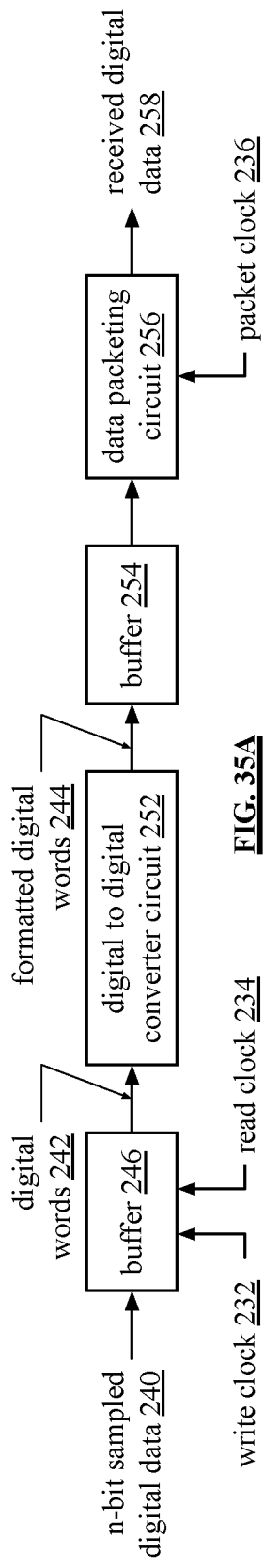
FIG. 35A is a schematic block diagram of an embodiment of a data formatting module in accordance with the present invention.

FIG. 35A is a schematic block diagram of an embodiment of a portion of a data formatting module 200 that includes buffer 246, digital to digital converter circuit 252, buffer 254, and data packeting circuit 256. Interpreter 270, from FIG. 34A, writes interpreted n-bit sampled digital data into buffer 246 operating according to a write clock 232 until a digital word 242 is formed. Buffer 246 outputs digital words 242 according to a read clock 234 to digital to digital converter circuit 252 for further formatting. Digital to digital converter circuit 252 formats digital words 234 to formatted digital words 244 and writes formatted digital words 244 to buffer 254. Data packeting circuit 256 creates data packets at a packet clock 236 rate from formatted digital words 244 and outputs data packets as received digital data 258.

Figure 35B:
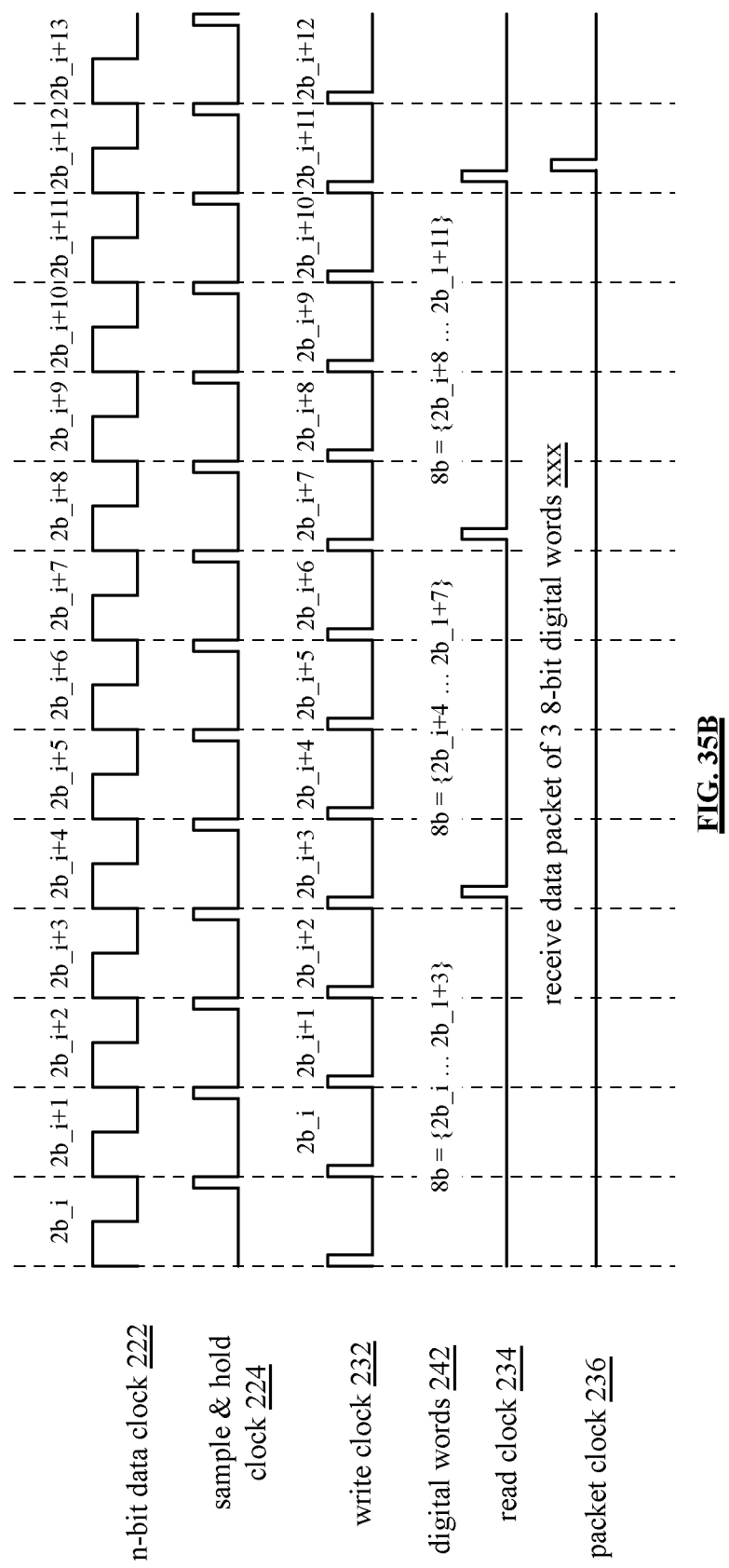
FIG. 35B is an example of clock signals of the portion of formatting module of FIG. 35A in accordance with the present invention.

FIG. 35B is an example of clock signals of the portion of formatting module 200 of FIG. 35A. In this example, "n" is equal to 2, a digital word 242 is 8-bits, and a packet includes 3 digital words. Sample & hold clock 224 is set to capture/sample the filtered digital data 206 on the rising edge of every filter output 216 (of FIG. 34B) for a certain time (e.g., ½ filter cycle) and hold for a certain time (e.g., ½ filter cycle). At the end of the data clock 222 cycle (e.g., after x cycles of the filter clock 214, where the filter has x taps), the filter output 216 (e.g., a pulse representative of the input data (e.g., logic 00, 01, 10, or 11 for 2-bit based on magnitude, phase, and/or frequency, etc.)) is output as filtered digital data 206 to sample & hold circuit 268.

Interpreter 270 writes interpreted n-bit sampled digital data into buffer 246, where buffer 246 stores a plurality of interpreted n-bit digital values on an n-bit digital value by n-bit digital value basis in accordance with a write clock operating according to a write clock cycle 232 until a digital word 242 is formed (e.g., 8-bits of data). Buffer 246 outputs digital words 242 according to read clock 234. Write clock 232 is set to capture data during the hold of sample & hold clock 232. As shown, it takes four write clock 232 cycles (plus one initial cycle) to form an 8-bit digital word 242. As such, read clock 234 is set to output data every 4 write clock cycles (plus one additional initial write cycle). Buffer 254 outputs formatted digital words 244 from digital to digital converter circuit 252 to data packeting circuit 256 in accordance with packet clock 236. Packet clock 236 cycle is set to capture data after three read clock 234 cycles according to the example, where a packet consists of 3 8-bit digital words.

Figure 36B:
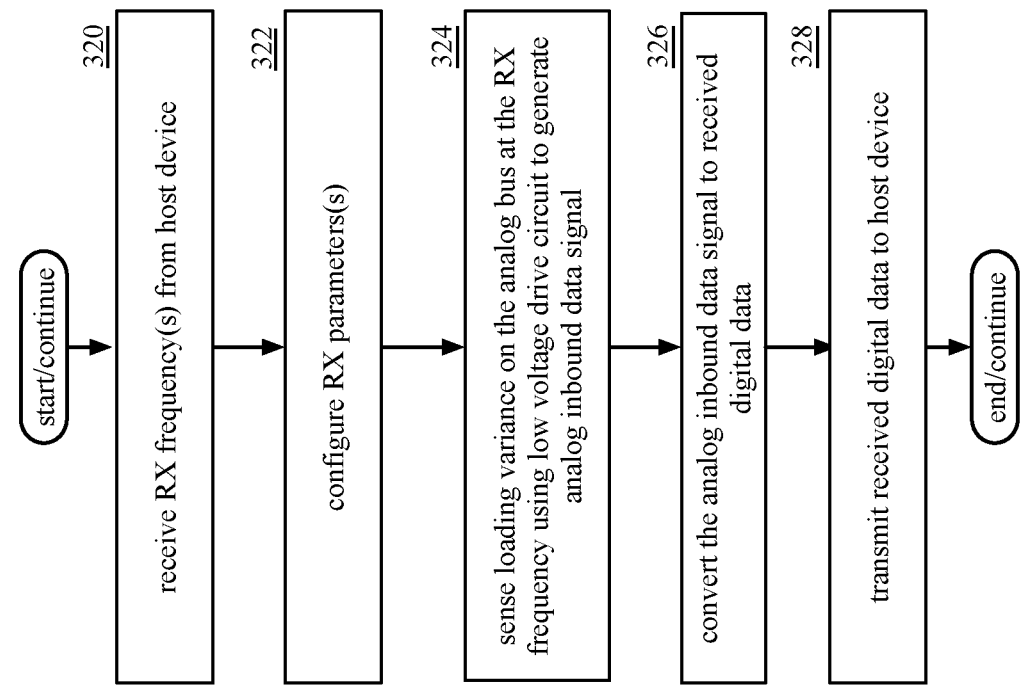
FIGS. 36A and 36B are logic diagrams of examples of methods for allocating frequencies for communication between Low Voltage Drive Circuits (LVDCs)
Figure 36A:
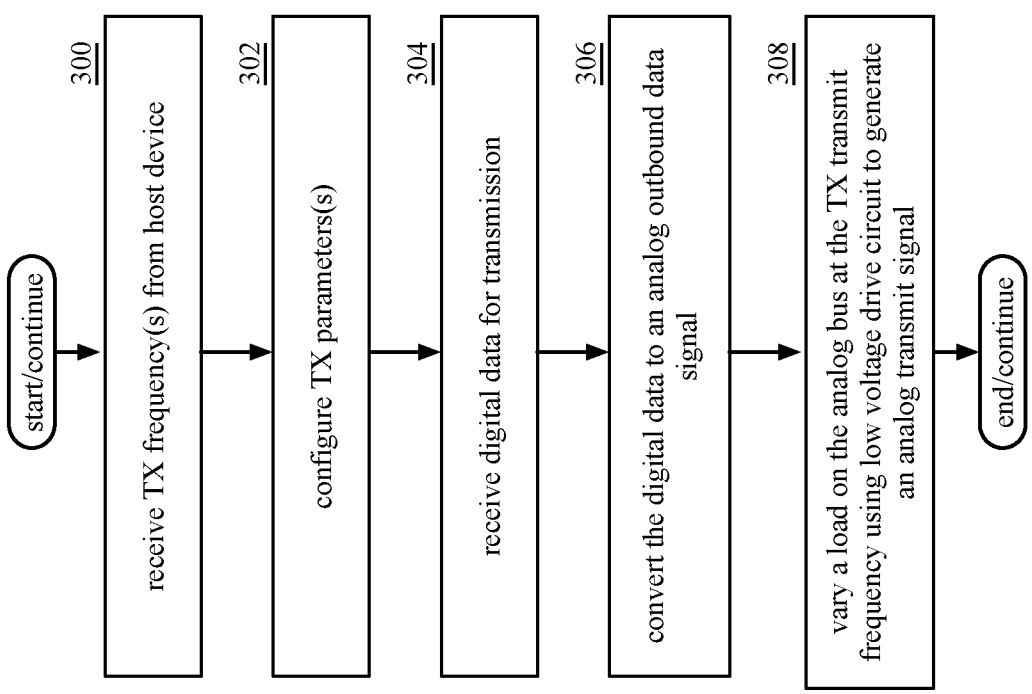

FIGS. 36A and 36B are logic diagrams of examples of methods for allocating frequencies for communication between Low Voltage Drive Circuits (LVDCs) where the receive and transmit frequencies are received from a processing entity, where a processing entity includes one or more of: a host device, such as host device 104 of FIG. 14, a processing module of a host device, such as processing module 114 of FIG. 14, memory storing a LVDC driver (e.g., a set of operational instructions), a controller of an LVDC, and the LVDC.

In a specific example of implementation and operation, in step 300 of FIG. 36A the LVDC receives the transmit (TX) frequency(s) for one or more data packets to be transmitted by a host device, such as host device 104 and applies that frequency(s) for the incoming data packet(s). In another example of implementation and operation, the LVDC can implement a frequency(s) for an incoming data packet based on information included with the data packet. For example, the data packet header can contain a field indicating one or more frequencies for communication on analog bus 80. In step 304 the LVDC receives TX digital data and converts it to an outbound data signal at step 306. The method continues at step 308 with the LVDC varying the load on an analog bus at the determined frequency in order to generate an analog transmit signal. The analog transmit signal can include an oscillating component, such as illustrated in FIG. 10, where, for example, the load variation can be a change in current, voltage and/or impedance. As an example, a transmit digital data is encoded into one channel, as such the oscillating component include one frequency: the one corresponding to the channel. As another example, the transmit digital data is divided into x number of data streams. The LVDC encodes the x number of data streams on to x number of channels. Thus, in an example the oscillating component 94 includes x number of frequencies corresponding to the x number of channels.

In step 320 of FIG. 36B a method begins with the LVDC receiving the receive (RX) frequency(s) for one or more data packets to be received from another host device and in step 322, configures the frequency(s) for an incoming analog receive signal being received on the analog bus. In step 324 the LVDC senses the loading variance at the determined frequency(s) and generates an analog inbound data signal from the analog RX signal and converts it at step 326 to received digital data, which is transmitted to the host device at step 328.

Figure 37B:
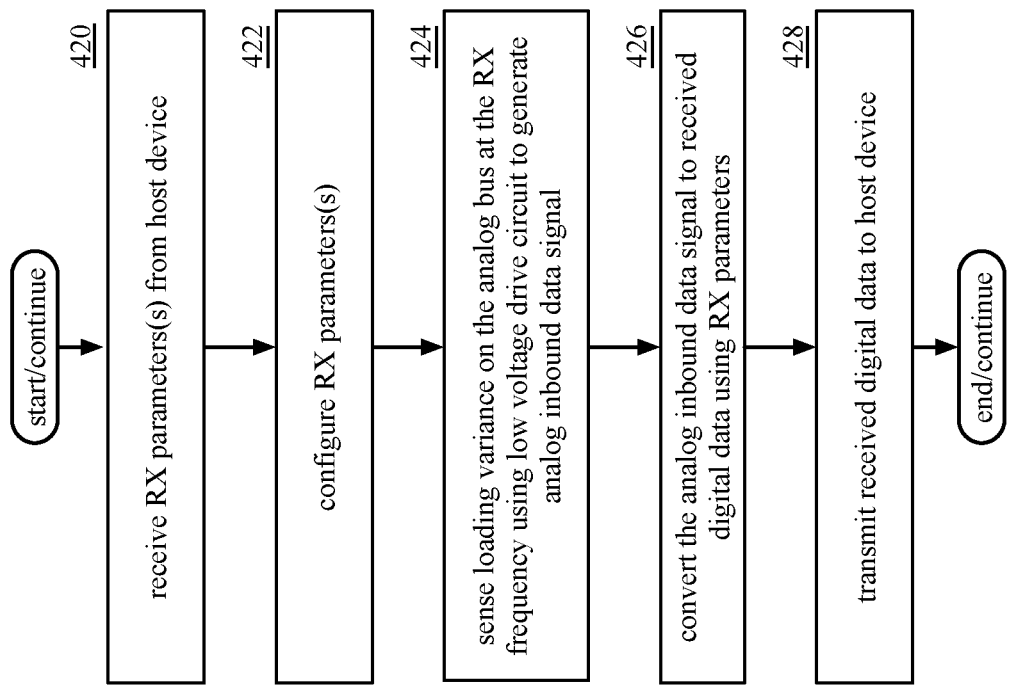
FIGS. 37A and 37B are logic diagrams of an example of a method for allocating parameters for communication between Low Voltage Drive Circuits (LVDCs)
Figure 37A:
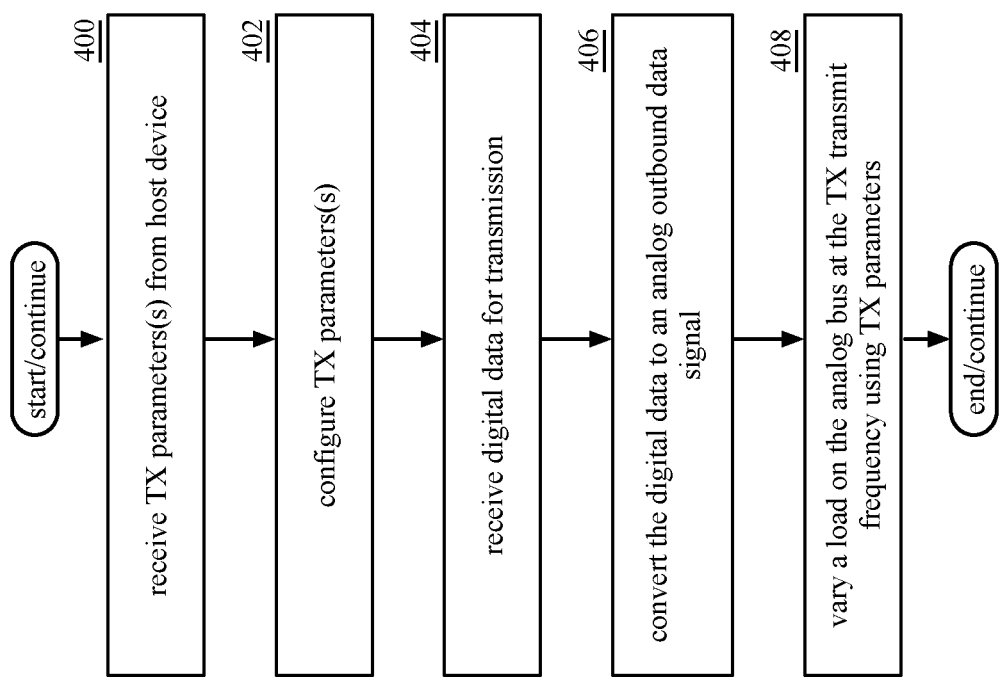

FIGS. 37A and 37B are logic diagrams of an example of a method for allocating parameters for communication between Low Voltage Drive Circuits (LVDCs) where the receive and transmit parameters are received from a processing entity, where a processing entity includes one or more of: a host device, such as host device 104 of FIG. 14, a processing module of a host device, such as processing module 114 of FIG. 14, memory storing a LVDC driver (e.g., a set of operational instructions), a controller of an LVDC, and the LVDC.

In an example, when an LVDC communication system is supporting communication between two LVDC devices, a driver and/or controller can configure the LVDC for operation using fixed frequency bands (fixed center frequency(s)), a fixed number of channels, fixed channel spacing, fixed or variable data rate and a fixed number of bits per transmission interval (such as, for example, a data packet or data message including multiple data packets).

In a specific example of implementation and operation, a driver and/or controller configures the LVDC with a predetermined number of channels, where the channels can be allocated in a predetermined manner for various functions. In a specific example of implementation and operation referring to the LVDC communication system illustrated in FIGS. 18-20, each LVDC is configured to transmit on specific channels of a fixed number and frequency band of channels and receive on a fixed number and frequency band of channels. In an example, a fixed number and channel is reserved for transmit (TX) and receive (RX) with channel spacing predetermined for any channels intended to be used for communication. In one example, the data rate for each channel can be predetermined, with the number of bits for each TX and RX interval predetermined as well. In another example, the LVDC driver and/or controller can be provided information such as one or more filter coefficients for incoming signals and a data encoding scheme for data being transmitted by the host. In a specific example of implementation and operation, the LVDC driver and/or controller will also be provided clock rates, such as the LVDC clock rate, a TX clock rate and analog bus sync clock rate and a RX clock rate and sync clock rate for the host, as illustrated in more detail in FIGS. 16A and 16B. In yet another example, the LVDC can implement communication parameters for an incoming data packet based on information included in the data packet. For example, the data packet header can contain one or more fields indicating each of the parameters required for communication.

In step 400 of FIG. 37A, the LVDC receives transmit (TX) parameters for one or more data packets to be transmitted by a host device, such as host device 104, and configures those parameters for the incoming data packet(s). In an alternative example of implementation and operation, the LVDC can be configured with one or more parameters for an incoming data packet based on information included with the data packet. In step 402 the TX parameters for the incoming data packet(s) are configured based on the received TX parameters from the host device. In step 404 the LVDC receives TX digital data and converts it to an outbound data signal at step 406, based on the configured TX parameters. The method continues at step 408 with the LVDC varying the load on an analog bus at the determined frequency in order to generate an analog transmit signal. The analog transmit signal can include an oscillating component, such as illustrated in FIG. 10, where, for example, the load variation can be a change in current, voltage and/or impedance thereby varying the load on an analog bus at the determined frequency in order to generate an analog transmit signal. As an example, a transmit digital data is encoded into one channel, as such the oscillating component includes one frequency: the one corresponding to the channel. As another example, the transmit digital data is divided into x number of data streams, with the LVDC encoding the x number of data streams on to x number of channels. Thus, in an example, an oscillating component includes x number of frequencies corresponding to the x number of channels.

In step 420 of FIG. 37B, the LVDC receives the receive (RX) parameters for one or more data packets to be received from a host device, such as host device 104 and in step 422 configures receive communication parameters for incoming analog receive signals being received on the analog bus, such as analog bus 80 from FIG. 33F. In step 424 the LVDC senses the loading variance at the determined frequency(s) and generates an analog inbound data signal from the analog receive signal and converts it at step 426 to received digital data, which is transmitted to the host device at step 428.

Figure 38:
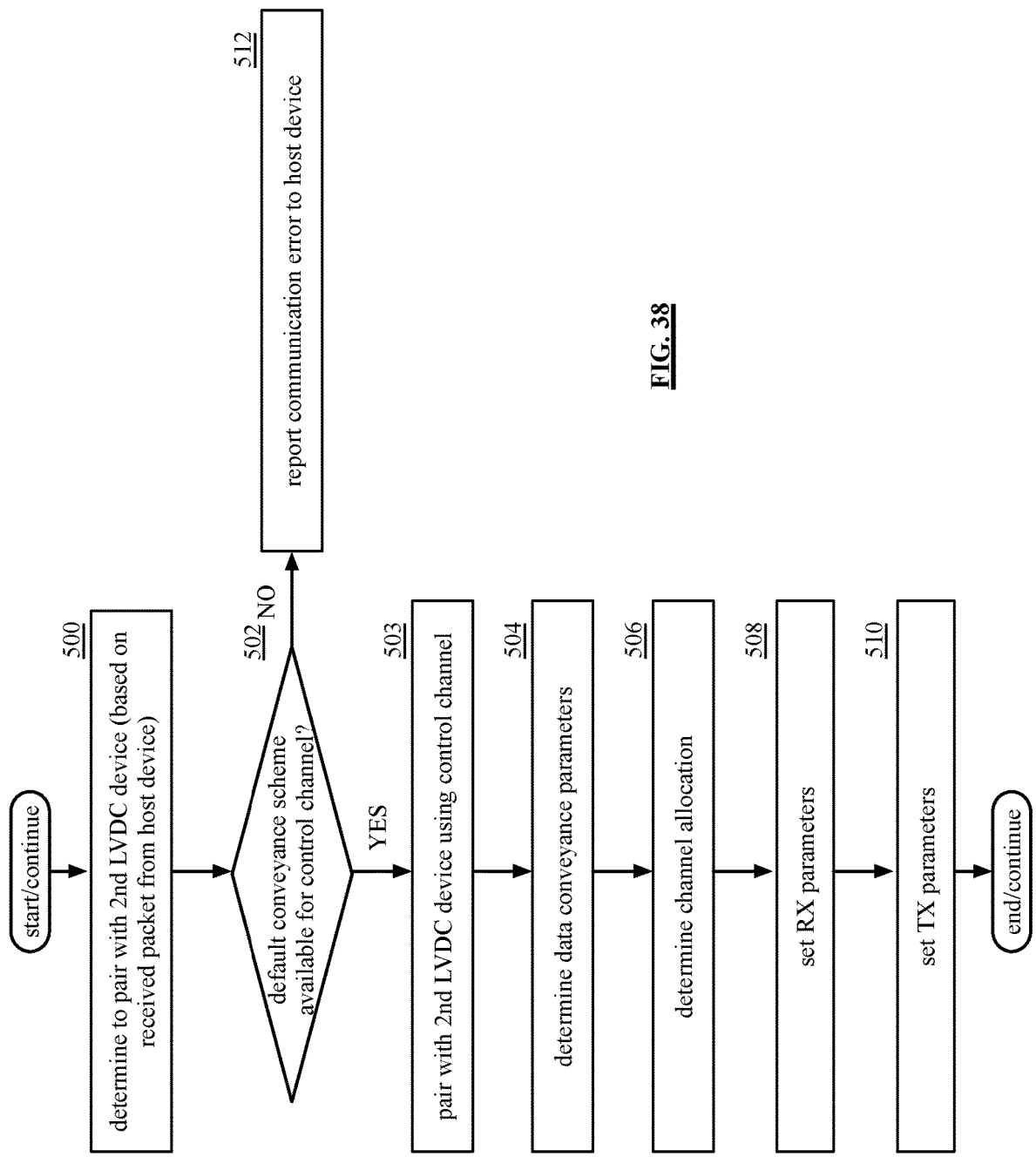
FIG. 38 is a logic diagram of an example of a method for configuring communication parameters for communication between Low Voltage Drive Circuits (LVDCs) using a dedicated control channel in accordance with the present invention.

FIG. 38 is a logic diagram of an example of a method for configuring communication parameters for communication between Low Voltage Drive Circuits (LVDCs) using a dedicated control channel on an analog bus. In a specific example of implementation and operation, in step 500 a first LVDC determines to communicate with another LVDC and determines at step 502 whether a default conveyance scheme is available. In an example, when a default conveyance scheme is not available a communication error can be transmitted to the host device. In an alternative example, the LVDC is preconfigured to operate using a default conveyance scheme, with communication parameters preconfigured as well. The default conveyance scheme can be configured for transmission and/or reception on a predetermined control channel, where the control channel is located at a particular center frequency. At step 503 the LVDC pairs with the another LVDC using the default conveyance scheme on the control channel. The method continues at step 504, with data conveyance parameters being determined and/or negotiated and at step 506 with communication channel allocation for the pending communication being determined. Finally, at steps 508 and 510 the RX and TX parameters are set and the LVDCs are then ready to commence communication, such as on analog bus 80 of FIG. 37F.

The analog transmit signal can include an oscillating component, such as illustrated in FIG. 10, where, for example, the load variation can be a change in current, voltage and/or impedance. As an example, a transmit digital data is encoded into one channel, as such the oscillating component include one frequency: the one corresponding to the channel. As another example, the transmit digital data is divided into x number of data streams, with the LVDC encoding the x number of data streams on to x number of channels. Thus, in an example an oscillating component includes x number of frequencies corresponding to the x number of channels.

Specific examples of communication schemes can include one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication.

The default conveyance schemes for establishing pairing can include enabling the RX section(s) of respective LVDCs for a transmission using a dedicated control channel. The pairing can include triggering a randomly generated delay by a transmitting (TX) LVDC, allowing, prior to expiration of the delay, a message indicating the equivalent of "I am here" to be received from a device attempting to communicate with the LVDC. In the example, when the "I am here message" is received prior to expiration of the delay, a response message, such as "so am I" can be generated on the dedicated control channel for receipt by the other device. In the example, if an "I am here" message is not received prior to expiration of the delay, the LVDC can generate an "I am here" message for transmission on the dedicated control channel and using the randomly generated delay, wait for a "so am I" response from the and when the "so am I" response is received prior to expiration of the delay, further steps can be determined to establish the pairing. The pairing attempts detailed above can include a specific number of retries and when the pairing is not possible a connection error can be generated.

In a specific example of implementation and operation of the previous embodiment, the pairing can be negotiated with a handshake-type process, where a first LVDC that it is active and ready to communicate transmits a signal on the analog bus using a default conveyance scheme. In an example of a rudimentary handshake, an LVDC can broadcast a message that it received an intended message and is ready for more. In another embodiment, the first LVDC can transmit a message querying a target LVDC as to whether the target LVDC is ready/able to receive a message, with the target LVDC responding accordingly. In a specific example of implementation and operation, the handshake includes communication parameters for subsequent communication between the two LVDCs. In the example, a receiving LVDC can respond with an acknowledgement that it has received the message from the first LVDC and provide alternative communication parameters for the communication. In an alternative embodiment, the first LVDC simply transmits an alert using the control channel to one or more LVDCs that a message is going to be transmitted. In a specific example, the alert message can provide the communication parameters that will be used for the pending message, with no acknowledgement by the other LVDC being required. In yet another specific example, the alert message can include information sufficient to identify the particular LVDC of multiple LVDCs that will be the recipient of a pending message, and in a further example, the alert message can provide communication parameters for the pending message(s).

In other examples of implementation and operation, receive (RX) parameters can include one or more of a receive clock rate, a number of taps for digital filtering, coefficients for digital filtering, a receive digital data format, a receive data packet format and a bits per receive interval. Transmit (TX) parameters can include one or more of a transmit clock rate, a transmit digital data format, a transmit data packet format, a signaling magnitude for transmission on analog bus, a signaling frequency for transmission on analog bus, a common mode voltage for signaling on transmission on analog bus and a bits per transmit interval. In one embodiment, a particular LVDC initiates and/or manages the pairing negotiation. In another embodiment, the LVDC is configured to respond only to pairing attempts from another LVDC.

In a specific example of implementation and operation, once two LVDCs are paired, the LVDCs can negotiate further communication parameters. For example, a data conveyance scheme for the formatting of data can be communicated. Example data conveyance schemes can include one or more of a data rate for each line or channel, a data coding scheme for each line or channel, a data communication scheme for each line/channel (such as whether communication will be point to point or modulated), a digital data format for each line/channel, packet formatting requirements for each line/channel, a voltage or current level for signaling on the analog bus for each line/channel (function of, for example, signal to noise ratio, power level and data rate), a power level for each for each line/channel, number of bits per transmission interval for each line/channel and a number of lines available on the analog bus.

Figure 39:
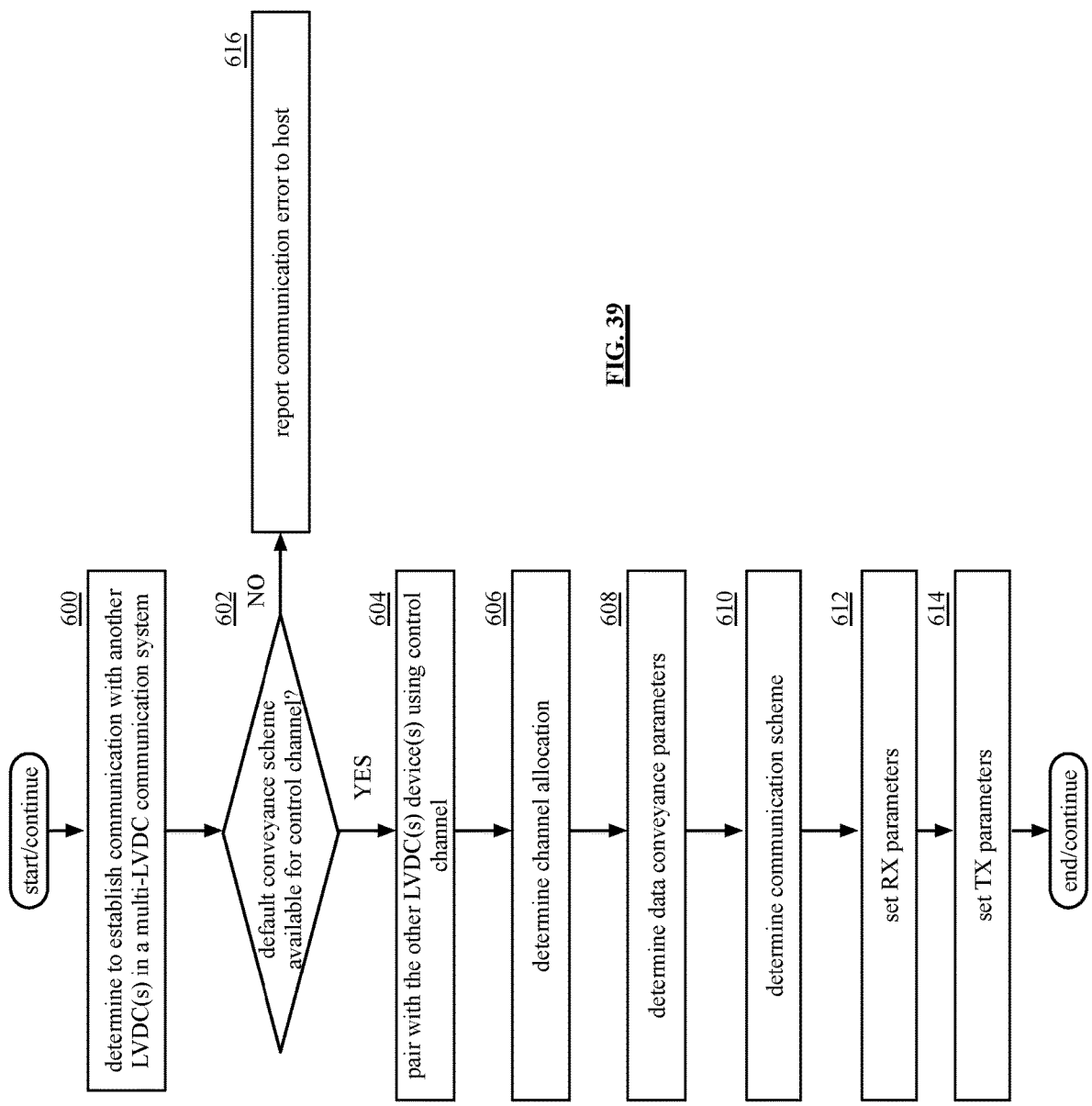
FIG. 39 is a logic diagram of an example of a method for configuring communication parameters for communication between multiple Low Voltage Drive Circuits (LVDCs) in accordance with the present invention.

FIG. 39 is a logic diagram of an example of a method for configuring communication parameters for communication between Low Voltage Drive Circuits (LVDCs) in a communication supporting communicating between multiple LVDCs on analog bus 80. In step 600 a first LVDC determines to communicate with another LVDC in a communication system that includes a plurality of LVDCs and determines at step 602 whether a default conveyance scheme is available. In an alternative example, the first LVDC is preconfigured to operate using a default conveyance scheme. The default conveyance scheme can be configured for transmission and/or reception on a predetermined control channel, where the control channel is a particular center frequency and/or channel. In an example with multiple LVDCs in communication, the control channel/center frequency can be shared among the multiple LVDCs. The method continues at step 604, with a pairing for a first communication between a first LVDC and another LVDC of the plurality of LVDCs using the dedicated control channel.

At step 606 the paired LVDCs negotiate to determine a channel allocation for the first communication and the method then continues at step 608 with the paired LVDCs negotiating to determine data conveyance parameters for the first communication. At step 610 the paired LVDCs determine a communication scheme and the method continues at step 612, with an LVDC of the paired LVDCs setting receive (RX) parameters for the analog to digital circuit (ADC) for transmission on the analog bus to the other paired LVDC, such as the ADC of receive analog to digital circuit 108 of FIGS. 11, 14, 15 and 16A-16B. At step 614, an LVDC of the paired LVDCs sets transmit (TX) parameters for the digital to analog circuit (DAC) for transmission on analog bus 80 to the other paired LVDC, such as the DAC of the digital to analog circuit 110 of FIGS. 11, 14, 15 and 16A-16B on the analog bus.

Options for the communication scheme include one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication. The data conveyance scheme can include one or more of a data rate for each line or channel, a data coding scheme for each line or channel, a data communication scheme for each line/channel (such as whether communication will be point to point or modulated), a digital data format for each line/channel, packet formatting requirements for each line/channel, a voltage or current level for signaling on the analog bus for each line/channel (function of, for example, signal to noise ratio, power level and data rate), a power level for each for each line/channel, number of bits per transmission interval for each line/channel and a number of lines available on the analog bus (total number of lines available and/or which subset of the lines will be used for communication.

Example RX parameters can include one or more of a receive digital data format, a receive data packet format and a bits per receive interval. Additional RX parameters can include parameters for analog to digital conversion (as described in detailed above), as determined based on the communication scheme and/or the data conveyance scheme. These additional RX parameters can include one or more of bandwidth, slew rate, center frequency (or center frequencies, as appropriate), digital filter coefficients, a number of taps for digital filtering and digital filtering stages. Transmit (TX) parameters can include one or more of a transmit digital data format, a transmit data packet format and digital to analog conversion parameters (based on determined communication scheme and/or determined data conveyance scheme).

FIG. 40 is a logic diagram of an example of a method for implementing channel allocation for communication between Low Voltage Drive Circuits (LVDCs). The method begins at step 700, where a first low voltage drive circuit (LVDC) that is affiliated with a first host device detects a request for one-to-one communication with a second LVDC affiliated with a second host device on a common analog bus, such as analog bus 80 from FIG. 11, et. sec. In a specific example of implementation and operation, the request is received on a dedicated control channel, where a plurality of LVDCs are coupled to the bus. Data is conveyed on the bus by varying the load on an analog bus at a determined frequency in order to generate an analog transmit signal. The analog transmit signal can include an oscillating component, such as illustrated in FIG. 10, where, for example, the load variation can be a change in current, voltage and/or impedance. The method continues at step 702, with either a requesting LVDC or a responding LVDC determining, based on one or more of a data conveyance scheme and a communications scheme for one-to-one communication, a desired and/or required number of channels for the communication. In a specific example the "channels" correspond to frequencies (such as center frequencies) in a frequency band.

The method then continues at step 704 with either the requesting LVDC or the responding LVDC (as appropriate) determining a number of channels available, and then at step 706, determining if the available number of channels is sufficient/desirable for the determined data conveyance scheme and/or communication scheme. When the number of channels is sufficient, the determined channel are assigned for communication at step 708 and when the number of channels is not sufficient, the requesting LVDC or the responding LVDC determines, at step 710 whether the determined data conveyance scheme and/or communication scheme can be adjusted to allow for a fewer number of channels, specifically whether one or more adjustments appropriate for the number of channels available is feasible. When an adjustment is feasible, channels are allocated at step 712 as determined and communication is enabled. When adjusting one or more parameters is not feasible the requesting LVDC or the responding LVDC can indicate, at step 714 that communication has failed and/or transmit a request to other LVDCs coupled to and/or sharing the analog bus to release one or more channels, where the request is made using the dedicated control channel and where the dedicated control channel is also shared between the requesting and responding LVDCs and the other LVDCs sharing the analog bus.

In a specific example of implementation and operation, when adjusting a data conveyance scheme and/or communication scheme parameters is insufficient for establishing communication and when one or more of the "other" LVDCs sharing the bus is determined to be able to release a previously allocated channel, a requesting LVDC or responding LVDC (as appropriate) can allocate the released channel(s) for communication between the requesting LVDC and the responding LVDC. In a further example, when additional channels become available on the bus, these newly "released" channels can be used by the requesting LVDC and responding LVDC to meet its desired channel allocation needs without adjusting data conveyance scheme and/or communication scheme parameters. For example, when the desired number of channels become available any previously adjusted data conveyance scheme and/or communication scheme parameter can be reverted to its non-adjusted/preferred state.

In a specific example of implementation and operation, after a first LVDC detects a request for communication from a second LVDC and before a desired number of channels is determined, the first LVDC can transmit a communication request to the second LVDC using the dedicated control channel, whereupon the second LVDC can respond with a favorable response message.

In a yet another specific example of implementation and operation, each LVDC maintains a relatively current channel allocation list and monitors the control channel to determine when/if channels have been allocated for communication and when any of those channels have been released. In the example of a communication system where multiple bus lines are provisioned a plurality of channel allocation lists can be provisioned to the LVDCs coupled on the analog bus, such that there is at least one channel allocation list for each bus line available. In a specific example, channel allocation is determined on a per bus line basis.

In an example consistent with the method of FIG. 40, when communication parameters include full duplex communication between the first LVDC and a second LVDC, a first set of channels can be allocated for transmitting from the first LVDC to the second LVDC, while another set of channels can be allocated for reception by the first LVDC from the second LVDC. In a further example, when a desired number of channels are not available for communication between the first and second LVDCs, a fewer number of channels allocated for transmission or reception can be implemented. For example, if communication between a first and second LVDC is asymmetrical (for example the first LVDC is transmitting more than it is receiving) a greater number of transmission channels can be allocated to the first LVDC for transmission as compared to allocated channels for receiving. In a further example, the data conveyance scheme and/or communication scheme parameters can include one or more components of receive parameters and/or one or more components of transmit parameters.

FIG. 41 is a logic diagram of an example of a method for implementing channel allocation to enable communications between multiple Low Voltage Drive Circuits (LVDCs) in a communication system. The method begins at step 800, where an initial data conveyance scheme and/or communication scheme is determined for desired communications on a common analog bus, such as bus 80 from FIG. 11, et. sec. In an example, the determining can be done by one or more controllers associated with an LVDC of the multiple LVDCs, with the LVDC making the determination being chosen by one of an initiation procedure, a round robin selection, a multi-party negotiation and a designated master/slave relationship. The method continues at step 802, with a number of desired channels being determined for the initial data conveyance schemes and/or communication schemes determined for desired communications between each of a plurality of LVDCs coupled on the analog bus. In an example, the "channels" correspond to frequencies (such as center frequencies) in a frequency band.

The method then continues at step 804 with a number of available channels being determined, and then continues at step 806, with a determination whether the desired number of channels is sufficient. When the number of available channels is equal to or greater than the desired number of channels, a channel mapping is determined for the desired channels at step 808. When a number of available channels is insufficient for the desired number of channels, a determination is made at step 810 whether the one or more parameters of the initial data conveyance scheme and/or communication scheme can be adjusted. If one or more parameters of the initial data conveyance scheme and/or communication scheme can be adjusted, the one or more parameters can be adjusted at step 812 to allow communication using the number of available channels and the channel mapping is then determined at step 808 for the channels, as determined based on the requisite adjustment. In an example of operation and implementation, when the parameters of the initial data conveyance scheme and/or communication scheme cannot be adjusted, a message can be generated at step 816, indicating that communication is not possible, or other adjustments can be made.

In a example of operation and implementation, when the total desired number of channels exceeds the total number of available channels, one or more communications between LVDCs of the plurality of communications can be identified and the initial data conveyance scheme and/or communication scheme for a particular communication can be adjusted in order to reduce the overall channel usage number. Identifying a particular communication for adjustment can be based on one or more of a query of LVDCs currently communicating, an analysis of traffic between LVDC pairs involved in current communication, a round robin selection and a determination of a significance of communication between the particular communication compared to other current communications. For example, a communication between LVDCs may be intermittent, allowing the number of channels to be reduced without impacting overall performance. In another example, a communication may be asymmetric, such that one of TX or RX does not need or require as much bandwidth, allowing the communication to proceed adequately with fewer of TX or RX, as appropriate.

In another example, when adjusting a particular communication is insufficient to adequately reduce overall channel number usage, one or more additional communications can be adjusted until an overall channel number usage meets an adjusted desired number of channels.

In yet another example, when the number of available channels exceeds the desired number of channels a time-division channel mapping can be determined for the desired channels. In a specific example, available channels of the plurality of channels available can be allocated according to a time-division scheme, so that the channels are available on a shared basis for a communication between particular LVDCs of the plurality of LVDCs.

In a specific example from FIG. 41, initial data conveyance schemes for each of the communications can be determined on, for example, on ad-hoc basis, where the communicating LVDCs negotiate a data conveyance scheme in a manner consistent with FIGS. 38 and 39, without considering communications between other LVDCs sharing the bus, until a number of communications between LVDCs indicates that channel mapping is necessary to accommodate the desired communications. In another example, the initial data conveyance scheme for each communication between LVDCs desiring to communicate on the bus is determined using a control channel.

Identifying the number of communications on the bus can include one or more of: querying each of the known LVDCs on the bus, broadcasting a request for a response using the control channel, monitoring the channels in each of one or more bands and analyzing traffic on the one or more shared buses.

FIG. 42 is a logic diagram of an example of a method for determining data conveyance and communication schemes for two-party communication between Low Voltage Drive Circuits (LVDCs). In step 820, data communication capabilities ore obtained for a host affiliated with a first LVDC and in step 830 data communication capabilities ore obtained for a host affiliated with a second LVDC. Specific examples of data communication capabilities for each of the host devices include one or more of usable data rates, double data rate capability, clock rate, bits per interval of data rate, full or half duplex capability, digital data format options, digital data packet format options, capability for independent data transmission, capability for independent data reception, capability for dependent data transmission and capability for dependent data reception.

In step 824, the data communication capabilities of the host devices affiliated with each of the first and second host devices are reconciled to produce reconciled data communication capabilities for the first and second LVDC. In an example, the reconciliation of data communication capabilities can be performed by either of the first or second LVDCs, or by both the first and second LVDC working in concert. In an example, either of the first or the second LVDC transmits a list of data communication capabilities to the other LVDC, with the receiving LVDC comparing the list to its own list of data communication capabilities to produce a reconciled list of data communication capabilities common to host devices affiliated with each of the first and second LVDCs. Reconciling of data communication capabilities between LVDCs can include a determination of a common subset of data communication capabilities and/or a simple acknowledgement that the capabilities of the LVDCs are the same.

In step 826 the reconciled data communication capabilities list is used to determine a data conveyance scheme for one-to-one communication between the first and second LVDCs. The data conveyance scheme can include one or more of a data rate for each line or channel, a data coding scheme for each line or channel, a data communication scheme for each line/channel (such as whether communication will be point to point or modulated), a digital data format for each line/channel, packet formatting requirements for each line/channel, a voltage or current level for signaling on the analog bus for each line/channel (function of, for example, signal to noise ratio, power level and data rate), a power level for each for each line/channel, number of bits per transmission interval for each line/channel and a number of lines available on the analog bus (total number of lines available and/or which subset of the lines will be used for communication.

In step 828 the reconciled data communication capabilities list is used to determine a communication scheme for one-to-one communication between the first and second LVDCs based on the reconciled data communications. Options for the communication scheme include one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication. The communication scheme can be determined based on one or more of: a highest available communication efficiency for communication between the first and second LVDCs based on the reconciled communication capabilities, a lowest power efficiency for communication between the first and second LVDCs, a lowest latency for communication between the first and second LVDCs and a compromise for throughput for each of communication efficiency, power efficiency and latency.

FIG. 43 is a logic diagram of an example of a method for determining data conveyance and communication schemes for multi-party communication between Low Voltage Drive Circuits (LVDCs). In step 830 data communication capabilities are obtained, by each affiliated LVDC, for each host device and associated LVDC in multi-party communication system. In step 832 the data communication capabilities for a host affiliated with each of a first LVDC and a second LVDC are used to produce a first reconciled data communication capabilities. Data communication capabilities for each of the host devices can include one or more of usable data rates, double data rate capability, clock rate, bits per interval of data rate, full or half duplex capability, digital data format options, digital data packet format options, capability for independent data transmission, capability for independent data reception, capability for dependent data transmission and capability for dependent data reception. Reconciling of data communication capabilities between the first and second LVDC can include a determination of a common subset of data communication capabilities and/or a simple acknowledgement that the capabilities of the LVDCs are the same.

In step 834 the data communication capabilities for a host affiliated with each of a first LVDC and a third LVDC are used to produce a second reconciled data communication capabilities. In an example, the reconciliation of data communication capabilities can be performed by either of the first, second or third LVDCs. In an example, each of the second and third LVDCs transmits a list of data communication capabilities to the first LVDC, with the first LVDC comparing the received lists to its own list of data communication capabilities to produce a list of common data communication capabilities for host devices affiliated with each of the first, second and third LVDCs. Reconciling of data communication capabilities between the first and third LVDC can include a determination of a common subset of data communication capabilities and/or a simple acknowledgement that the capabilities of the LVDCs are the same.

In step 836 a data conveyance scheme is determined for data communication between at least the first, second and third LVDCs, based on the common data communication capabilities for the first, second and third LVDCs. The data conveyance scheme can include one or more of a data rate for each line or channel, a data coding scheme for each line or channel, a data communication scheme for each line/channel (such as whether communication will be point to point or modulated), a digital data format for each line/channel, packet formatting requirements for each line/channel, a voltage or current level for signaling on the analog bus for each line/channel (function of, for example, signal to noise ratio, power level and data rate), a power level for each for each line/channel, number of bits per transmission interval for each line/channel and a number of lines available on the analog bus (total number of lines available and/or which subset of the lines will be used for communication.

In step 838, a communication scheme is determined for data communication between at least the first, second and third LVDCs, based on the common data communication capabilities for the first, second and third LVDCs. Options for the communication scheme include one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication. The communication scheme can be determined based on one or more of: a highest available communication efficiency for communication between the first and second LVDCs based on the reconciled communication capabilities, a lowest power efficiency for communication between the first and second LVDCs, a lowest latency for communication between the first and second LVDCs and a compromise for throughput for each of communication efficiency, power efficiency and latency.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores digital information in a non-transitory manner. Furthermore, the memory device may be in a form a solid-state memory, a hard drive memory or other disk storage, cloud memory, thumb drive, server memory, computing device memory, and/or other non-transitory medium for storing digital information. The storage of digital information includes temporary storage (i.e., data is lost when power is removed from the memory element) and/or persistent storage (i.e., data is retained when power is removed from the memory element).

As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a low voltage drive circuit (LVDC) associated with a host device, data from one or more other low voltage drive circuits (LVDCs), wherein the LVDC and the one or more other LVDCs communicate via a bus by varying loading on the bus at one or more frequencies;
   sampling, by the LVDC, one or more data values of the data to produce a sampled digital data value, wherein the one or more data values are associated with a data clock cycle associated with the data;
   converting, by the LVDC, the sampled digital data value to a binary string;
   writing, by the LVDC, the binary string to a buffer;
   writing, by the LVDC, one or more additional binary strings to the buffer to form a digital word;
   outputting, by the LVDC, the digital word to a digital converter circuit;
   formatting, by the digital converter circuit, the digital word to create a formatted digital word;
   writing, by the digital converter circuit, the formatted digital word to another buffer;
   writing, by the digital converter circuit, one or more additional formatted digital words to the another buffer;
   forming, by a data packeting circuit, a data packet from the formatted digital word and the additional formatted digital words; and
   outputting the data packet to the host device.

2. The method of claim 1, wherein the data is filtered digital data.

3. The method of claim 2, wherein the filtered digital data is a pulse, wherein the pulse is representative of one or more bits of data.

4. The method of claim 1, wherein the writing the binary string to a buffer is based on a write rate clock cycle.

5. The method of claim 1, wherein the writing the binary string to a buffer is based on a read rate clock cycle.

6. The method of claim 1, wherein the sampling one or more data values of the data to produce a sampled digital data value includes holding the one or more data values received during a data clock cycle.

7. The method of claim 1, wherein the digital word is selected from a list comprising at least one of 8-bit, 16-bit, 32-bit and 64 bit.

8. The method of claim 1, wherein the data clock cycle associated with the data is based on a clock rate of an analog bus associated with the LVDC.

9. The method of claim 1, wherein the outputting the data packet to the host device is based on a receive clock rate associated with the host device.

10. The method of claim 9, wherein the receive clock rate is derived from a clock rate of an analog bus associated with the LVDC and the receive clock rate associated with the host device.

11. A method comprises:
    receiving, by a low voltage drive circuit (LVDC), a data packet from a host device, wherein the LVDC and one or more other LVDCs communicate via a bus by varying loading on the bus at one or more frequencies;
    converting, by the LVDC, the data packet into a plurality of formatted digital words;
    extracting, by the LVDC, a binary string representative of at least one of the formatted digital words;
    generating a pulse according to a data clock cycle for the binary string; and
    driving an analog transmit signal based on the pulse on to a bus coupled to the LVDC, wherein the analog transmit signal varies loading on the bus to represent an analog outbound data signal.

12. The method of claim 11, wherein the data packet includes at least a header section, a payload section and a data integrity section.

13. The method of claim 11, wherein the analog transmit signal varies loading on the bus at a plurality of frequencies.

14. The method of claim 11, wherein the loading on the bus is based on information included in the data packet.

15. The method of claim 12, wherein the pulse is representative of one or more bits of data.

16. The method of claim 11, wherein the data clock cycle is based on a write rate clock cycle.

17. The method of claim 11, wherein the data clock cycle is based on a read rate clock cycle.

18. The method of claim 11, wherein the formatted digital words is derived from a digital word, wherein the digital word is selected from a list comprising at least one of 8-bit, 16-bit, 32-bit and 64 bit.

19. The method of claim 11, wherein the driving an analog transmit signal is based on a transmit clock rate associated with the host device.

20. The method of claim 19, wherein the transmit clock rate is derived from a clock rate of the bus associated and the clock rate associated with the host device.

* * * * *